(12) United States Patent
Yoshida

(10) Patent No.: US 7,967,217 B2
(45) Date of Patent: Jun. 28, 2011

(54) INFORMATION REPRODUCTION/I/O METHOD USING DOT PATTERN, INFORMATION REPRODUCTION DEVICE, MOBILE INFORMATION I/O DEVICE, AND ELECTRONIC TOY

(76) Inventor: Kenji Yoshida, Tokyo (JP)

( * ) Notice: Subject to any disclaimer, the term of this patent is extended or adjusted under 35 U.S.C. 154(b) by 1554 days.

(21) Appl. No.: 10/529,440

(22) PCT Filed: Sep. 26, 2003

(86) PCT No.: PCT/JP03/12364
§ 371 (c)(1),
(2), (4) Date: Mar. 25, 2005

(87) PCT Pub. No.: WO2004/029871
PCT Pub. Date: Apr. 8, 2004

(65) Prior Publication Data
US 2006/0154559 A1    Jul. 13, 2006

(30) Foreign Application Priority Data

| Sep. 26, 2002 | (JP) | 2002-281815 |
| Oct. 4, 2002 | (JP) | 2002-292907 |
| Dec. 27, 2002 | (JP) | 2002-380503 |
| Dec. 27, 2002 | (JP) | 2002-380932 |
| Dec. 27, 2002 | (JP) | 2002-381743 |

(51) Int. Cl.
*G06K 19/06* (2006.01)
(52) U.S. Cl. .................................. 235/494
(58) Field of Classification Search .............. 235/494
See application file for complete search history.

(56) References Cited

U.S. PATENT DOCUMENTS

| 4,263,504 A * | 4/1981 | Thomas ................ 235/454 |
| 5,892,846 A * | 4/1999 | Davis .................. 382/217 |
| 6,012,961 A | 1/2000 | Sharpe, III et al. |
| 6,072,917 A | 6/2000 | Mori et al. |

FOREIGN PATENT DOCUMENTS

| EP | 0 670 555 A1 | 9/1995 |
| EP | 1159991 A2 | 12/2001 |
| EP | 1 229 471 A1 | 8/2002 |
| GB | 2 349 836 A | 11/2000 |
| JP | 61-065213 A | 4/1986 |
| JP | 7-178257 | 7/1995 |
| JP | 7-296387 | 11/1995 |

(Continued)

OTHER PUBLICATIONS

European Office Action dated Feb. 17, 2006.

(Continued)

*Primary Examiner* — Daniel A Hess
(74) *Attorney, Agent, or Firm* — Westerman, Hattori, Daniels & Adrian, LLP

(57) ABSTRACT

The present invention proposes a dot pattern on which code information and x and y coordinate information can be defined even if the dot pattern is extremely small, and proposes an information reproducing method and an information reproducing device based on the dot pattern. More specifically, a medium such as a printed material on which is formed a dot pattern portion by arranging in accordance with a given rule dots generated by a dot code generating algorithm in order to recognize various kinds of multimedia information is scanned as image data by scanning means. Then, the image data is converted into code data. Multimedia information corresponding to the code data is read out of storing means to be reproduced.

33 Claims, 83 Drawing Sheets

FOREIGN PATENT DOCUMENTS

| | | |
|---|---|---|
| JP | 9-185488 | 7/1997 |
| JP | 2000-285225 A | 10/2000 |
| JP | 2000-325668 | 11/2000 |
| JP | 2001-318926 | 11/2001 |
| JP | 2002-41199 | 2/2002 |
| JP | 2002-149331 | 5/2002 |
| JP | 2002-205291 | 7/2002 |
| RU | 2166207 C2 | 4/2001 |
| WO | WO 00/72124 A1 | 11/2000 |
| WO | WO 01/26032 A1 | 4/2001 |
| WO | WO-01/48591 A1 | 7/2001 |
| WO | WO-01/61455 A1 | 8/2001 |

OTHER PUBLICATIONS

Decision on Grant, issued in corresponding Russian Patent Application Number 2005112458(014383) having a filing date of Sep. 26, 2003.

Russian Office Action dated Feb. 19, 2008, issued in corresponding Russian Patent Application No. 2005112458/09(014383).

European Search Report dated Aug. 5, 2008, issued in corresponding European Patent Application No. 08008386.8.

European Search Report dated Apr. 25, 2006.

* cited by examiner (a)

(b)

(a)

(b)

△ LATTICE DOT (a)

B1 BLOCK           B2 BLOCK

| $I_{16}$ | $I_{13}$ | $I_4$ | $I_1$ | $I_{16}$ | $I_{13}$ | $I_4$ | $I_1$ |
|---|---|---|---|---|---|---|---|
| $I_{15}$ | $I_{14}$ | $I_3$ | $I_2$ | $I_{15}$ | $I_{14}$ | $I_3$ | $I_2$ |
| $I_{12}$ | $I_9$ | $I_8$ | $I_5$ | $I_{12}$ | $I_9$ | $I_8$ | $I_5$ |
| $I_{11}$ | $I_{10}$ | $I_7$ | $I_6$ | $I_{11}$ | $I_{10}$ | $I_7$ | $I_6$ |
| $I_{16}$ | $I_{13}$ | $I_4$ | $I_1$ | $I_{16}$ | $I_{13}$ | $I_4$ | $I_1$ |
| $I_{15}$ | $I_{14}$ | $I_3$ | $I_2$ | $I_{15}$ | $I_{14}$ | $I_3$ | $I_2$ |
| $I_{12}$ | $I_9$ | $I_8$ | $I_5$ | $I_{12}$ | $I_9$ | $I_8$ | $I_5$ |
| $I_{11}$ | $I_{10}$ | $I_7$ | $I_6$ | $I_{11}$ | $I_{10}$ | $I_7$ | $I_6$ |

B4 BLOCK           B3 BLOCK r=3√2≒4.23   r=5 r=5    r=3√2≒4.23

INTEGRAL-TYPE SCANNER (a)

(b)

(c)

(d)

DIFFUSE REFLECTION                SPECULAR REFLECTION

ID

INFORMATION REPRODUCTION/I/O METHOD USING DOT PATTERN, INFORMATION REPRODUCTION DEVICE, MOBILE INFORMATION I/O DEVICE, AND ELECTRONIC TOY

BACKGROUND OF THE INVENTION

1. Field of the Invention

The present invention relates to a technique of optically scanning dot pattern information formed on a printed material and reproducing various kinds of information corresponding to the dot pattern information.

2. Description of the Related Art

Heretofore, there has been proposed a voice emitting toy for reading a barcode printed on a picture book or a game card using an optical sensor and emitting a particular voice. Such a voice emitting toy enables to read from a memory various kinds of voice information corresponding to a read barcode to reproduce the voice information.

However, such a technique using a barcode requires a dedicated area on paper to be reserved for printing the barcode, and the barcode is only for an information processing system to read, and a code description of the barcode can not be visually understood by a reader of a book including a picture book. Since the barcode is printed on a limited paper space, a reader feels it unpleasant and the barcode sometimes may reduce a product value of a book including a picture book.

Further, since the barcode, as mentioned above, can not be printed over letters, graphics or symbols printed on a paper sheet, when these letters, graphics, symbols and the like are used to reproduce voices, the barcode has to be printed near them, which presents a trouble such that it is difficult for a reader to intuitively know voice information or the like added on the letters or the like.

Regarding this point, a "dot code" technique disclosed in the Japanese Laid-Open patent publication No. 10-261059 proposes a method for scanning code information printed by a dot pattern to reproduce information.

In the related art, data is defined by way for arranging a dot pattern in a block field, and a marker is defined by a dot pattern which is different from the data dot pattern to serve as a synchronization signal. According to this technique, a dot pattern created by printing dots in the two-dimensional direction on a paper sheet in accordance with a predetermined rule is read by a pen type scanner, and the scanning speed and the scanning direction of this scanner is analyzed by an information processing device thereby to reproduce information including a voice which is associated therewith in advance.

However, since such a dot code technique is based on the assumption that dots are dynamically scanned by a scanner, although it can reproduce voice information along letters printed on a paper sheet, it is not adequate to reproduce information only by statically abutting a scanning device to a picture book or the like on which a character and the like are freely arranged and printed. In other words, since this dot code technique requires to carry out more than a predetermined distance of scanning on the x and y coordinates in order to obtain significant code information, it is impossible to associate a minimum area with a dot code and to print the area.

SUMMARY OF THE INVENTION

The present invention proposes a dot pattern that allows to define code information or the x and y coordinates even if the dot pattern is an minimum area, and an information reproducing method and an information reproducing device based on the dot pattern A first aspect of the invention is configured to include the steps of:

scanning as image data by scanning means (602) a medium such as a printed material (606) on which is formed a dot pattern portion (607), the dot pattern portion being formed by arranging in accordance with a given rule dots (605) generated by a dot code generating algorithm, in order to recognize various kinds of multimedia information; converting the image data of the dot pattern portion (607) into code data; and reading multimedia information corresponding to the code data out of storing means to reproduce the multimedia information.

The multimedia information here may be any one of followings: voice information, image information, video information, and visible, audible and readable information such as a letter and a symbol. Further, the multimedia information may be digital data for another personal computer, a television system or a radio terminal to reproduce video/image information, text information and the like.

Here, on the dot pattern portion (607), code information corresponding to voice data registered in the storing means may be defined or the x and y coordinates may be defined. Also, both of the code information and the x and y coordinates may be defined. In a header of the dot pattern portion (607), a flag may be registered to determine the dot pattern portion is code information or x and y coordinates.

The medium may be a picture book or a photograph. The dot pattern portion (607) for recognizing voice information corresponding to image (606*b*) of the picture book or the like may be printed over the image (606*b*).

The dot pattern portion (607) may be printed on a seal member.

The dot pattern portion (607) may be formed on a transparent film (611). In this case, the transparent film may be arranged over a paper sheet, or the transparent film (611) may be attached to display means (613) of an electronic device as a touch panel. Then, the display means (613) is used to display instruction information so as to make a user to operate scanning means.

Between the touch panel (612) and the medium such as the paper sheet or the display means (613), an infrared cutoff filter (614) may be arranged.

In addition to the case that the touch panel is attached to the aforementioned display means (613), the touch panel may be attached on a book such as a picture book, a figure or the like.

Here, the scanning means (602) may be configured separately from an electronic device including a personal computer (608), a PDA and a portable phone, and data communication may be established between them by wire communication, radio communication or optical communication. However, the scanning means (602) may be housed in the electronic device integrally. In this case, the electronic device may be configured by a pen type case or a mouse type case, in addition to the electronic devices.

A second aspect of the invention is an information inputting/outputting method by camera inputting comprising the steps of: printing on one surface of a printed material (5) a dot pattern portion (6) formed by arranging in accordance with a given rule dots generated by a dot code generating algorithm in order to recognize various kinds of multimedia information and an information transfer portion (7) which includes a text, an illustration or the like to be recognized as information content; capturing by a camera unit (2) only image data of the dot pattern portion (6) in the printed material (5) and digitalizing the image data into numeric values; and based on the numeric values, outputting information and a program corresponding to the dot pattern portion (6) from a storing portion (10) and executing the information and the program.

The dot pattern portion (6) and the information transfer portion (7) comprising of the text or the illustration or the like may be printed on the one surface to be superimposed.

The dot pattern portion (6) may be defined by x and y coordinate information and the x and y coordinate information may be associated with content of the information transfer portion (7).

The dot pattern portion (6) may be defined by code numeric information and the code numeric information may be associated with content of the information transfer portion (7).

The dot pattern portion (6) of the x and y coordinate information and the dot pattern portion (6) of the code numeric information are printed on a flat surface of the printed material (5).

The dot pattern portion (6) may be printed with an ink that absorbs infrared light, a carbon ink or a transparent ink.

When the camera unit (2) is used to capture image data of the dot pattern portion (6), the dot pattern portion (6) may be radiated with ultraviolet light.

Information to be output may be digital data including a voice, image, video and text code.

The configuration may be made to output a program in addition to the information of digital data.

The information transfer portion (7) to be printed on one surface together with the dot pattern portion (6) may be a text or an illustration.

The camera unit (2) may be an image pickup device such as a C-MOS camera or a CCD camera. Hereinafter, what is called "camera unit" may include any imaging means having such a configuration.

In addition, the camera unit (2) may be configured separated from the image processing portion (12), the storing portion (10), the processing portion (9) and the outputting portion (15) to carry out transmission via an interface portion. Here, the interface portion may include both function means having an integrally-formed CPU and sound source memory in abstract terms and function means such as a connector for exchanging data.

The camera unit (2) and the image processing portion (12) is configured separated from the storing portion (10), the processing portion (9) and the outputting portion (15) to carry out transmission and reception via an interface portion. Communication with the interface portion may be realized by wire communication, radio communication including wireless LAN and blue tooth, or optical communication such as infrared communication.

The printed material (5) on which the dot pattern portion (6) is printed may be attached to various mediums via an adhesive agent.

The storing portion (10) may store, in addition to information including a text, image and video, a program.

Such information and program may be stored in the storing portion (10) via an inputting portion (17). Accordingly, a use can store any voice information as associated with a given dot pattern portion (6) in advance.

This inputting portion (17) may be a microphone or a line-in interface.

Further, the configuration may be made to mount a communication card (16). Then, the numeric data obtained by digitalizing a dot pattern (1) scanned by the camera unit (2) may be transmitted to a computer (23) such as a server via the communication card (16).

This configuration may allow to store a huge amount of multimedia information in a server and reproduce various types of multimedia information via communication. More specifically, a network address (URL: Uniform Resource Locator) is defined on the dot pattern (1), the communication card (16) is used to establish communication to TCP/IP communication network (so-called Internet) and thereby voice data stored at the network address may be downloaded in the storing portion (10) to be reproduced.

Here, other than the communication card (16), a GPS (Global Positioning System) receiver (24) may be further provided. This makes it possible to reproduce multimedia information based on position information together with content scanned from the dot pattern (1).

A third aspect of the invention is an information inputting/outputting device using a portable-phone camera, comprising: a camera unit (102) for scanning only image data of the dot pattern portion (6) printed on the printed material (5), the dot pattern portion (6) formed by arranging in accordance with a given rule dots generated by a dot code generating algorithm in order to recognize various kinds of information and an information transfer portion (7) which includes a text, an illustration or the like to be recognized as information content being printed on one surface of the printed material; an image processing portion (112) for digitalizing the image data into numeric values; an interface portion (119) for transferring the digitalized numeric information so as to output from a portable phone (110) and execute information and a program corresponding to the dot pattern portion (6).

Since such a camera equipped portable phone is used, the information reproducing device can be configured simply.

Such a camera equipped portable phone may be an information-processing-device-integrated portable phone such as i-mode phone provided from NTT Docomo Inc. This information processing device includes a central processing unit, a storing device (memory), a liquid crystal display screen and the like. In the storing device (memory), a program, voice data, video data and text data can be stored. An operation system (OS) mounted on a portable phone may be Toron, Symbian, Windows CE available from Microsoft Corporation, LINUX, PALM-OS or the like.

Such a camera equipped portable phone may be configured so that a memory card such as an SD card, a memory stick, a SIMM card can be mounted on the portable phone and further, content data is recorded in the memory card to be reproduced.

A fourth aspect of the invention is a portable electronic toy comprising: a voice storing portion (804) for storing a voice corresponding to a dot pattern portion (803) formed on a medium (802) including a book, a game card, a small article and a toy, the dot pattern portion (803) on which numeric data or code information are recoded in order to recognize various voices; a camera (810) for capturing image data of the dot pattern portion (803); a processing portion (806) for processing the image data captured by the camera (810) and reading voice data corresponding the numeric data out of the voice storing portion (804) to output the voice data by use of a speaker (805); and a case main body (808) for housing the voice storing portion (804), the speaker (805) and the processing portion (806).

This case main body (808) may be configured to be of organizer size. Besides, the case main body (808) may be provided with an LC display (812).

Further, the dot pattern portion (803) can be printed on a versus game card. Or, the dot pattern portion (803) may be formed on a miniature figure (hereinafter referred to as "mini figure") of an animation character on sale in convenience stores and the like as a candy toy or a seal on which the dot pattern portion (803) is printed may be attached to such a mini figure.

Furthermore, in order to allow intercommunication between plural portable electronic toys (821), a connector for a connection cable may be provided on the case main body (823). In this case, the connector may be a USB connector or any connector in conformity with IEEE 1394. Further, communication may be used by Blue tooth, wireless LAN or infrared data communication.

A fifth aspect of the invention provides a configuration with an information outputting function by camera inputting, in a figure (218) of a given shape, the configuration comprising: a camera (202) for scanning only image data of a dot pattern portion (6) printed on a printed material (5), the dot pattern portion (6) formed by arranging in accordance with a given rule dots generated by a dot code generating algorithm in order to recognize information and an information transfer portion (7) which includes a text, an illustration or the like to be recognized as information content being printed on one surface of the printed material; an image processing portion (212) for digitalizing the image data into numeric values; and a processing portion (209) and an outputting portion (215) for outputting and executing information and a program of a storing portion (210) corresponding to the dot pattern portion (6) based on the numeric values processed by the image processing portion (212).

Besides, a speaker (214) may be provided as an outputting portion (215) to output a voice.

Further, the storing portion (210) may be configured to store information and a program from the outside by use of a microphone (217).

Further, the figure (218) may be configured to be a stuffed toy (231) made by stuffing an elastic material in an outer skin of a predetermined shape.

Furthermore, the configuration with an information outputting function by camera inputting may include in a figure (218): a camera unit (A) configured by including a camera (202) for capturing only image data of a dot pattern portion (6) printed on a printed material (5), the dot pattern portion (6) formed by arranging in accordance with a given rule dots generated by a dot code generating algorithm in order to recognize information and an information transfer portion (7) which includes a text, an illustration or the like to be recognized as information content being printed on one surface of the printed material and an main processor (209) digitalizing the image data into numeric values; an outputting unit (B) including a processing portion (9) and an outputting portion (15) for outputting and executing information and a program of a storing portion (10) corresponding to the dot pattern portion (6) based on the numeric values processed by the image processing portion (12) in the camera unit (A); and an interface portion for mediating communication between the camera unit (A) and sand outputting unit (B).

BRIEF DESCRIPTION OF THE DRAWINGS

FIG. 1(a) is an explanatory view of dot code generation and FIG. 1(b) of dot pattern recognition.

FIG. 4(a) is an explanatory view of dot code generation while FIG. 4(b) is of dot pattern recognition.

FIG. 16(a) is a plane view and FIG. 16(b) is a side view.

FIG. 17(a) is a plane view and FIG. 17(b) is a side view.

FIG. 21(a) is an explanatory view of dot code generation and FIG. 21(b) of dot pattern recognition.

FIG. 31(a) is a perspective view showing the whole case, FIG. 31(b) is a plane view, FIG. 31(c) is a side view and FIG. 31(d) is an elevation view.

FIG. 35(a) shows a pen type camera unit, FIG. 35(b) shows a pen type camera unit, FIG. 35(c) shows a mouse type camera unit and FIG. 35(d) shows a stethoscope type camera unit.

FIG. 51 is a functional block diagram of a portable electronic toy showing an embodiment which utilizes a shooting pen of a camera or the like.

FIG. 56(a) is a view of a doll, FIG. 56(b) is of a soccer ball, FIG. 56(c) is of a bicycle and FIG. 56(d) is of an animal.

FIG. 63 is a perspective view for showing information dots of four blocks.

BEST MODE FOR CARRYING OUT THE INVENTION

Figure 1:
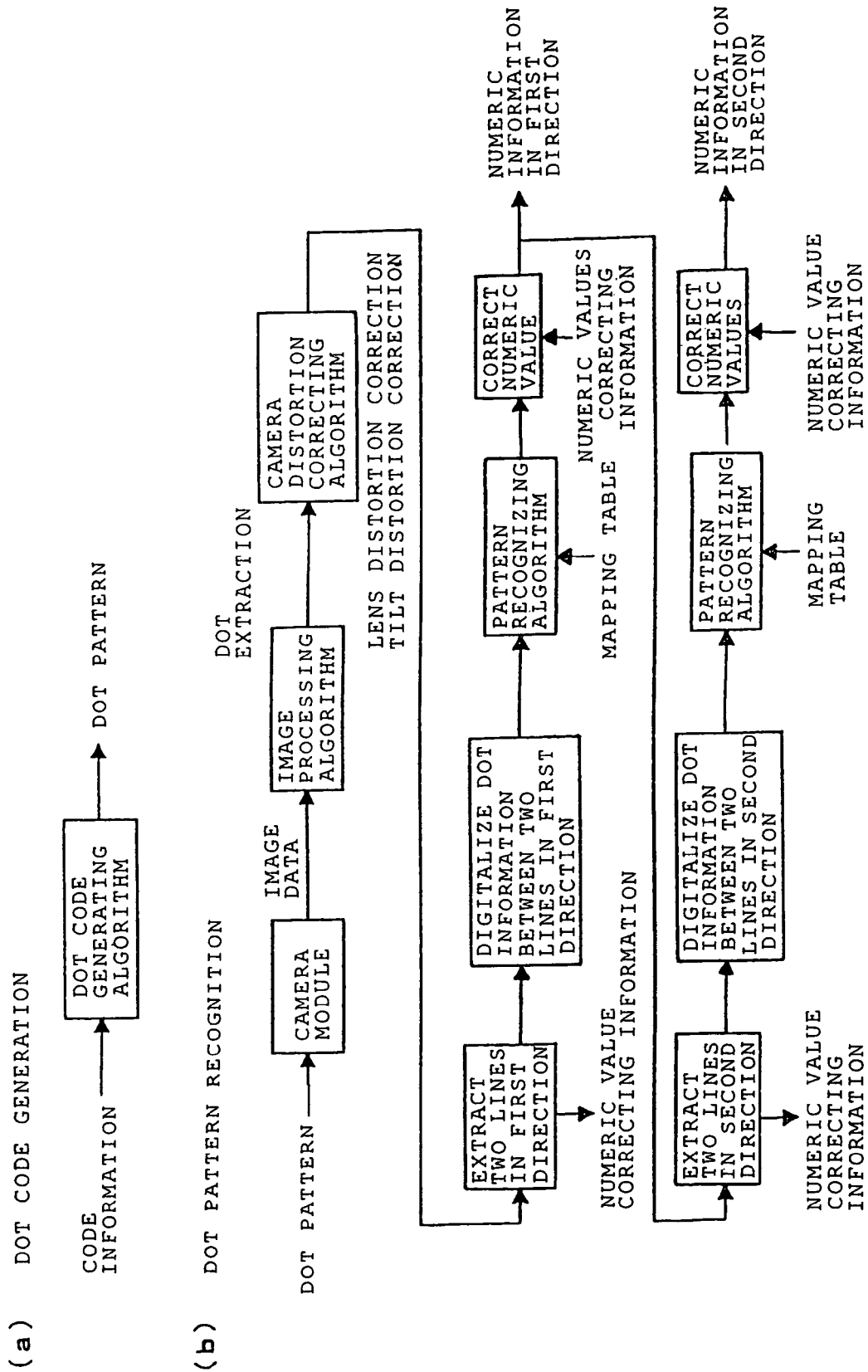
FIGS. 1(a) and 1(b) are block diagrams each for illustrating a configuration of an information reproducing method using a dot pattern according to the present invention, and more specifically.
Figure 2:
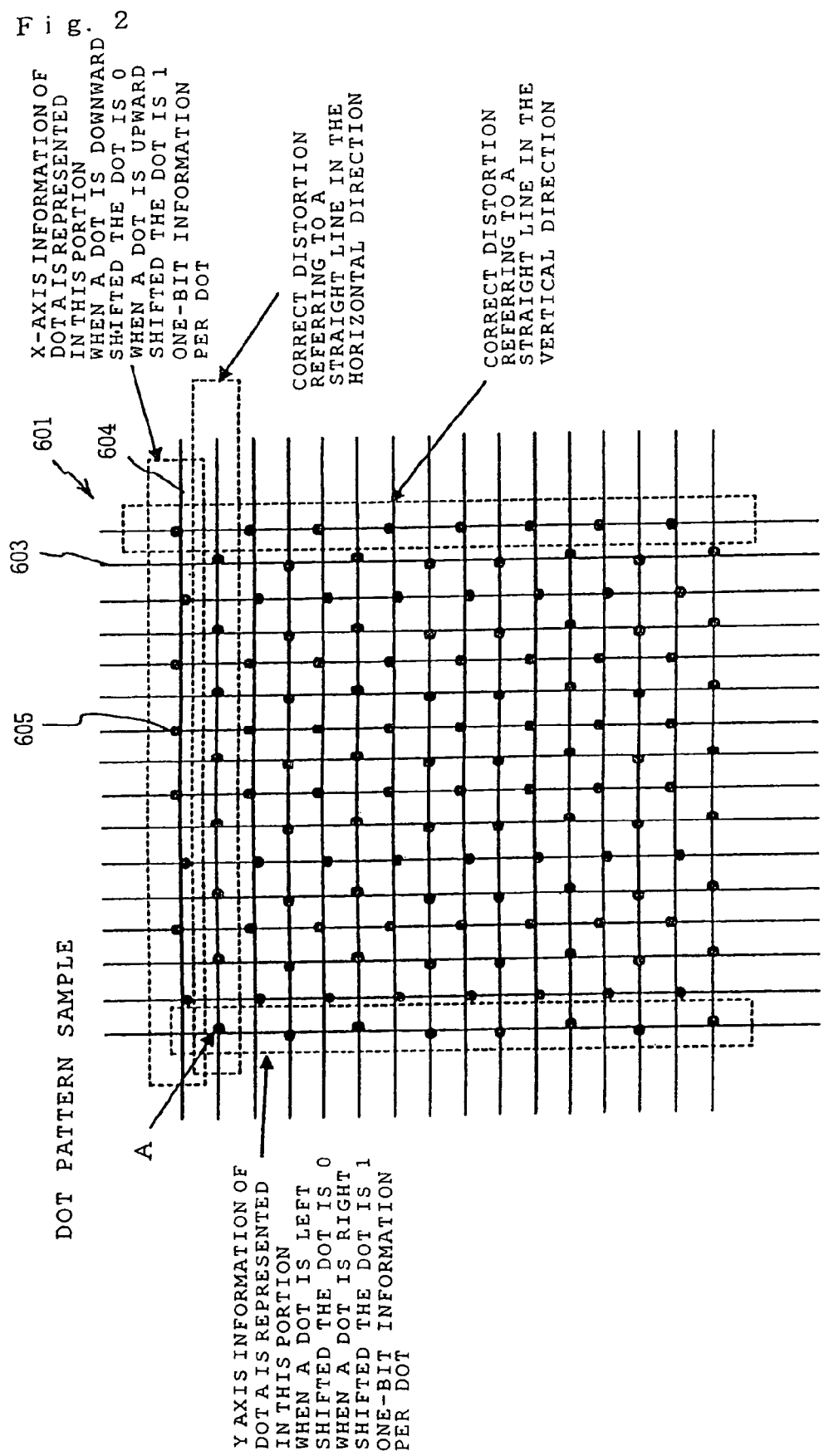
FIG. 2 is an elevation view illustrating an example of the dot pattern.

FIGS. 1(a) and 1(b) are block diagrams each showing a configuration of an information reproducing method using a dot pattern of the present invention and specifically, FIG. 1(a) explains generation of a dot code and FIG. 1(b) explains recognition of a dot pattern. FIG. 2 is an elevation view illustrating an example of a dot pattern and FIG. 3 is a functional block diagram for explaining a state of a picture book and the information reproducing method.

The information reproducing method using a dot pattern of the invention includes generation of a dot pattern 601, recognition of the dot pattern 601 and reproducing of voice information corresponding to the dot pattern 601. Specifically, image data of the dot pattern 601 is scanned by a camera 602, which is scanning means, a distortion factor on the image is corrected, the image is converted into numeric values to be digitalized, the digitalized numeric values are divided into a first direction 603 and a second direction 604, its position is read, and voice information corresponding to the dot pattern 601 is then reproduced on a personal computer (hereinafter referred to as "PC") 608, PDA, portable phone or the like.

Figure 3:
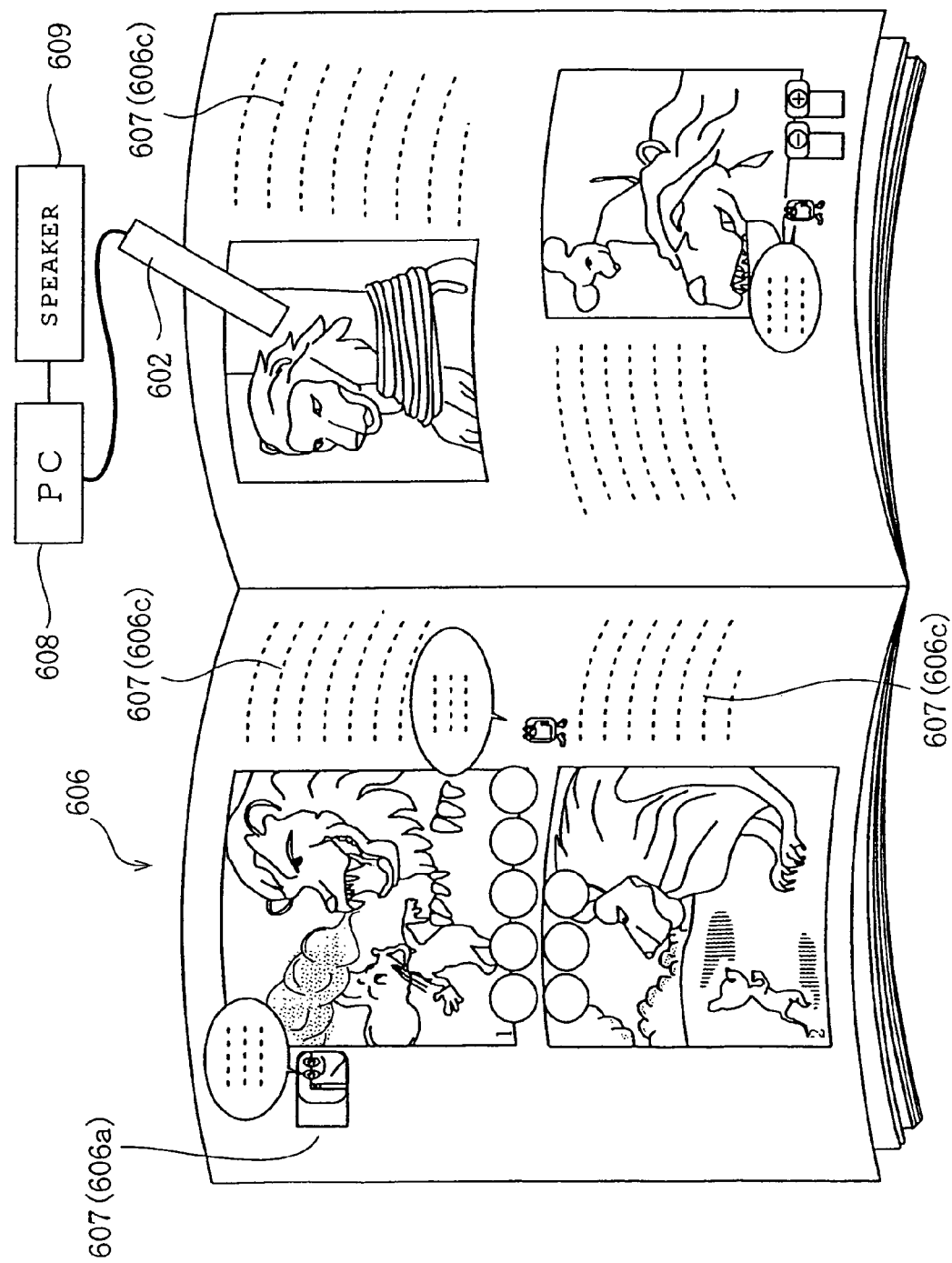
FIG. 3 is a functional block diagram for explaining a state of a picture-book and the information reproducing method.

The camera 602 of FIG. 3 is configured by a pen type scanner, and an image pickup device such as CCD or C-MOS is integrated in the camera. However, the camera can be implemented by a digital camera or a camera mounted on a mobile terminal including a portable phone, as described later.

Generation of the dot pattern 601 according to the invention is performed in such a manner that: in order to recognize voice information, small dots 605 are arranged, by a dot code generating algorithm, in a first direction line 603 in accordance with a predetermine rule, and arranged in a second direction line 604 perpendicular to this first direction line 603 in accordance with a predetermined rule. Then, a mapping table is also generated in a memory in the PC 608 or a memory provided in a camera 602. This first direction line 603 and the second direction line 604 are not limited to those perpendicular to each other, however, they can be crossed forming an angle of 60 degree, for example.

Recognition of the dot pattern 601 includes correction of a distortion factor by a lens of the camera 602, correction of a distortion caused by tilt of the camera 602, reproducing of numeric information in the first direction 603 and reproducing of numeric information in the second direction 604. The image data of the dot pattern 601 is captured by using the camera 602 which has an image pickup device such as a C-MOS camera and a CCD camera. The pen type scanner may be replaced by a portable phone equipped with a camera or a camera connected to a portable phone. In the case of such portable phones, control of a JAVA program and the like downloaded in a memory of the portable phone is utilized to reproduce a voice as it is. The image data captured by the camera 602 is processed by an image processing algorithm to extract dots 605, which are subjected to correction of a distortion factor by a lens of the camera 602 by a distortion correcting algorithm. Or, distortion by tilt of the camera 602 with respect to the dot pattern 601 is corrected.

The image data captured by the camera 602 is processed by a CPU (central processing unit) of the PC 608 using a predetermined image processing algorithm to extract dots 605. Since distortion caused by the camera 602 itself is corrected by the distortion correcting algorithm. Therefore, even when image data of the dot pattern 601 is captured by a common camera 602 equipped with a lens high in distortion factor, accurate recognition is possible. Also even when the dot pattern 601 is tilt with respect to the screen and scanned by the camera 602, the dot pattern 601 can be accurately captured.

Reproducing of numeric information in the first direction 603 is carried out in such a manner that: two lines of the first direction 603 are extracted, dot information between the two lines of the first direction 603 is digitalized, a pattern thereof is recognized by a pattern recognizing algorithm and numeric information in the first direction 603 is reproduced using a mapping table. In reproducing, if line reading cannot be carried out accurately by smudges or noise, a next line is extracted and the same processing is performed. Its information is recorded as numeric correcting information, which is used in correcting when the numeric information is reproduced.

Reproducing of numeric information in the second direction 604 is carried out in such a manner that: two lines of the second direction 604 is extracted, dot information between the lines of the second direction line 604 is digitalized, a pattern thereof is recognized by a pattern recognizing algorithm and numeric information in the second direction 604 is reproduced using a mapping table. In reproducing, if line scanning can not be carried out accurately by smudges or noise, a next line is extracted and the same processing is performed. Its information is recorded as numeric correcting information, which is used in correcting when the numeric information is reproduced.

The aforementioned dot pattern 601 is configured of a dot pattern portion 607 printed on a printed material 606 such as a picture book and a text book. Image of this dot pattern portion 607 is recognized by the camera 602, corresponding voice information is read from a memory based on numeric data extracted from the image data, and corresponding voice and music are reproduced by outputting means such as a speaker 9 of the PC 608, a PDA or portable phone.

Figure 4:
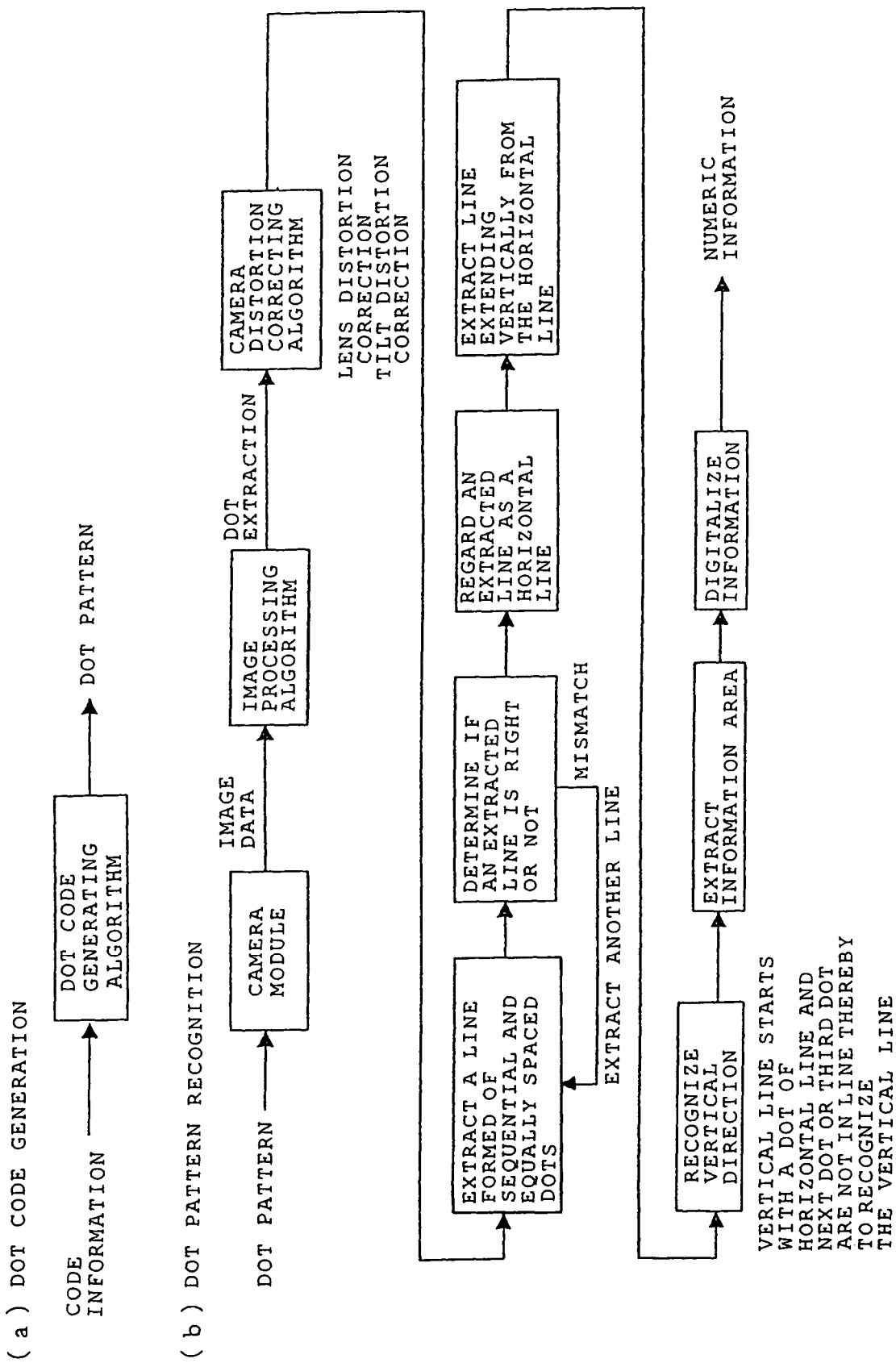
FIGS. 4(a) and 4(b) are block diagrams each illustrating another configuration of the information reproducing method using a dot pattern, and specifically.
Figure 5:
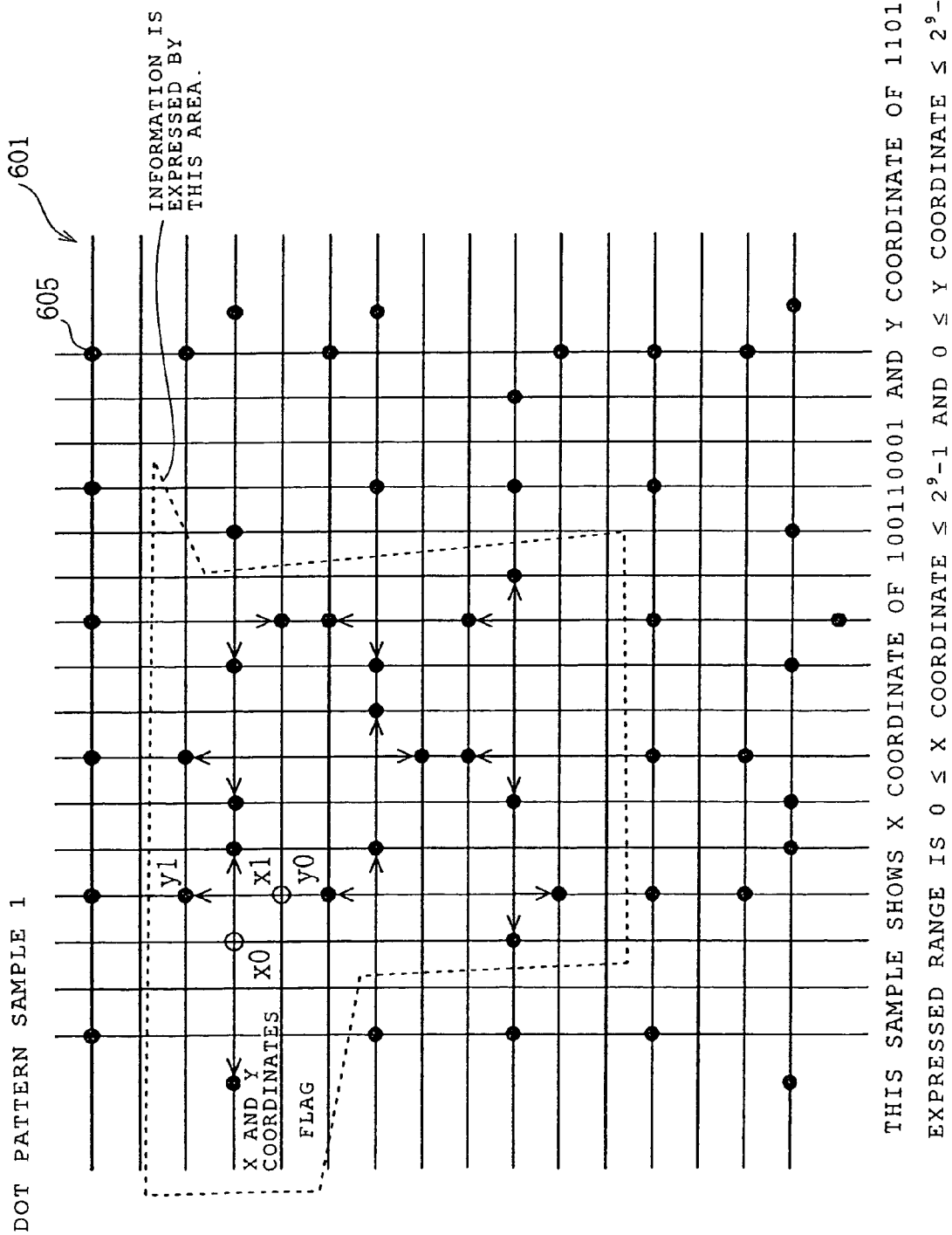
FIG. 5 is an elevation view illustrating another example of dot pattern.
Figure 6:
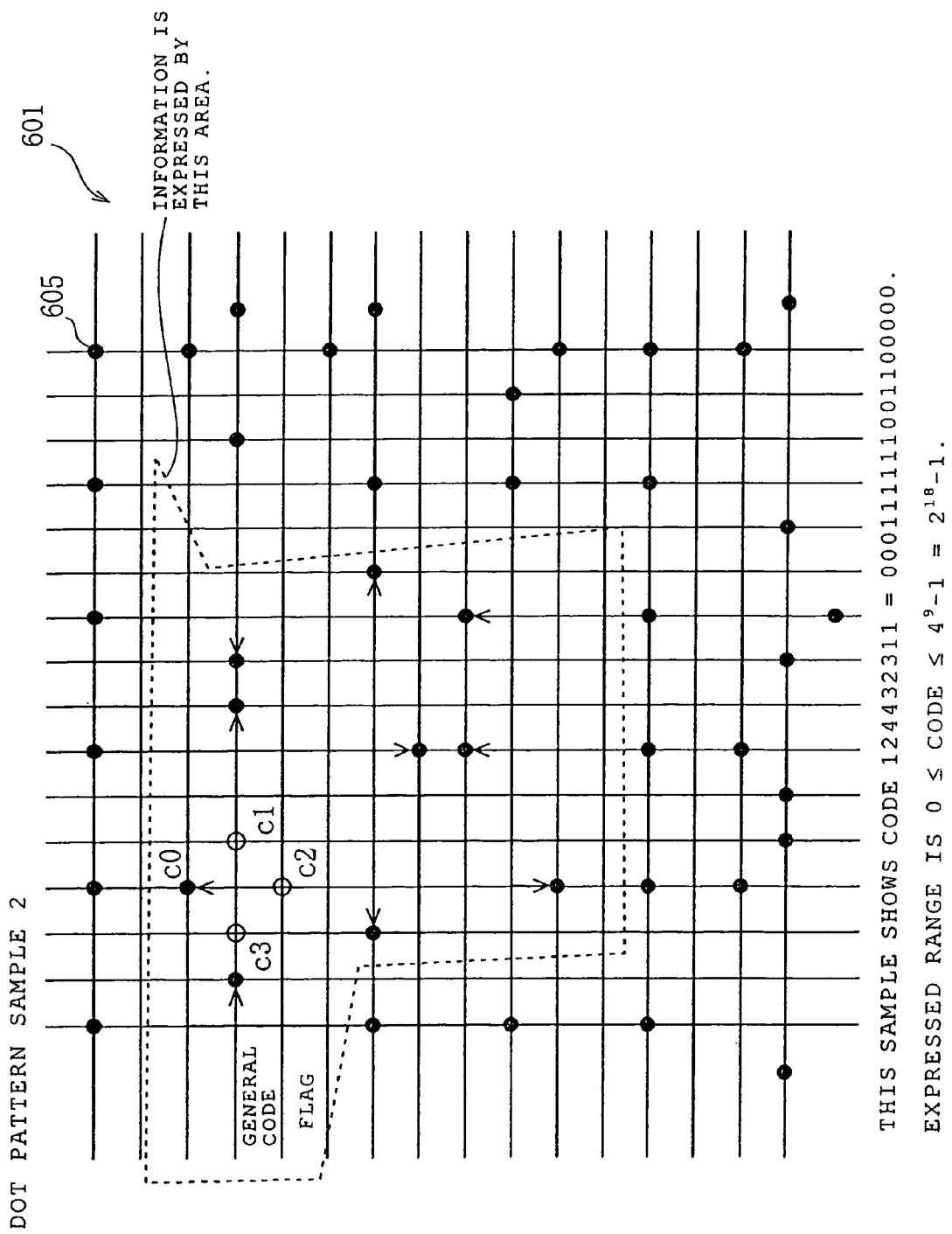
FIG. 6 is an elevation view illustrating another example of dot pattern.
Figure 7:
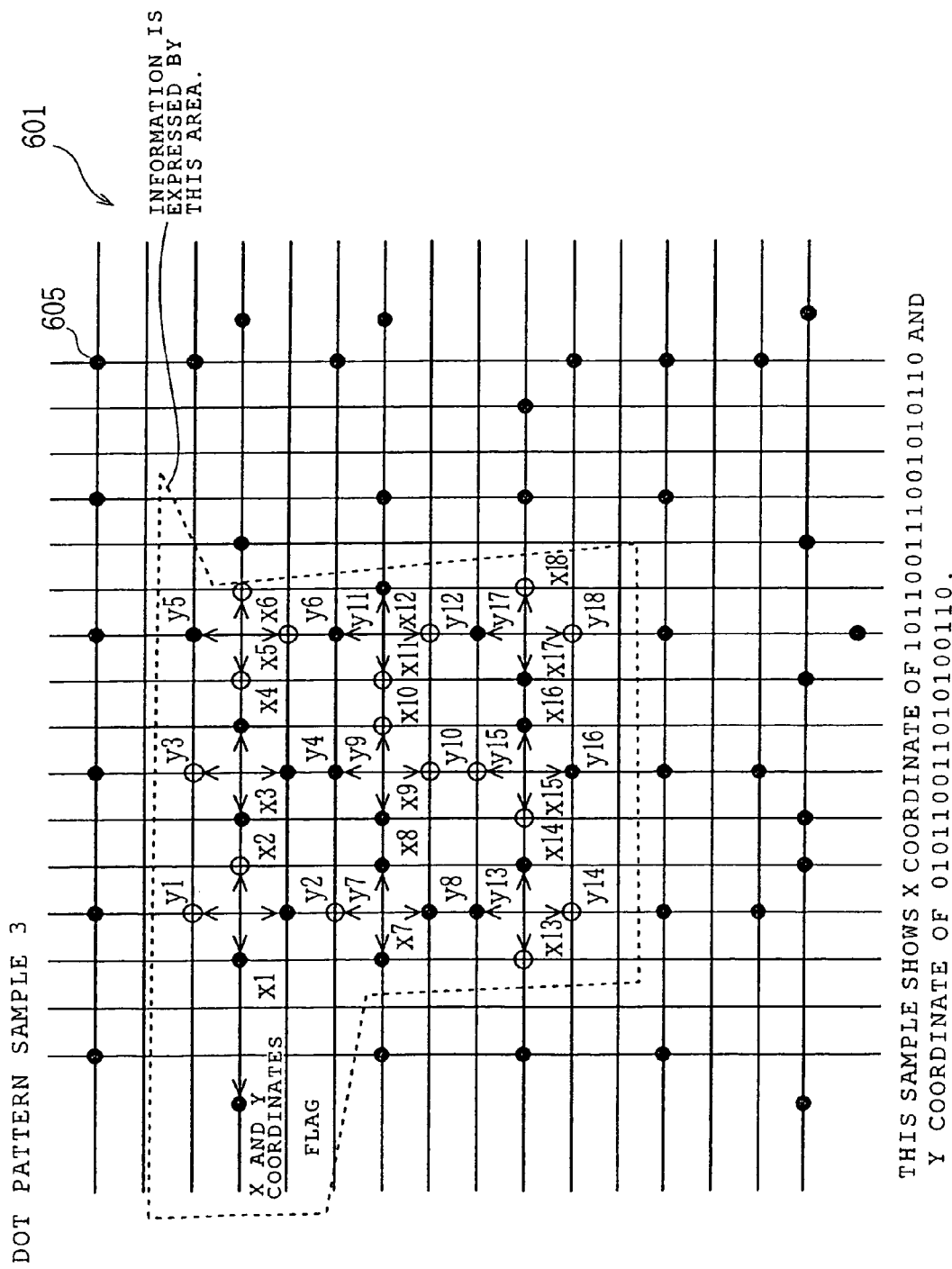
FIG. 7 is an elevation view illustrating another example of dot pattern.
Figure 8:
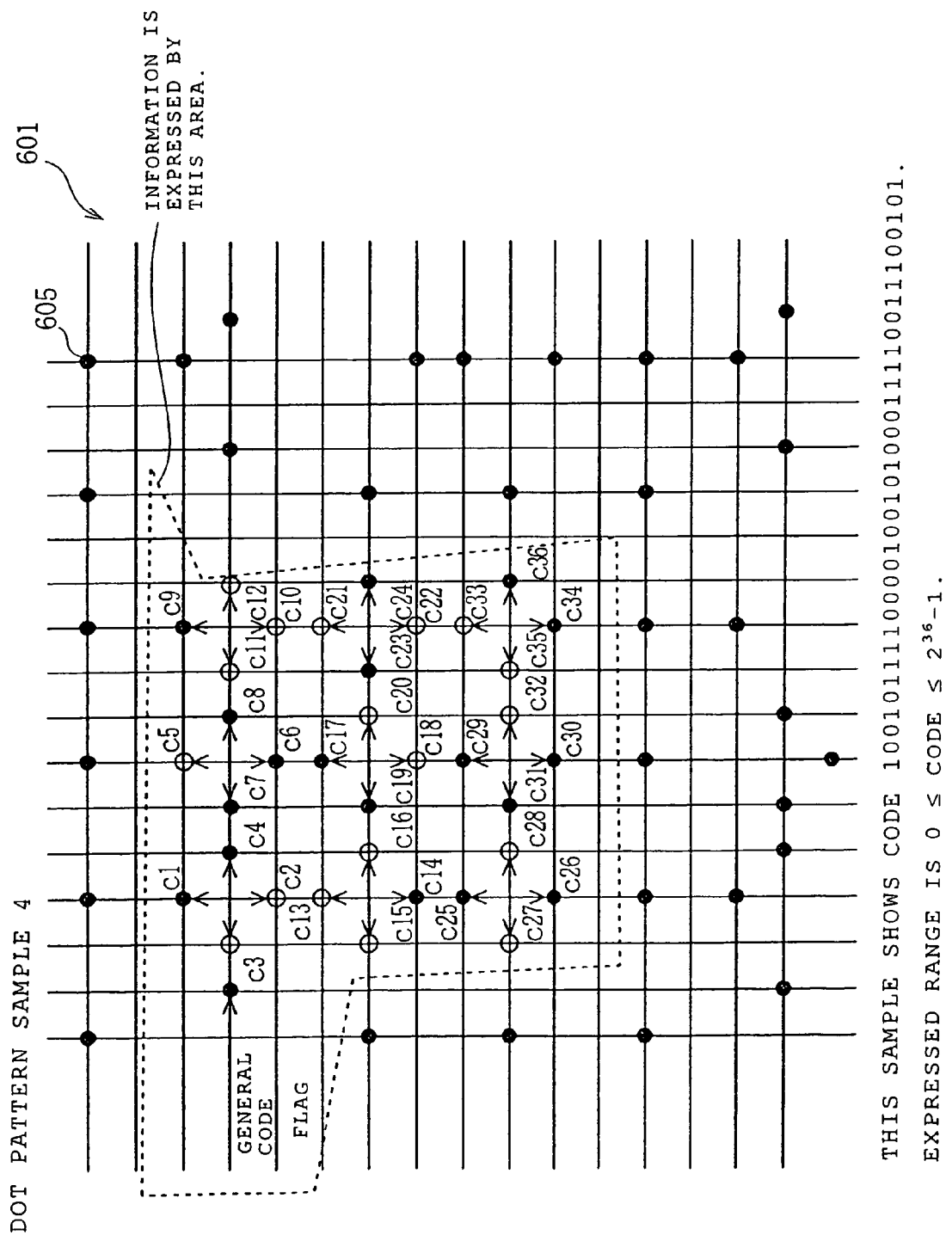
FIG. 8 is an elevation view illustrating another example of dot pattern.

FIGS. 4(*a*) and 4(*b*) are block diagrams each illustrating another configuration of an information reproducing method using a dot pattern and more specifically, FIG. 4(*a*) a view for explaining generation of a dot code and FIG. 4(*b*) is a view for explaining recognition of a dot pattern. FIGS. 5 through 8 are elevation views each showing another example of a dot pattern.

As mentioned above, image data captured by a camera 602 is subjected to processing by image processing algorithm to extract dots 5. Since distortion caused by the camera 602 and distortion due to tilt of the camera 602 are corrected by the distortion correcting algorithm, accurate recognition is possible in capturing the dot pattern 601.

In recognition of the dot pattern, first, a line composed by successive equally spaced dots 5 is extracted, and it is determined whether or not the extracted line is correct. If the line is not correct, another line is extracted.

Next, one extracted line is assumed as a horizontal line. This horizontal line is used as a basis to extract a line which extends vertically from the horizontal line. A vertical line starts from a dot which consists in the horizontal line and the vertical direction is recognized from the fact that the next dot or the third dot is not on the line.

Finally, an information area is extracted and information thereof is converted into numeric values to reproduce this numeric information.

Figure 9:
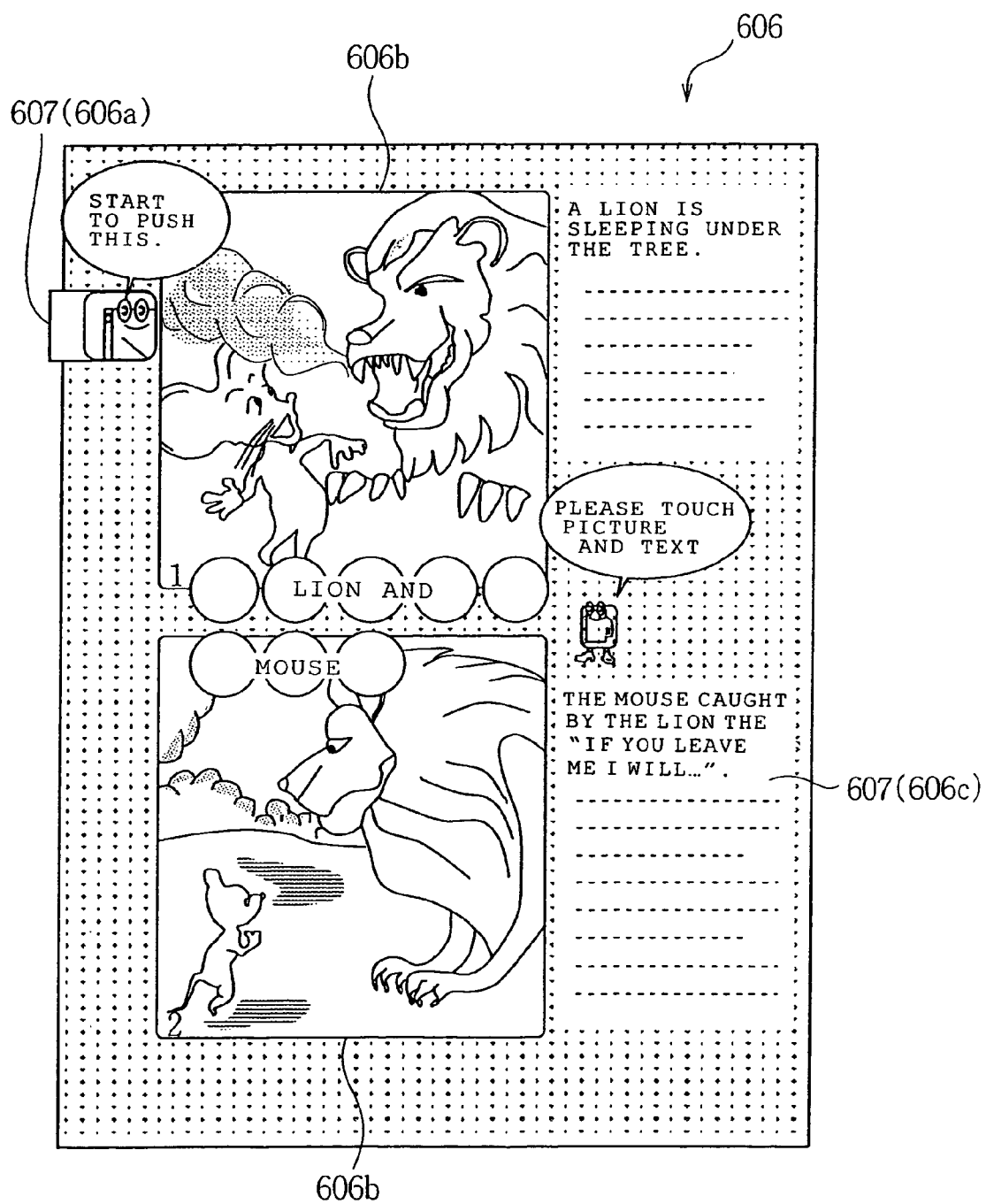
FIG. 9 is an elevation view illustrating an example of a picture book on which a picture of and a text of a story are printed.

FIG. 9 is an elevation view illustrating an example of printing of pictures of a picture book and story texts.

In such a page, an icon 606*a* at the upper left side of the page is scanned by the camera 602 and a switch is turned on. Next, a text portion 606*c* printed of the story corresponding to the picture 6*b* is scanned by the camera 602. Since dot pattern portions 607 are printed on the icon 606*a* and the text portion 606*c*, these dot pattern portions 607 are used to recognize of which area, on which page of the picture book the information is and to make PC 608 reproduce correspondingly-stored voice of the story. For example, dots 5 of the dot pattern portion 607 is printed with a carbon ink while the other portion is printed with a non-carbon color ink so as to be scanned by irradiation of infrared light.

Figure 10:
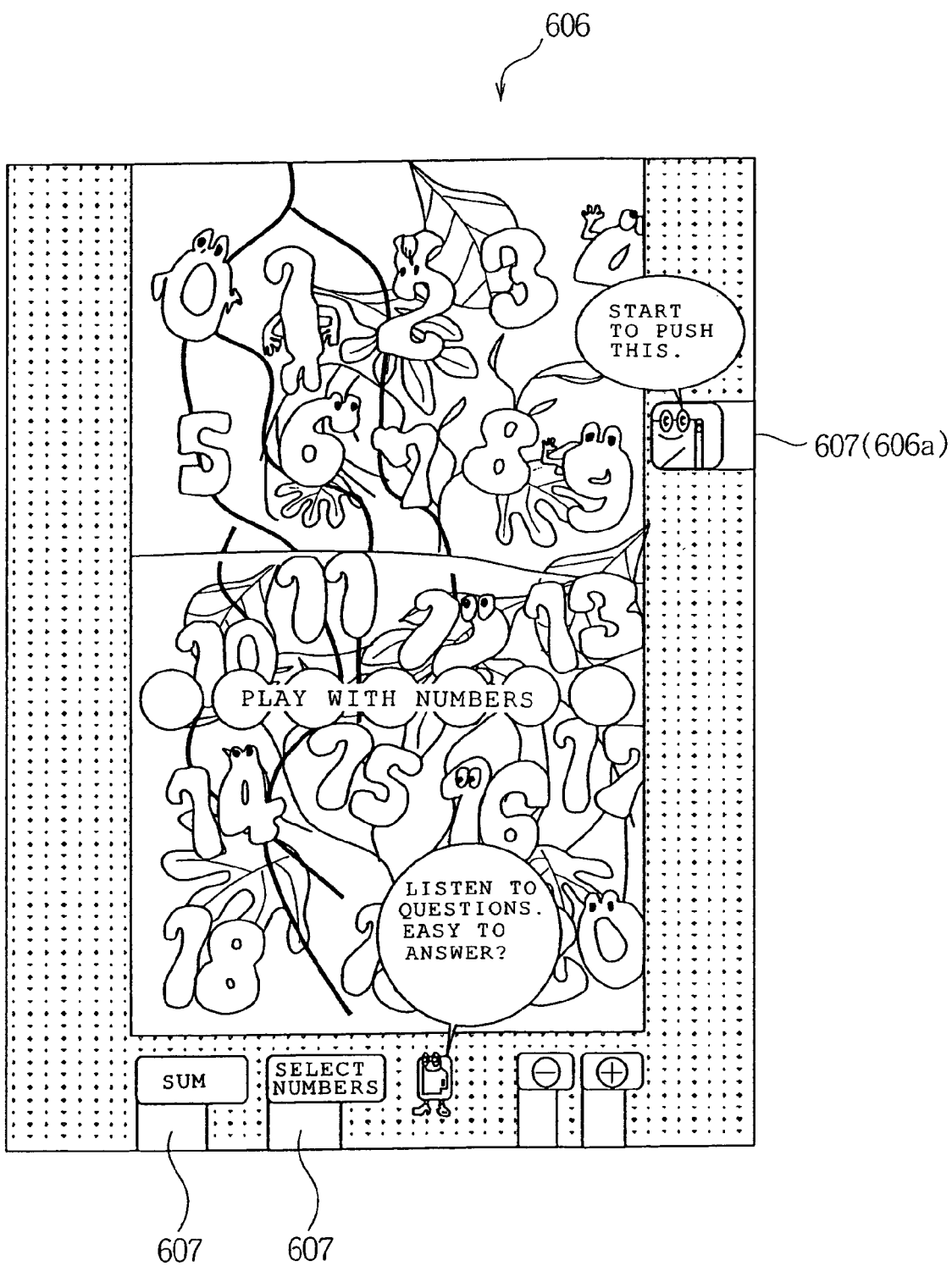
FIG. 10 is an elevation view illustrating another example of a picture book on which pictures and story texts are printed.

FIG. 10 is an elevation view illustrating another example of a picture book on which pictures and story texts are printed.

Figure 11:
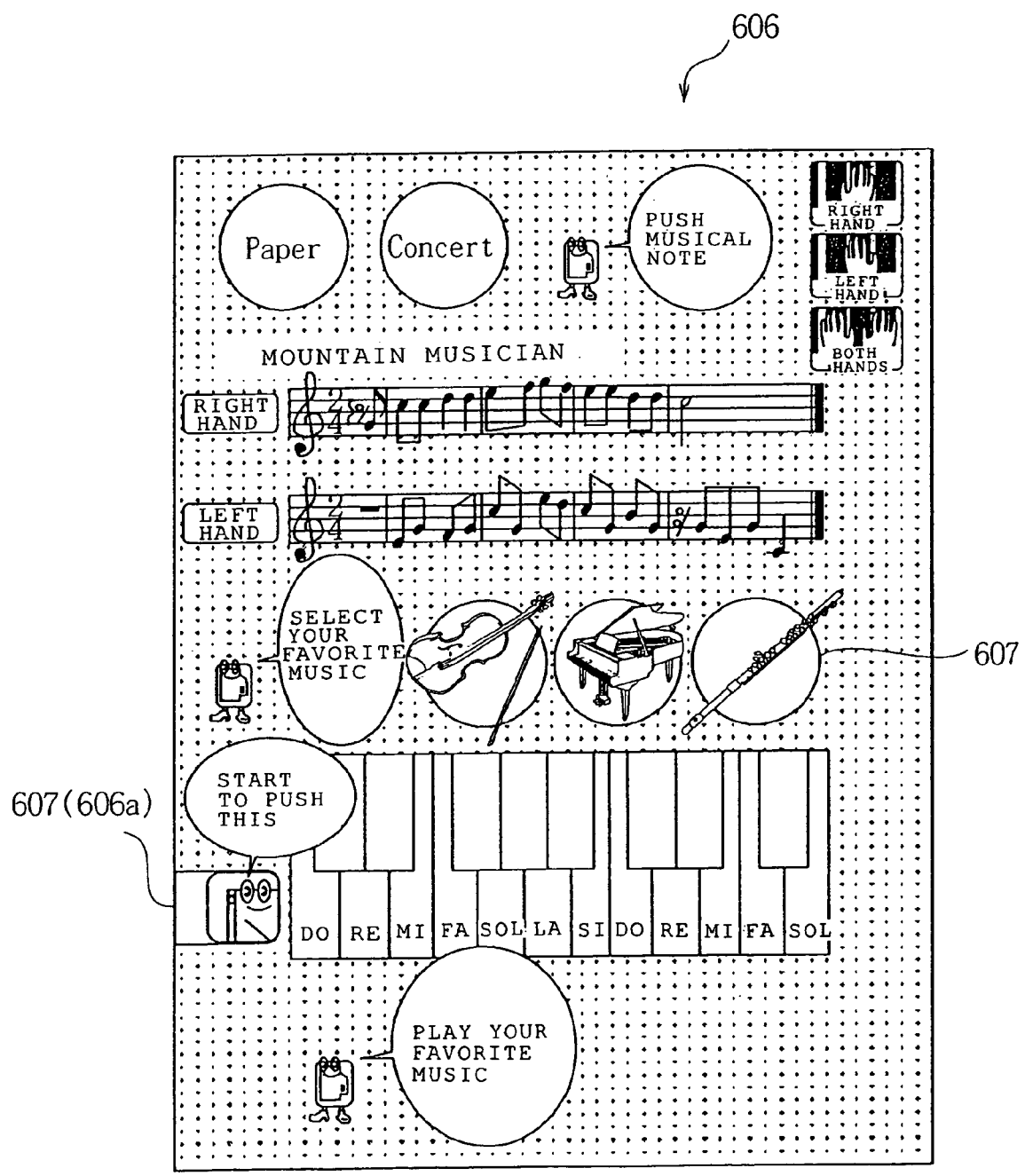
FIG. 11 is an elevation view illustrating still another example of a picture book on which pictures and story texts are printed.

FIG. 11 is an elevation view illustrating still another example of a picture book on which pictures and story texts are printed.

The information reproducing method using a dot pattern according to the invention is not limited to a story based picture book, and can be applied to an educational material for teaching mathematics in an easily understood manner as shown in FIG. 10. Also as illustrated in FIG. 11, the information reproducing method according to the invention can be applied to an educational material for teaching music in an easily understood manner.

Stored in a memory of a PC 608, a PDA or a portable phone is a content which can be utilized as a picture book emitting music and conversation of central characters and the like as well as pictures of a picture book. Also can be stored are a content which can be utilized an educational material emitting a voice in combination with a toy such as assembly blocks and a content for storing which can be used as a dictionary software for translating by tracing words and text in a foreign language.

The information reproducing method using a dot pattern according to the invention can be further utilized in the following way.

"Pop Picture Book which Generates Voice"

Taking advantage of a feature that the camera 602 has only to scan or abut on the dot pattern portion 607, the information reproducing method according to the invention can be combined in a "pop picture book" which makes a three-dimensional material appear when a page is opened. After the page is opened, the dot pattern portion 607 is attached to or printed on the inside of the three-dimensional material. When this dot pattern portion 607 is searched and an end of the camera 602 is abutted to the dot pattern portion 607, various voices are outputted, thereby producing a "pop picture book which outputs a voice". For example, when the page is opened, a "horror house" is opened by pop-up. When a dot pattern portion 607 at a window is traced by the camera 602, a voice of scream of a woman such as "yipe" is reproduced. When a dot pattern portion 607 at a hall is traced by the camera 602, a voice of ominous footstep such as "tap tap" is reproduced.

"Creative Picture Book (Creative Book)"

A dot pattern portion 607 can be attached to a desired portion of a picture book which is a printed material 6. As the dot pattern portion 607 for a user himself to create content is attached, is can be used as a "creative picture book (creative book)" which is able to set a switch anywhere. For example, a user can create an original story by attaching a dot pattern portion 607 of a set of a picture book, a speech collection, a sound list, sound source data and the like a dot pattern portion 607 of voice or music as a user like to the picture book 6.

Further, a seal of a sound source list or an icon seal with a dot pattern portion 607 formed thereon is prepared, a user draws a picture on a picture book which has nothing drawn in advance, and then the user attaches the seal to the picture book to create an original story. With this configuration, a user himself can create a picture book which outputs a voice.

"Educational Material which Outputs Voice"

The invention can be used as an "educational material which outputs a voice" dedicated for children, adults, aged people in any generation. For example, an end of the camera 602 is abutted to a dot pattern portion 607 of a printed material 606 and the dot pattern portion 607 is scanned to reproduce a voice. With such a configuration, the invention can be used as language education such as English conversation, child education such as intellectual education and music and teaching aid such as a drill.

Since the invention can be used as an input interface printed on a printed material 606 or the like, it is possible to manufacture an interface suitable for each content. Further, it is configured to download dot pattern data to the PC 608 via the general-purpose network such as Internet, when a user freely combines dot pattern data and prints a dot pattern on a paper sheet by a general-purpose printer, then, the user himself can create such a "picture book which outputs a picture" as mentioned above.

Further, URL information can be defined on a dot pattern portion 607 of the printed material 606 or another medium. When the URL information is extracted from image data obtained by taking a picture of the dot pattern 607 by a camera 602, a browser program installed in the PC 608 accesses to the aforementioned URL to carry out a predetermined operation.

Figure 12:
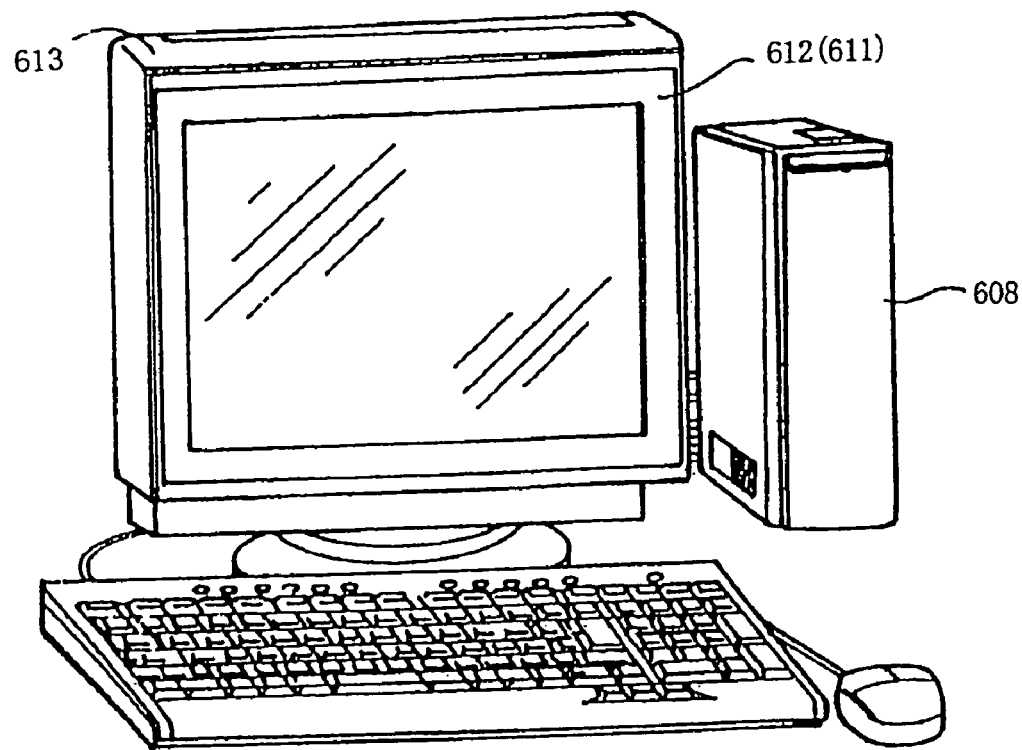
FIG. 12 is a perspective view for explaining a touch panel on which a dot pattern portion is formed.
Figure 13:
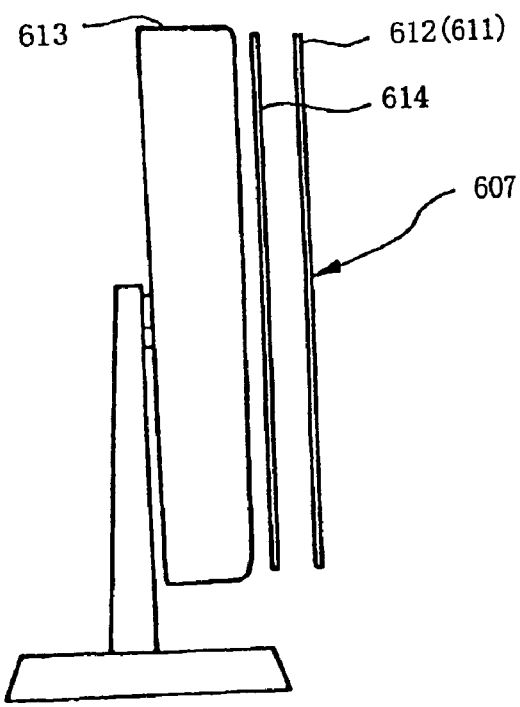
FIG. 13 is an exploded side view for explaining a touch panel on which a dot pattern portion is formed.

FIG. 12 is a perspective view for explaining a touch panel with a dot pattern portion 607 formed thereon. FIG. 13 is an exploded lateral view for explaining a touch panel with a dot pattern portion 607 formed thereon.

A conventional touch panel is configured to be arranged on a monitor screen such as an LCD (liquid crystal display) or a CRT (cathode-ray tube) so that position input to the touch panel is carried out by pushing from above by a finger, a pen or the like following the instruction on the screen seen through. This conventional touch panel has a pair of an upper electrode sheet and a lower electrode sheet, which have transparent electrodes of ITO or the like, arranged opposed to each other on a transparent film, for example, with a spacer which serves as an insulator between the electrodes. Then, a transparent maintaining plate composed of a resin is bounded on a lower surface of the lower electrode sheet via a transparent adhesive layer. However, this presents defects of high cost and difficulty in use due to curling of the surface caused by long-time use.

Then, in order to avoid high cost, a touch panel 612 which has a transparent film 611 with a dot pattern portion 607 printed thereon and a popular camera 602 (pen type scanner) are only used.

This touch panel 612 is arranged on a screen of a monitor 613 such as an LCD (liquid crystal display) or a CRT (cathode-ray tube) of a PC 608 or the like. Then, tracing by the camera 602 is performed following the instruction on the screen thereby to perform position inputting. Thus, the camera 602 is faced to the touch panel 612 attached onto the monitor screen to capture image data of the dot pattern portion 607. Information corresponding to the dot pattern 607 is recognized on the monitor screen of the PC 608, and various voices or the like stored in the PC are reproduced correspondingly.

Dots 5 of the dot pattern portion 607 have a characteristic such that it easily absorbs light when the main component is a carbon. Unless a light beam from the monitor screen is cut off, the image data of the dot pattern portion 607 can not be accurately captured by the camera 602. Then, an infrared cutoff film 614 is arranged between the monitor screen and the touch panel 612 thereby to cut off infrared light emitted from the monitor screen. With this configuration, infrared light emitted from the inside of the camera is only treated as irradiation light, and light reflected from the dots 5 is easy to be recognized thereby facilitating recognition of the dot pattern portion 607, and it can be used as a touch panel of the PC 607.

This touch panel 612 enables the camera 602 to be used as a pointer device. Further, by recognizing points successively, it can be used as a trace device. For example, if this touch panel 612 is arranged upward, it can be used as a conventional writing table for tracing.

Here, the above-mentioned touch panel is explained as it is mounted on the monitor screen of the PC 608, however, it can be utilized on a display of a PDA, a screen of photographic seal distributor, a screen of an ATM terminal of a bank and the like.

Figure 14:
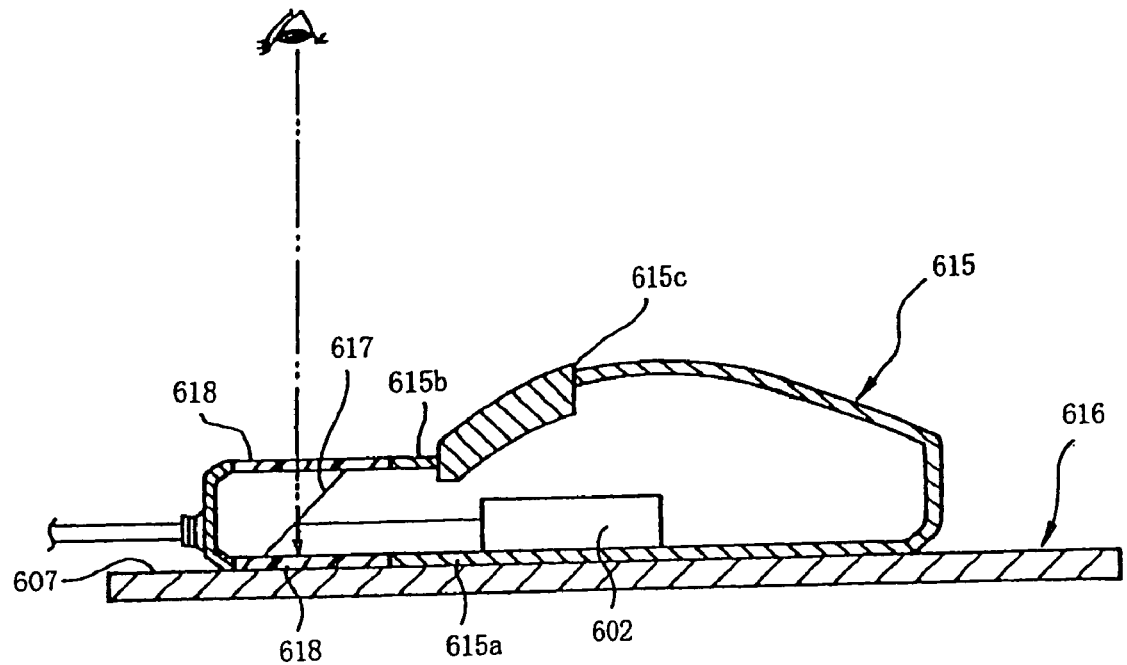
FIG. 14 is a cross sectional view for explaining another embodiment including a mouse pad on which a dot pattern portion is formed and a mouse type camera.
Figure 15:
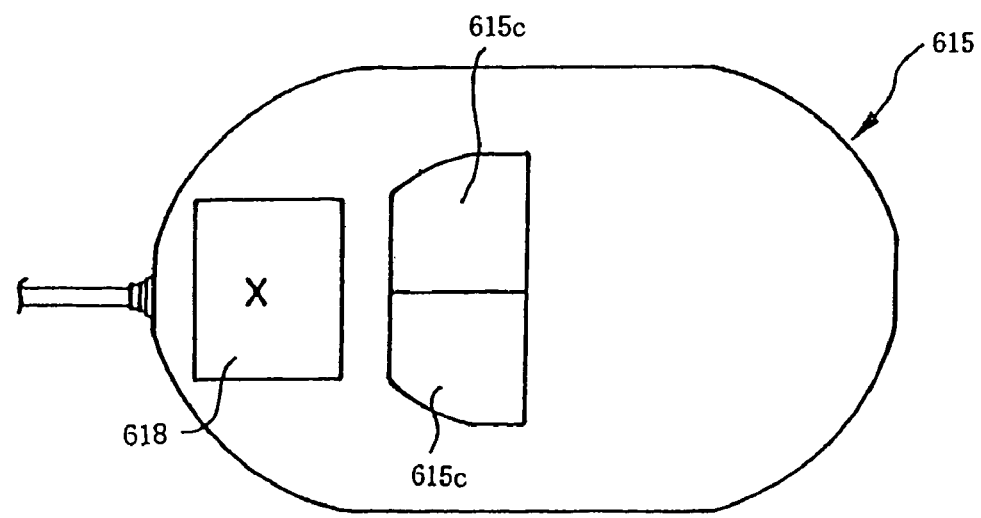
FIG. 15 is a plane view for illustrating a mouse type camera.

FIG. 14 is a cross sectional view illustrating another embodiment including a mouse type camera and a mouse pad with a dot pattern portion 607 formed thereon. FIG. 15 is an elevation view illustrating a mouse type camera.

According to this embodiment, a camera 602 is integrated in a mouse-shaped case 615 and combined with a mouse pad 616. A semi-transparent mirror member 617 is mounted inside the mouse-shaped case 615 so as to recognize a surface of the mouse pad 616 via a lower surface 615a of the mouse-shaped case 615 and a dot pattern portion 607 with coordinate information printed on the mouse pad 16 is traced through an open window 618 mounted on the upper surface 615b of the case 615. A button 615c is provided near the window 618.

The camera 602 in the mouse-shaped case 615 can be used, when recognizing a mouse pad 616, as an input device in place of a regular mouse. Specifically, the regular mouse can be used to input relative coordinates only, while the camera 602 further allows inputting of absolute coordinates.

Figure 16:
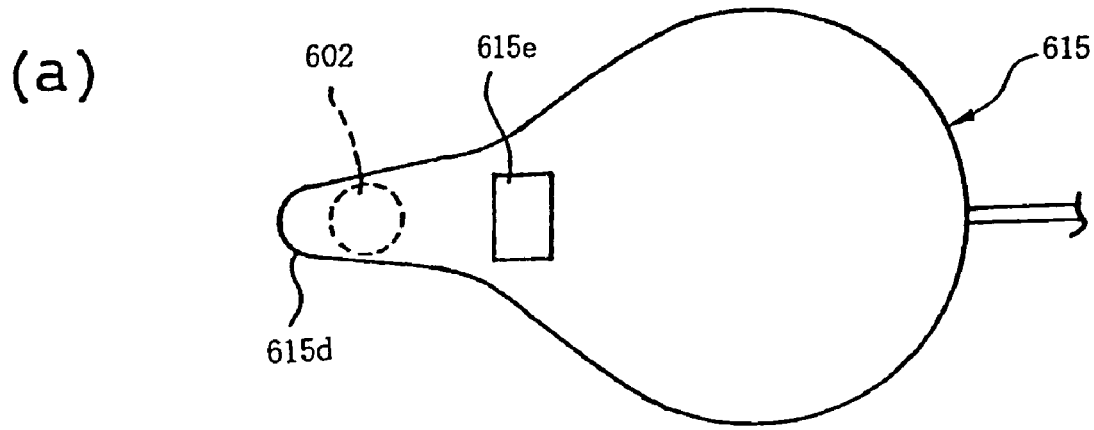
FIGS. 16(a) and 16(b) are views each illustrating another embodiment of the mouse type camera and more specifically.
Figure 16:
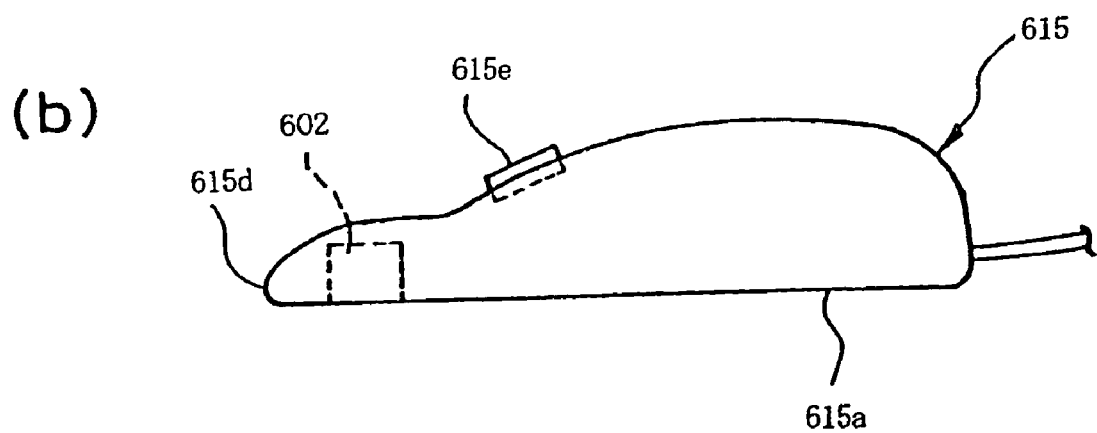
Figure 17:
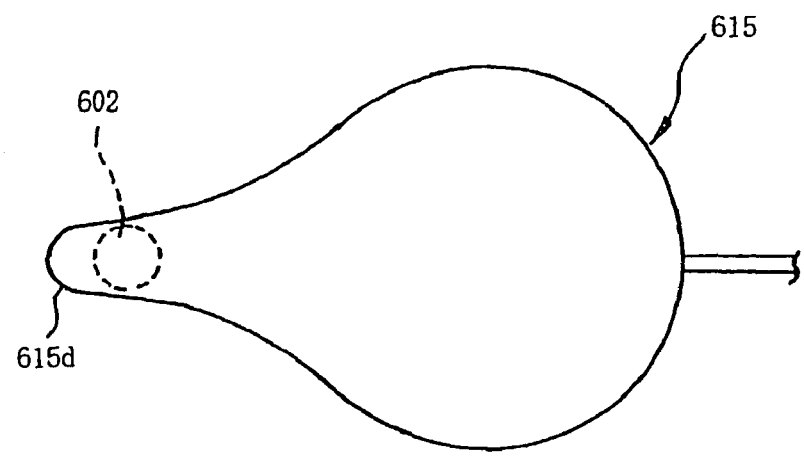
FIGS. 17(a) and 17(b) are views each illustrating yet another embodiment of the mouse type camera and more specifically.
Figure 17:
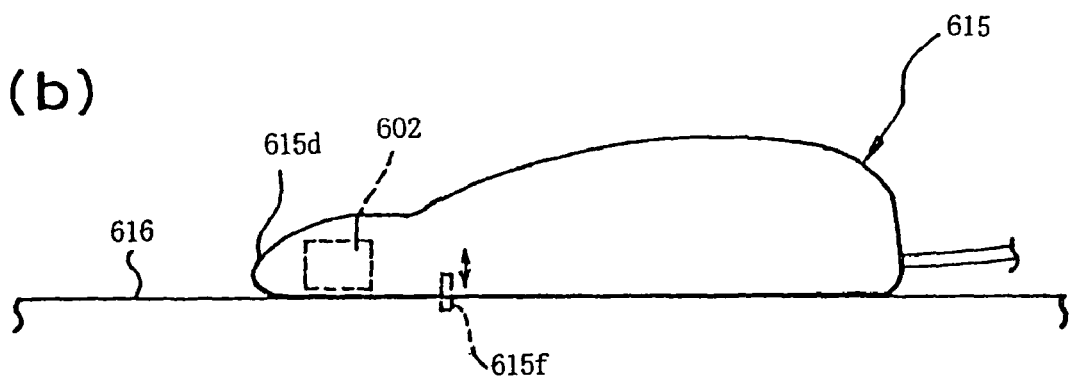

FIGS. 16(a) and 16(b) show another embodiment of a camera integrated mouse-shaped case. More specifically, FIG. 16(a) is a plan view thereof and FIG. 17(b) is a lateral view thereof. FIGS. 17(a) and 17(b) show yet another embodiment of a camera integrated mouse-shaped case. More specifically, FIG. 17(a) is a plan view thereof and FIG. 17(b) is a lateral view.

According to this embodiment, as shown in FIGS. 16(a) and 16(b), the camera 602 is integrated in a protruding end 615d of the mouse-shaped case 615. Since the protruding end 615d is thus formed in the mouse-shaped case 615, it is possible to position the mouse-shaped case 615 at a predetermined position of the mouse pad 616 with ease and to push a button switch 615e, and thereby to recognize a surface of the mouse pad 616 via the lower surface 615a of the mouse-shaped case 615.

Here, it is also possible to provide a button switch 615f at the lower surface 615a of the mouse-shaped case 615. Only if the mouse-shaped case 615 is positioned at the predetermined position on the mouse pad 616 and the mouse-shaped case 615 is pushed against the mouse pad surface, the button switch 615ƒ can be turned on.

Figure 18:
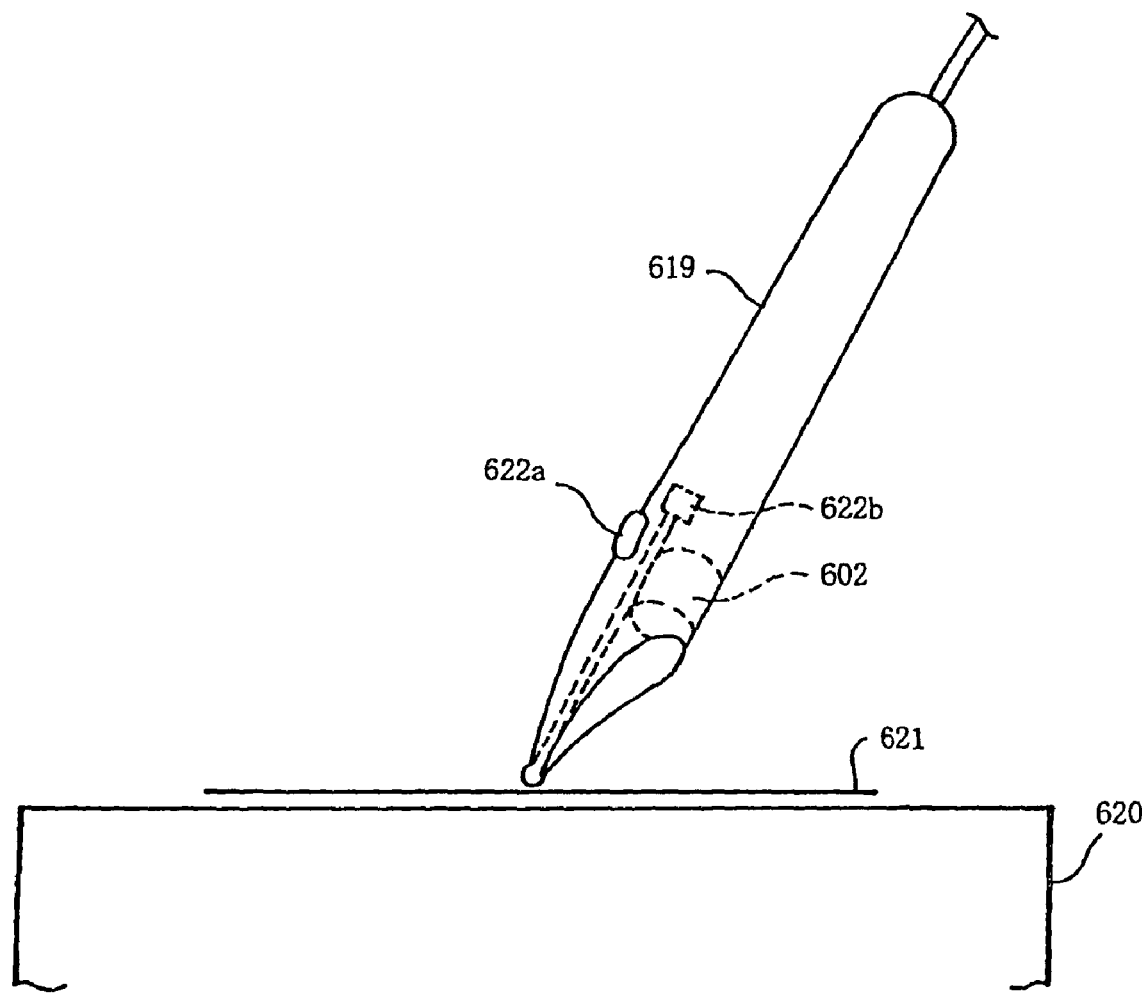
FIG. 18 is a cross sectional view illustrating another embodiment of using as a tablet a printed surface on which a dot pattern portion is formed.

FIG. 18 is a cross sectional view illustrating another embodiment which utilizes as a tablet a printed surface on which a dot pattern portion 607 is formed.

According to this embodiment, the pen type member 619 including a camera 602 is combined with a table 620 (or trace table) to use as a tablet a printed surface on which a dot pattern portion 607 is formed. A paper sheet 621 on which a dot pattern portion 607 is printed (printed surface) 621 is set on the table 620, a picture and letters are traced with this pen type member 619, and the switch 622a is turned on thereby to capture data into the PC 608 or PDA. Further, an end of the pressure switch 622b protrudes from the end of the pen type member 619.

This pen type member 619 is used to write letters or draw a picture on a paper sheet on hand as is usually done. Then, without looking at a display, written letters and drawn picture can be inputted to the PC 608 or PDA as the camera 602 recognizes information of voices and the like thereof. Accordingly, this pen type member 619 can be used for illustration, drawing, and also trace. Conventionally it was necessary to look at a display when tracing by the mouse. However, this need is eliminated thereby to reduce burden in inputting. It is further possible to easily perform an operation which conventionally can be realized only by a coordinate inputting device called tablet.

Figure 19:
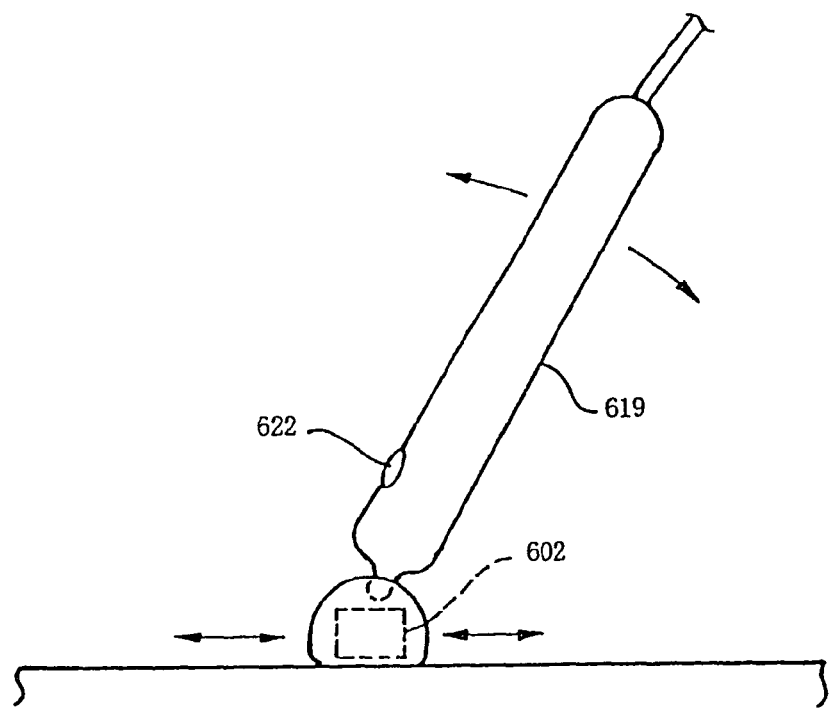
FIG. 19 is a cross sectional view illustrating another embodiment in which a camera is mounted at an end of a pen member.
Figure 20:
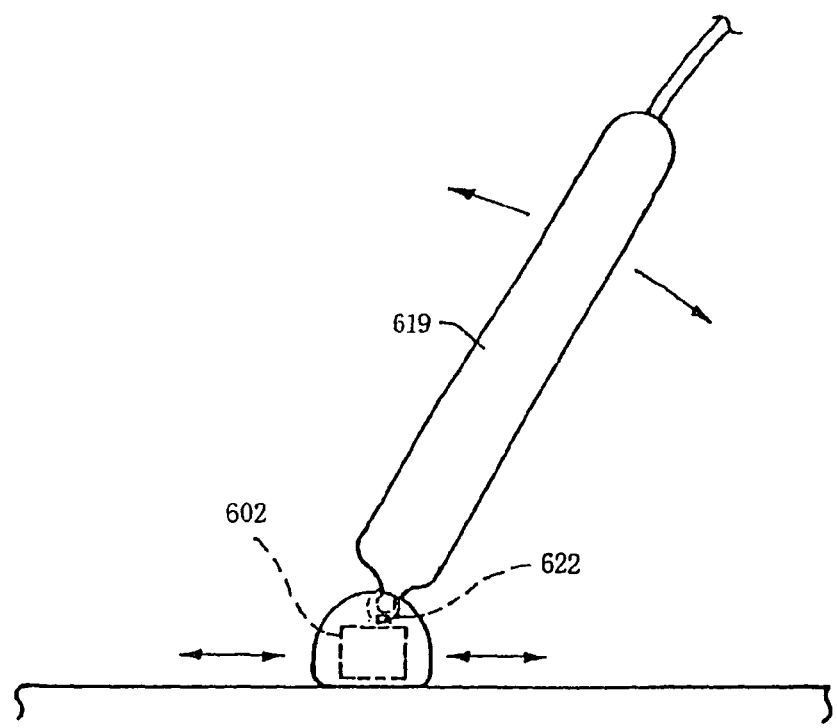
FIG. 20 is a cross sectional view illustrating yet another embodiment in which a camera is mounted at an end of a pen member.

FIG. 19 is a cross sectional view illustrating another embodiment a camera mounted at an end of a pen type member. FIG. 20 is a cross sectional view illustrating yet another embodiment a camera mounted at an end of a pen type member.

The camera 602 mounted at the end of the pen type member 619 can be mounted swingingly thereon, as shown in FIG. 19. Since the camera 602 is thus swingingly configured, the camera 602 can be always placed vertically to a printed surface of the dot pattern portion 607, and there is no need to consider distortion caused by tilt of the camera 602 (pen type member 619).

FIG. 20 is a cross sectional view illustrating another embodiment of the pen type member with a pressure switch mounted at the end thereof. The switch 622 does not always have to be mounted on the pen type member 619. As shown in FIG. 20, the switch 622 can be mounted at the swingingly mounted camera 602. With this configuration, the switch 622 of the camera 602 has only to be pushed against a printed surface of the dot pattern portion 607 in order to turn on the button switch 622.

Accordingly, the invention enables operation of the PC 608 instead of using a keyboard or a mouse regularly provided on the PC, and everyone can easily operate the PC 608 only by pushing. Then, the invention serves as an interface which has a high affinity for human. Beside, the invention can be manufactured with a simple configuration and with low cost as compared with an inputting pad.

However, the invention is not limited to the above-described embodiments. When the invention is configured to recognize a dot pattern portion 607 on a printed material 606 or a transparent film 611 (touch panel 612) and to reproduce predetermined information and voices thereby to enables various ways of use, the invention is not limited to the above-described embodiments. Besides, the invention can be modified without departing from the description of the invention.

Figure 21:
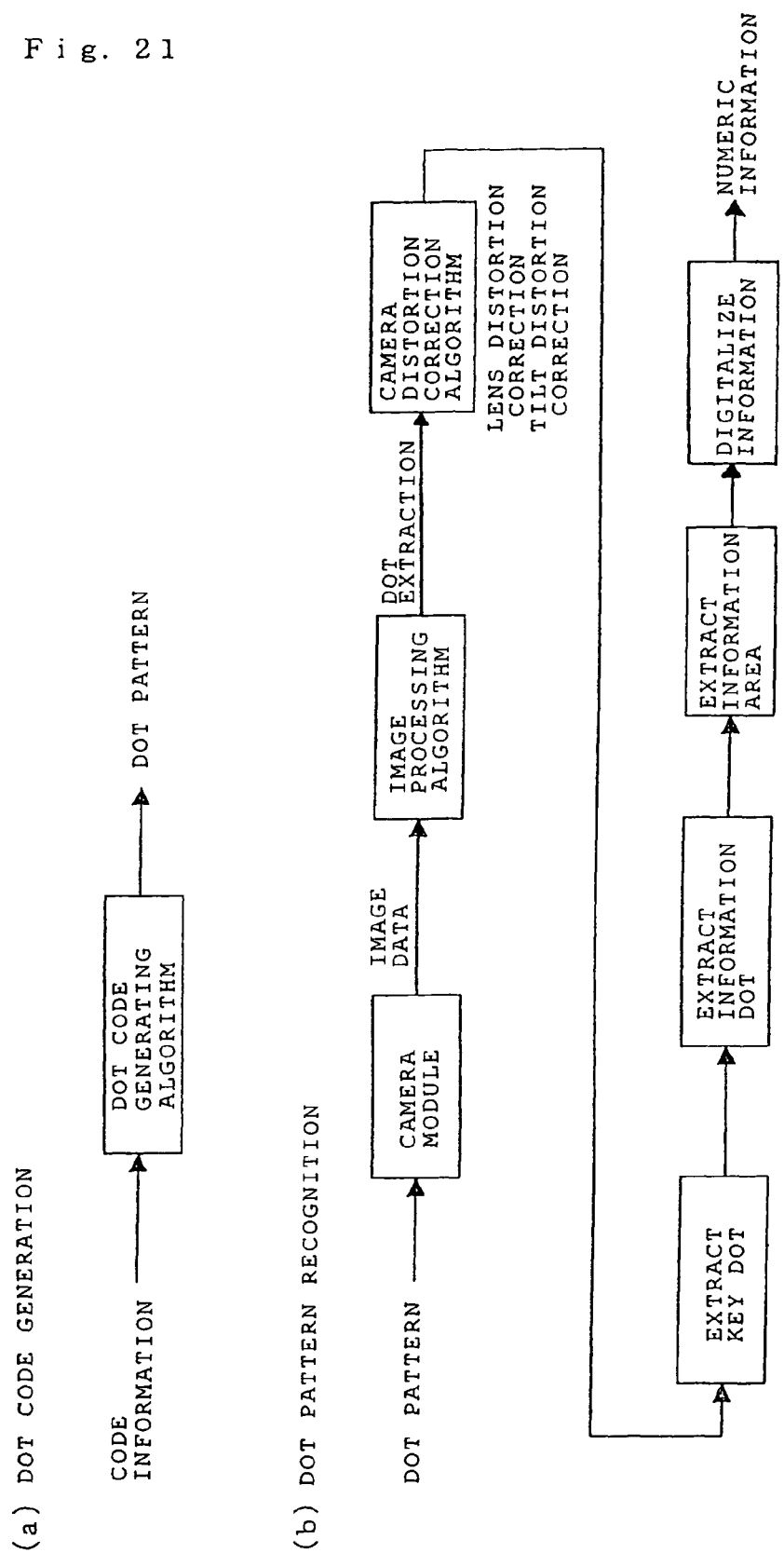
FIGS. 21(a) and 21(b) are block diagrams each illustrating a configuration of an information inputting/outputting method by camera inputting according to the invention, and specifically.
Figure 22:
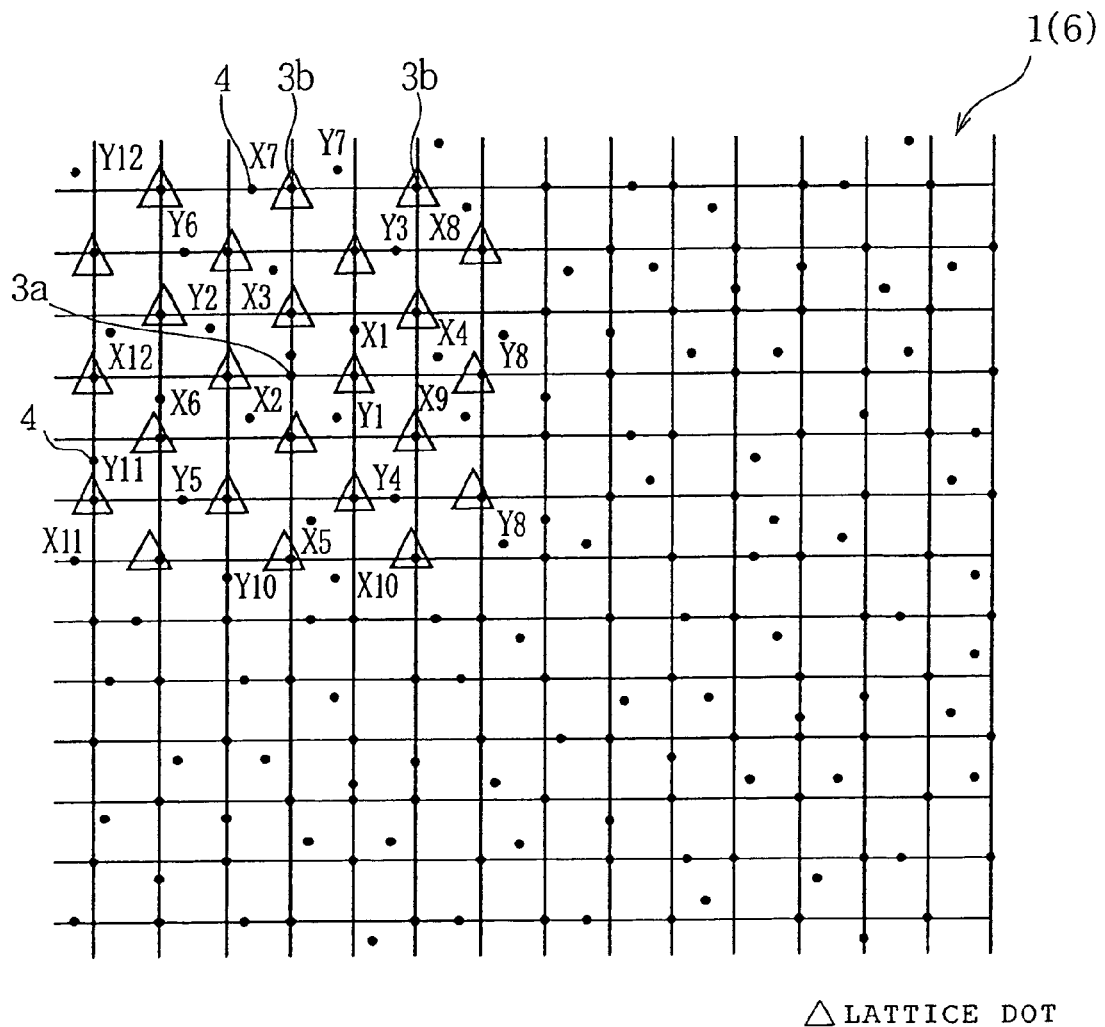
FIG. 22 is an elevation view illustrating an example of a dot pattern.
Figure 22:
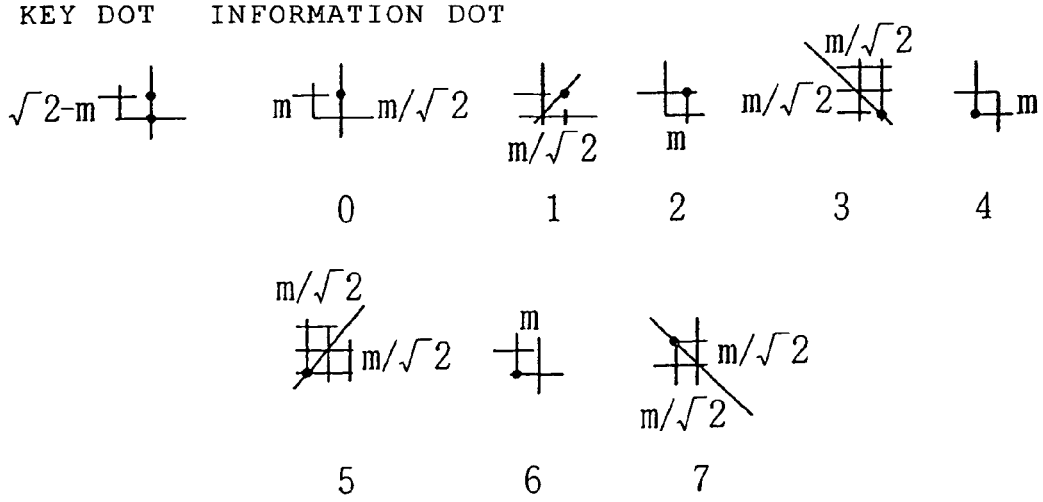

FIGS. 21(*a*) and 21(*b*) are block diagrams each illustrating an information inputting/outputting method by camera inputting according to the invention, and more specifically, FIG. 21(*a*) explains generation of a dot code and FIG. 21(*b*) explains recognition of a dot pattern. FIG. 22 is an elevation view illustrating an example of a dot pattern.

The information inputting/outputting method by camera inputting of the invention includes generation of a dot pattern 1, recognition of the dot pattern 1 and means for outputting information and a program corresponding to the dot pattern 1. In other words, a camera unit 2 is used to scan image data of the dot pattern 1. First, key dots 3 are extracted and then, information dots 4 are extracted. The extracted dots are digitalized to extract an information area, and thereby to be converted into numeric values. The numeric information is based to output information and a program corresponding to the dot pattern 1.

Generation of the dot pattern 1 according to the invention is performed in such a manner that small dots (key dot (KD) 3a, lattice dots (LD) 3b and information dots 4) are arranged in accordance with a predetermined rule by a dot code generating algorithm in order to recognize information. Recognition of dot pattern 1 includes correction of distortion rate by a lens of the camera unit 2, correction of distortion due to tilt of the camera unit 2 and reproducing of numeric information of a key dot 3a (KD) and information dots 4. Image data of the dot pattern 1 is captured by the camera unit 2 which includes an image pickup device such as a C-MOS camera and CCD camera.

Figure 23:
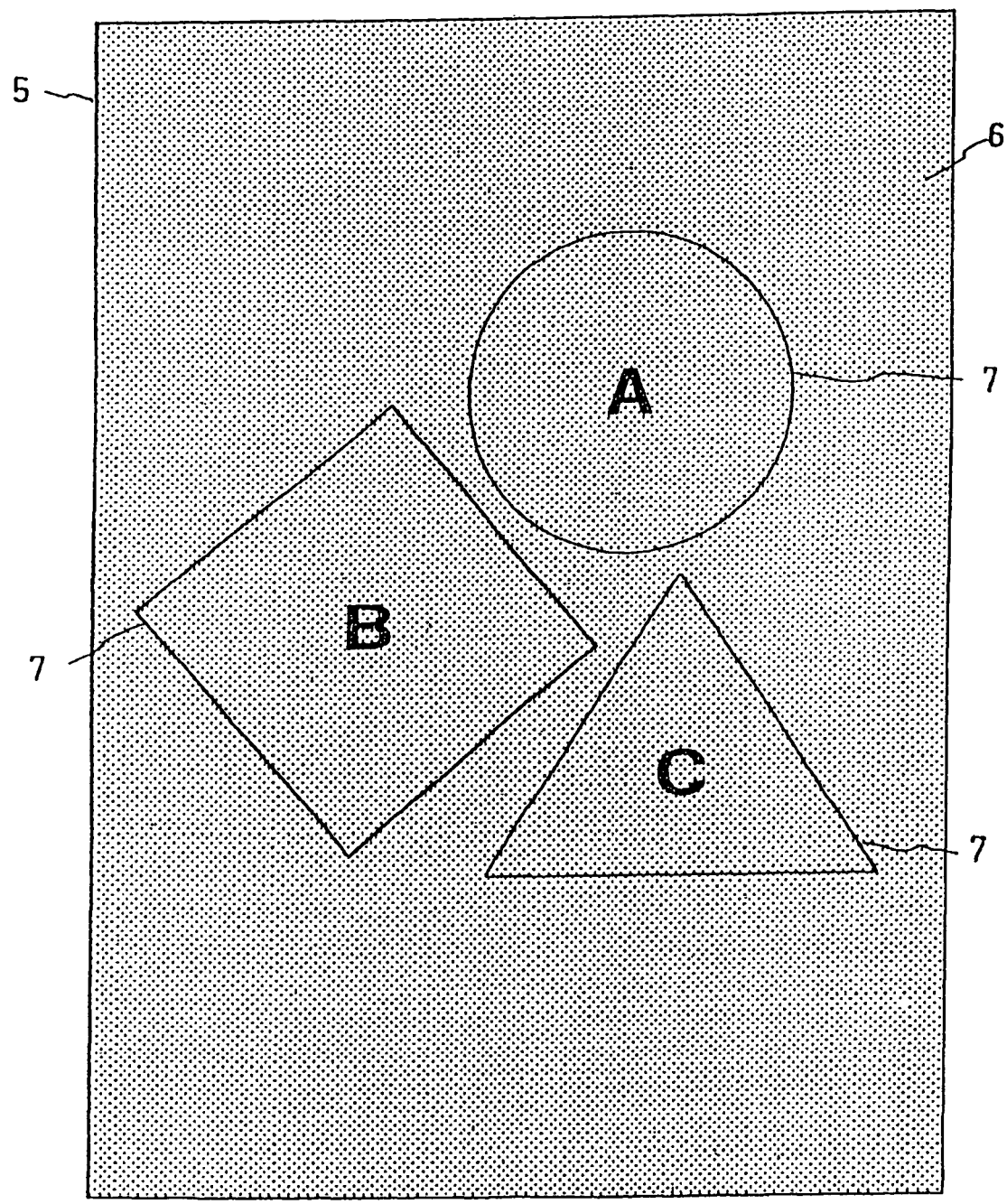
FIG. 23 is an explanatory view for showing a dot pattern formed of x and y coordinates information.

The above-described dot pattern 1 consists in a dot pattern portion 6 by printing at a wide variety of the printed material 5. Specifically, in the invention, the dot pattern portion 6 is printed on the same surface of the printed material 5 together with an information transfer portion 7 represented by letters, illustrations or the like of which people is usually able to recognize information content visually, which is shown in FIG. 23. The information transfer portion 7 is preferably printed using a non-carbon ink. On the other hand, dots of the dot pattern portion 6 are preferably printed with a carbon ink.

In the information inputting/outputting method according to the invention, first, when the camera unit 2 is used to capture image data of the dot pattern portion 6, the dot pattern portion 6 is radiated with infrared light and thereby the dot pattern portion 6, of which the dots are printed in a carbon ink, is only scanned accurately separately from the information transfer portion 7 printed in a non-carbon color ink. In other words, since information data of the dot pattern portion 6 is only captured from the printed material of which the information transfer portion 7 expressed by letters or figures and the dot pattern portion 6 are printed to be superimposed on the same surface, information of the dot pattern portion 6 can be only extracted.

Figure 24:
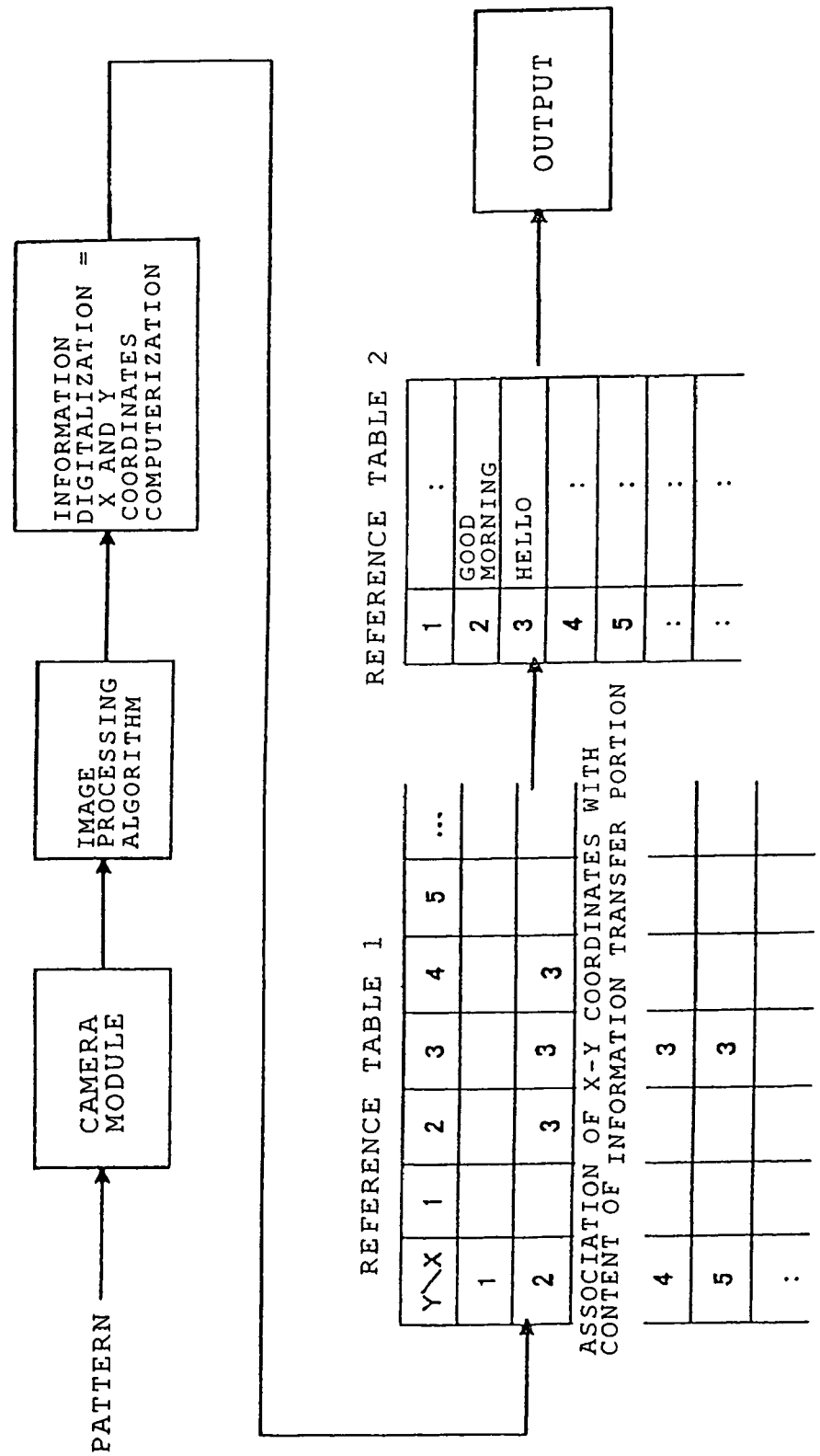
FIG. 24 is a view for explaining a method of recognizing and processing a dot pattern formed of x and y coordinates information.

FIG. 23 is a view for explaining a dot pattern composed of x and y coordinate information. FIG. 24 is a view explaining a method of recognizing and processing a dot pattern composed of x and y coordinate information.

The dot pattern portion 6 of the invention is created by x and y coordinate information, and the x and y coordinate information and a content of the information transfer portion 7 can be associated with each other. Regarding the dot pattern portion 6, image data of the dot pattern portion 6 is captured using the camera unit 2 as explained above, and the image information is digitalized to be converted into numeric values. The numeric values are expressed by the x and y coordinate information, which is then brought into correspondence with either position of the information transfer portions indicated by the round portion A, the square portion B and the triangular portion C. At this time, using a reference table 1 on FIG. 24, the x and y coordinates are associated with each of the information transfer portions 7. In other words, correspondence is made between an x and y coordinate range and either content of the information transfer portions 7. This is followed by referring a reference table 2 on FIG. 24 to output information or a program corresponding to the dot pattern portion 6.

With the dot pattern portion 6 being made of the x and y coordinate information, only if the printed material 5 on which the dot pattern 1 is printed in advance is prepared and the information transfer portion 7 is printed to be superimposed on the printed material 5, it is possible to associate, for a certain content, the x and y coordinate range with information and a program of a voice or the like. In other words, since there is no need to create a new dot pattern portion 6 for a content of the information transfer portion 7, its versatility becomes extremely high.

Figure 25:
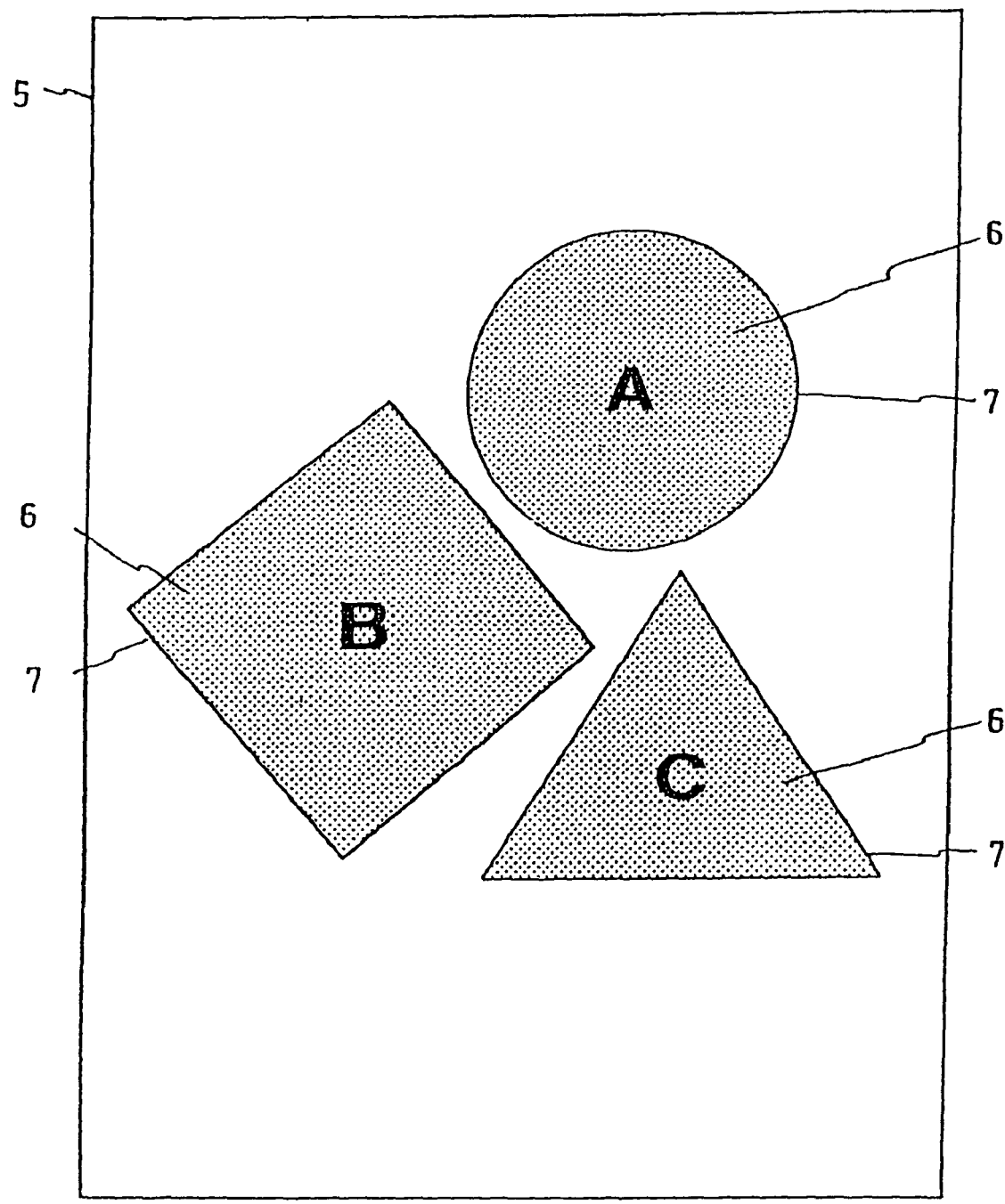
FIG. 25 is an explanatory view for showing a dot pattern formed of code numeric information.
Figure 26:
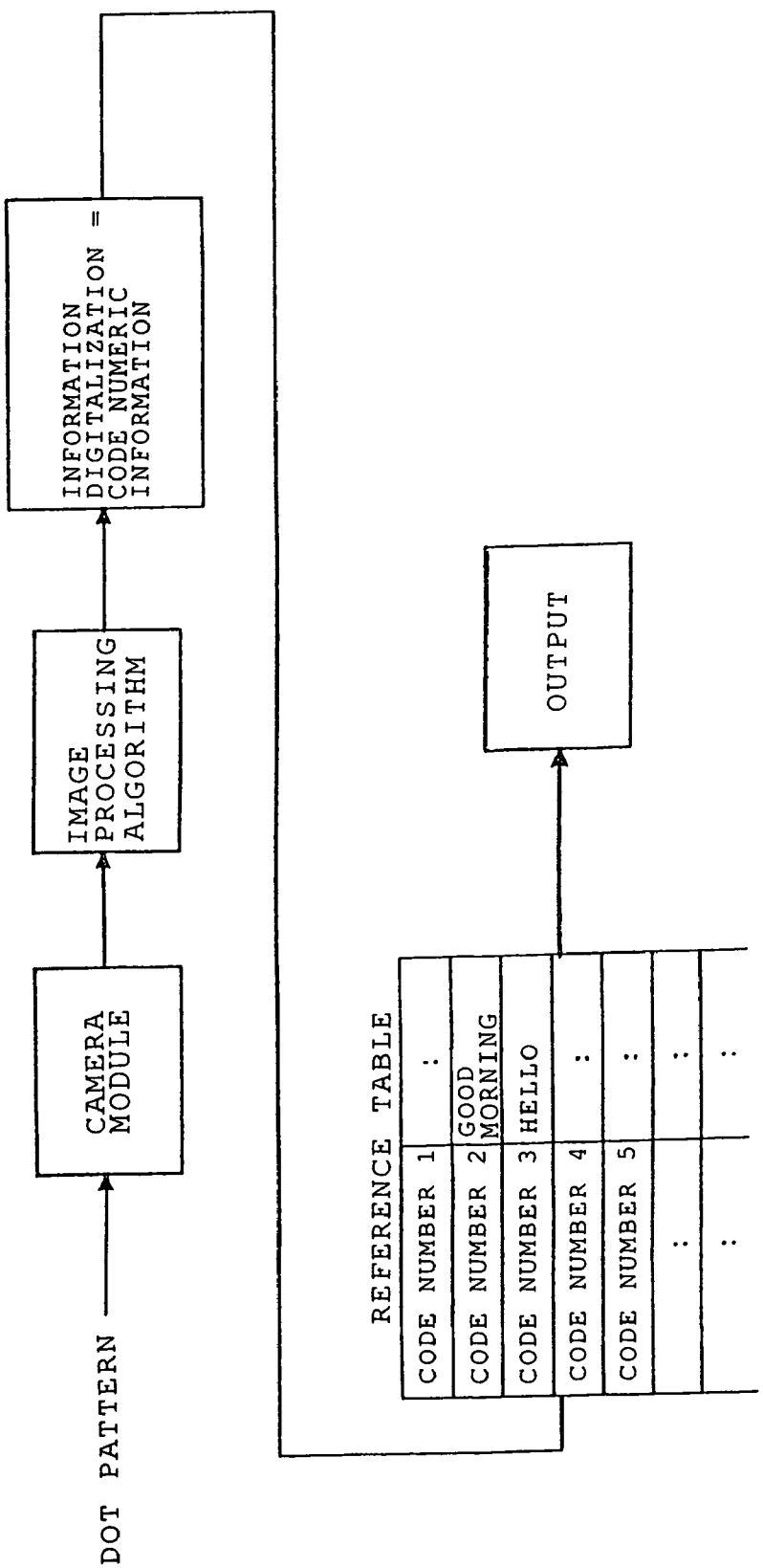
FIG. 26 is a view for explaining a method of recognizing and processing a dot pattern formed of code numeric information.

FIG. 25 is a view explaining a dot pattern made of code numeric information. FIG. 26 is a view explaining the procedure of recognition and processing of a dot pattern formed of code numeric information.

The dot pattern portion 6 according to the invention makes it possible to create code numeric information instead of the aforementioned x and y coordinate information and to associate the code numeric information with content of an information transfer portion 7. For example, the dot pattern portion 6 is printed out which includes code numeric information corresponding to the content of either of the information transfer portion 7 of the round portion A, the information transfer portion 7 of the square portion B and the information transfer portion 7 of the triangular portion C. The dot pattern portion 6 also has image data captured by the camera unit 2, as described above, which image information is digitalized into numeric values (code numeric information). Then, by referring to a reference table on FIG. 26, information and a program corresponding to the dot pattern portion 6 is outputted.

According to the dot pattern portion 6 with the code numeric information, a code number and content of the information transfer portion 7 are in direct correspondence with each other. Accordingly, as shown in FIG. 26, it is enough to make only one reference table. In addition, since only one reference table needs to be created, it is possible to shorten information processing time.

Here, it is needless to say that a dot pattern portion 6 including x and y coordinate information and a dot pattern portion 6 including code numeric information can be printed on the same surface.

Figure 27:
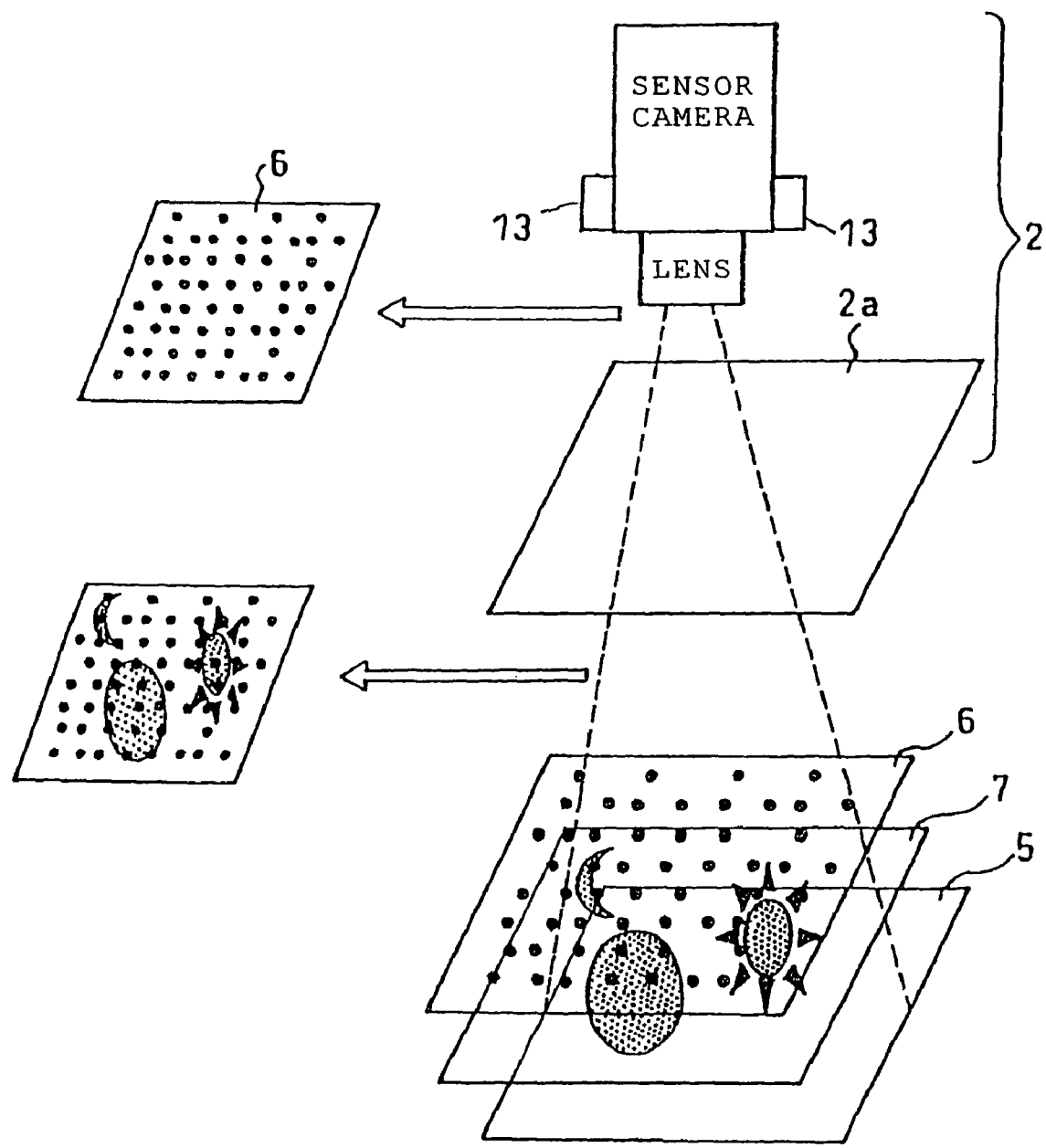
FIG. 27 is an explanatory view for explaining a way of scanning by a camera only image data of a dot pattern portion printed with a carbon ink, separately from an information transfer portion, which include text and figures, printed with a con-carbon color ink by radiating a printed material with infrared light.

FIG. 27 is an explanatory view explaining a state of image data of a dot pattern portion printed with a carbon ink being only captured by a camera separated from an information transfer portion of letters, figures or the like printed with a non-carbon color ink.

As shown in FIG. 27, formed on a printed material 5 of white paper is an information transfer portion 7 printed with an ink which is transparent at infrared wavelengths but forms a color at visible light wavelengths, for example a non-carbon ink (dye ink). Next, formed on this printed material 5 is a dot pattern portion 6 printed with an ink which forms a color at infrared wavelengths, for example, a carbon ink such as a toner, infrared light ink, transparent ink or the like. These information transfer portion 7 and dot pattern portion 6 are superimposed to be printed on the same surface, which is then shot by a camera unit 2. At this time, an infrared light filter 2a cuts visible light wavelengths and makes only infrared light wavelengths pass. The camera can obtain information of the dot pattern 1 only. On the other hand, it is also possible to first print the dot pattern portion 6 before to print the information transfer portion 7.

This camera unit 2 recognizes at these dot pattern portions dots printed in accordance with a given-rule, which dots are digitalized to be converted into numeric values. Then, the numeric information is read, and information or a program area on the printed material 5 corresponding to the dot pattern portion 6 is recognized. This is followed by outputting and executing various information and program correspondingly stored in a memory. For example, information and program corresponding to the dot pattern portion 6 can be outputted by a text and image or a voice.

The way of radiating a dot pattern portion 6 with infrared light can be adopted to capture only image data of a dot pattern portion 6 in the printed material 5 by the camera unit 2.

According to the above-described method of the invention it is possible to output and execute various types of voice information via a medium of a printed material 5. The invention can be applied to various printed materials 5, for example, a picture book, a pop-out book a photograph itself, questions, a text, a exercise book, a magazine, a newspaper, a card, a member card, a photo stand, an adhesive coated picture, explanation of a showpiece in a museum, card game, board game, pamphlet, catalog of mail order and the like. Thus, it is possible to recognize both of visual information of the information transfer portion 7 including letters and illustrations in the printed material 5 and voice information from the dot pattern portion 6.

Figure 28:
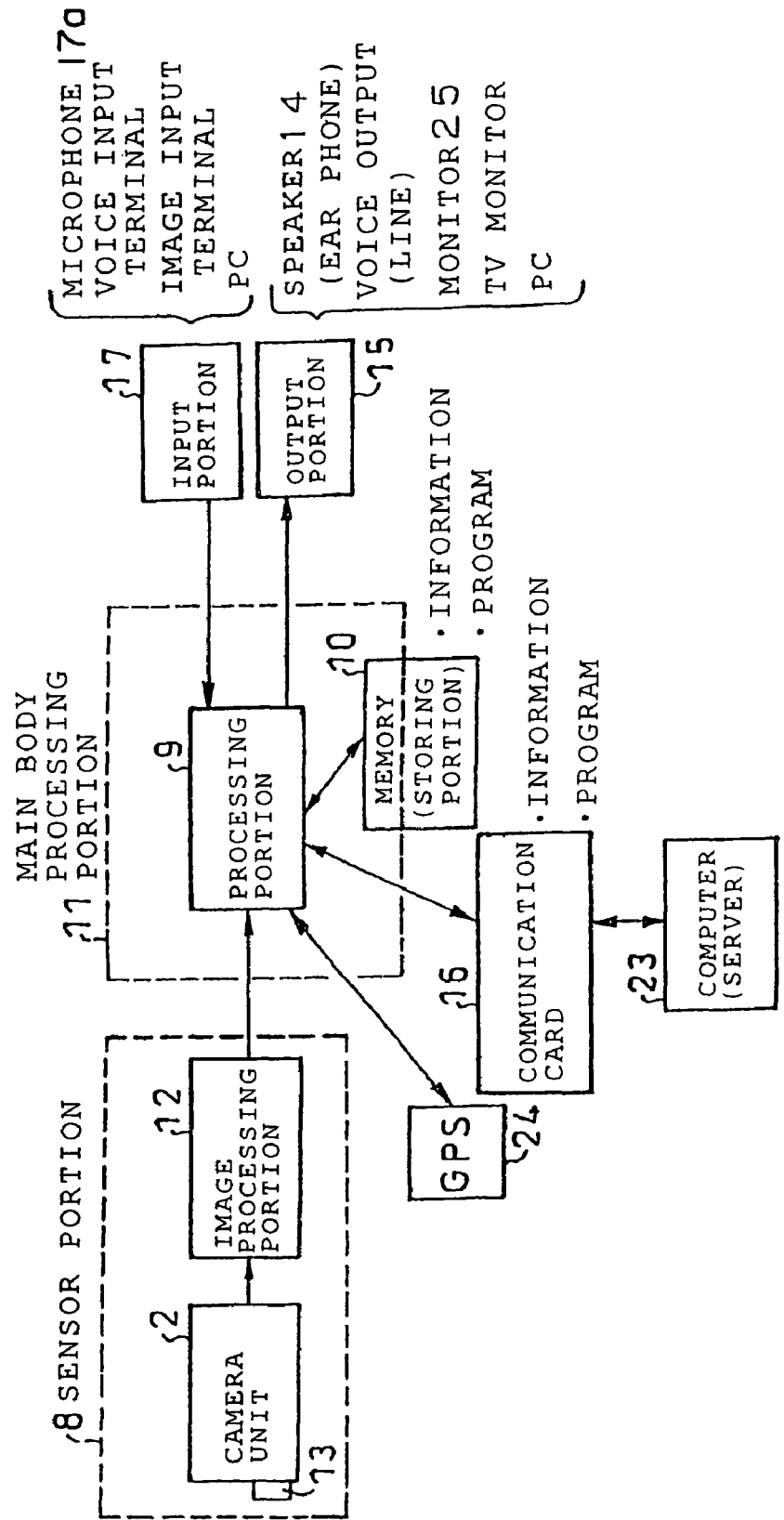
FIG. 28 is a functional block diagram for explaining an embodiment of a portable information inputting/outputting device using an information inputting/outputting method by camera inputting.

FIG. 28 is a functional block diagram for explaining a first embodiment of a portable information inputting/outputting device using the information inputting/outputting method by camera inputting.

The portable information inputting/outputting device includes: a sensor portion 8 consists of a camera unit 2; and a main body processing portion 11 which has a processing portion 9 and a storing portion (memory) 10. This sensor portion 8 includes the camera unit 2 which captures only image data of a dot pattern portion 6 on a printed material 5, and an information processing portion 12 for digitalizing the image data into numeric values. Provided in the vicinity of this camera unit 2 is an infrared light emitting portion 13 for radiating the printed material 5 with infrared light.

The main body processing portion 11 includes the processing portion 9 for outputting and executing information and a program stored in advance in the storing portion (memory) 10 and corresponding to the dot pattern portion 6 based on the numeric values obtained by image processing at the image processing portion 12. This main body processing portion 11 includes an outputting portion 15 such as a speaker 14, earphones or an LC monitor 25. This outputting portion 15 can output, in addition to the voices, voice output (line), image to TV monitor or to a PC.

The storing portion 10 can store information and a program not only in advance but also can store them later. For example, the storing portion 10 can store information and a program from voices obtained by a microphone 17a as an inputting portion 17. In addition to the microphone 17a, this inputting portion 17 can be connected to a voice input terminal, an image input terminal, a PC and the like to store information and a program.

In this way, since voices can be input later by using a microphone 17a, for example, the portable information inputting/outputting device is allowed to store voices of a user himself or acquaintances related to the printed material 5 such as a picture book stored via the microphone 17, and later, the portable information inputting/outputting device can scan the printed material 5 so as for other people to listen to voice information corresponding to a content of the printed material. For example it can be used as a "family message device" or an "adhesive coated picture with voice message".

The main body processing portion 11 can output or execute information and a program from the outside by being equipped with a communication card 16. For example, a dot pattern 1 scanned by a camera unit 2 is converted into numeric values, which data then can be transmitted to a computer 23 such as a server via the communication card 16. In addition, a dot pattern 1 scanned by the camera unit 2 is converted into numeric values, which data then can be transmitted to a computer 23 such as a server by using the communication card 16 before the main body processing portion 11 can receive information and a program corresponding to the data. The main body processing portion 11 can input data of numeric values into which the dot pattern 1 scanned by the camera unit 2 is converted, and receive corresponding voices. The communication card 16 is mounted on the main body processing portion 11 to store information and a program in the storing portion 10.

Since the communication card 16 is thus used, it becomes easy to transmit and receive information and a program. For example, the portable information inputting/outputting device is used to reply to questionnaires by voices and then the voice information is transmitted to the computer 23 such as a server. Or, information of voices replying to questions or a test can be transmitted to the computer 23 such as a server thereby to carry out a pronunciation test or have responses to the questions or test corrected.

Further, URL information is embedded in the dot pattern portion 6 of the printed material 5 or another medium so that when the URL information is scanned, connection to a side of the URL information is established automatically. Or, the connection being established, a particular action can be set to be performed.

Or, a published matter which makes sound can be created. Voice information can be input in a post card or a letter later. For example, this printed material 5 can be added BGM (back ground music), SE (sound effect) or the like, later.

The main body processing portion 11 is further provided with a GPS 24 so as to display information of a current position easily.

Figure 29:
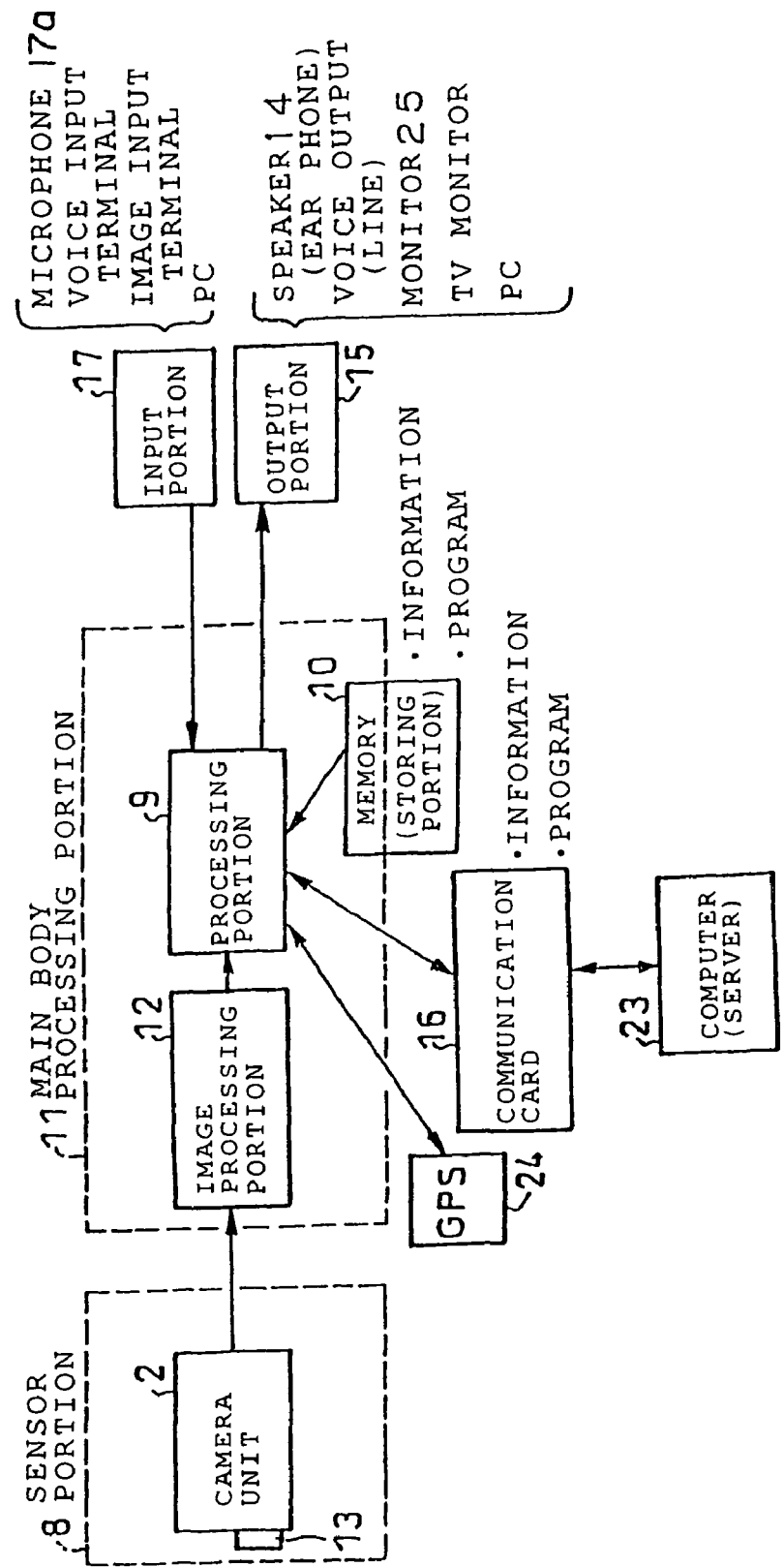
FIG. 29 is a functional block diagram for explaining an embodiment of a portable information inputting/outputting device using an information inputting/outputting method by camera inputting.

FIG. 29 is a functional block diagram for explaining an embodiment of the portable information inputting/outputting device using the information inputting/outputting method by camera inputting.

According to the portable information inputting/outputting device of this embodiment, since a sensor portion 8 only includes a camera unit 2, the sensor portion 8 can be realized in a compact size.

However, the invention is not limited to the embodiment shown on the figure. The invention can be applied to any configuration which enables various ways of use by recognizing only a dot pattern portion 6 in the printed material 5 to reproduce given information and voices. Modifications may be made in the invention without departing from the scope of the invention.

Figure 30:
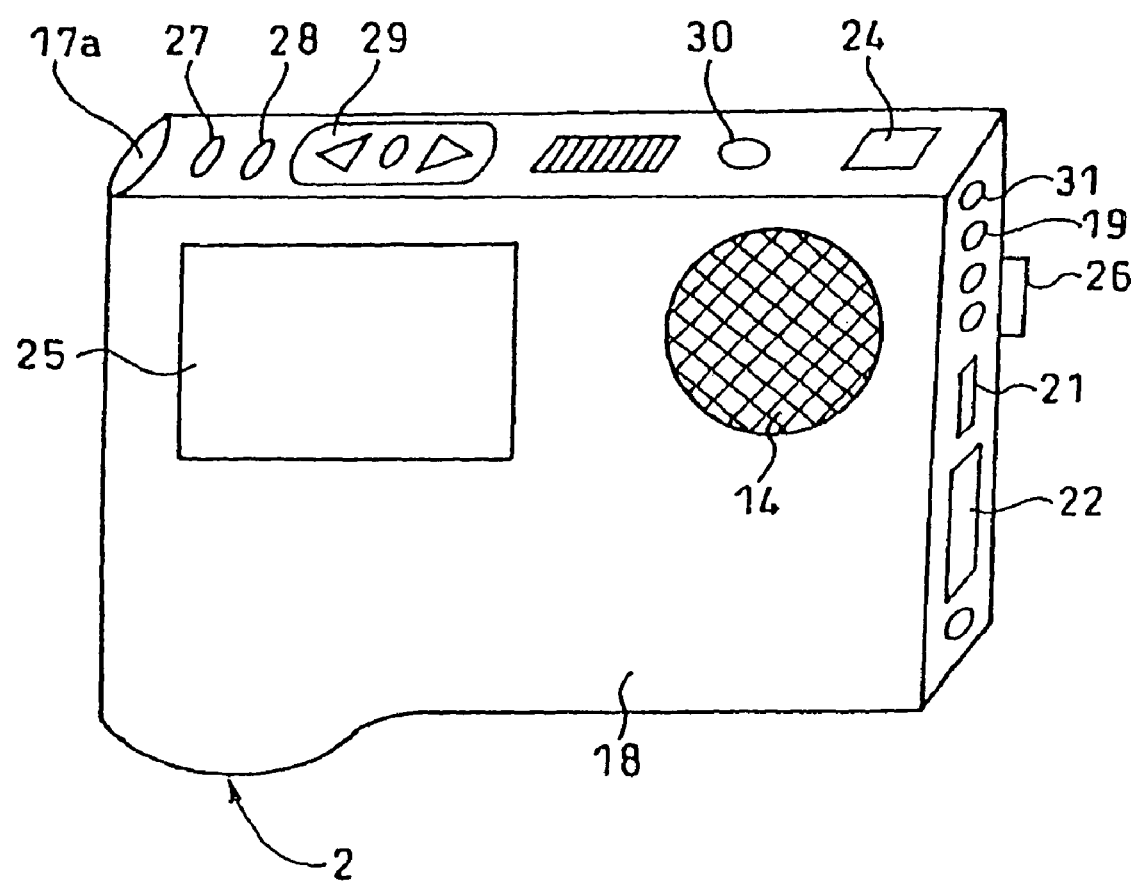
FIG. 30 is a perspective view showing a portable information inputting/outputting device which is housed in a compact case.
Figure 31:
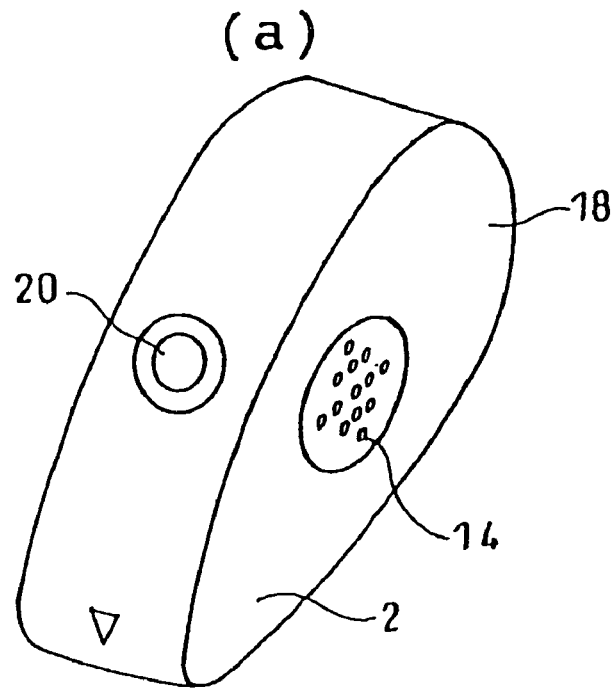
FIGS. 31(a) to 31(d) are views each showing a portable information inputting/outputting device which is housed in a compact case of another shape, and more specifically.
Figure 31:
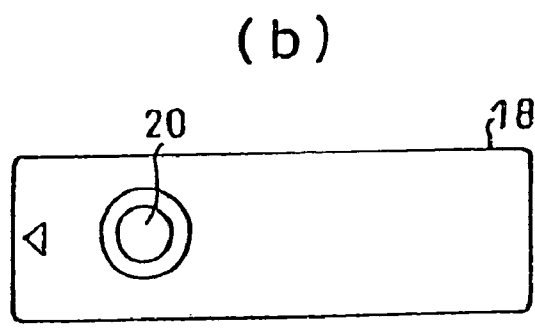
Figure 31:
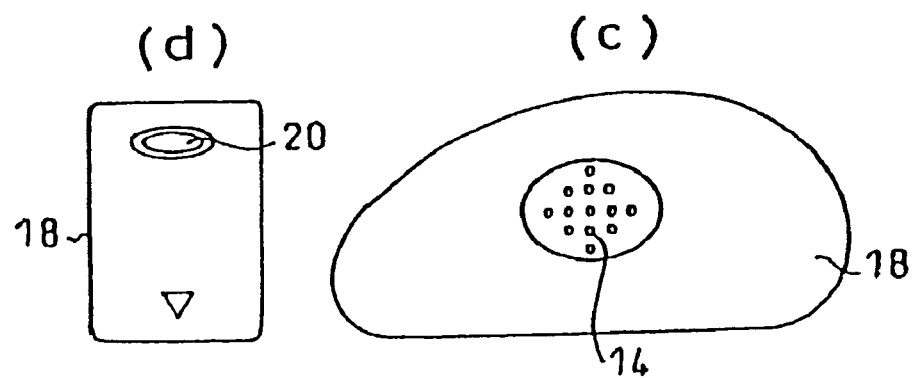

FIG. 30 is a perspective view of a portable information inputting/outputting device housed in a compact case body. FIGS. 31(*a*) to 31(*d*) each shows a portable information inputting/outputting device housed in a compact case body, and specifically, FIG. 31 (*a*) is a perspective view of the whole device, FIG. 31(*b*) is a plan view, FIG. 31(*c*) is a lateral view and FIG. 31(*d*) is an elevation view.

The portable information inputting/outputting device of the invention is configured in the body case 18 which one can hold in one's hand, and includes a main body processing portion 11 as mentioned above, a camera unit 2 provided downward at the body case 18 and a speaker 14 or an earphone terminal 19 provided laterally. A button switch 20 is provided at the upper side of the body case 18, and a USB terminal 21 and a memory card slot 22 as the storing portion 10 are provided at the front side thereof.

The portable information inputting/outputting device of the invention is further provided with an LC monitor 25, an earphone jack 19, a TV monitor output terminal 26 and the like. Further, the body case 18 is provided with a microphone 17*a*, a shooting button 27, a recording button 28 a program selecting button 29, an output lump 30, a GPS 24, a voice input terminal 31, the USB terminal 21 and a memory card slot 22 of the storing portion 10.

The body case 18 is formed to be round totally, as shown in FIG. 31, so that one can hold the body case 18 in one's hand. By this configuration, it becomes easy to capture image data of the dot pattern portion 6 of the printed material 5.

The shape of the body case 18 is limited to the shape shown in the figures. Modification may be made without departing from the scope of the invention.

Figure 32:
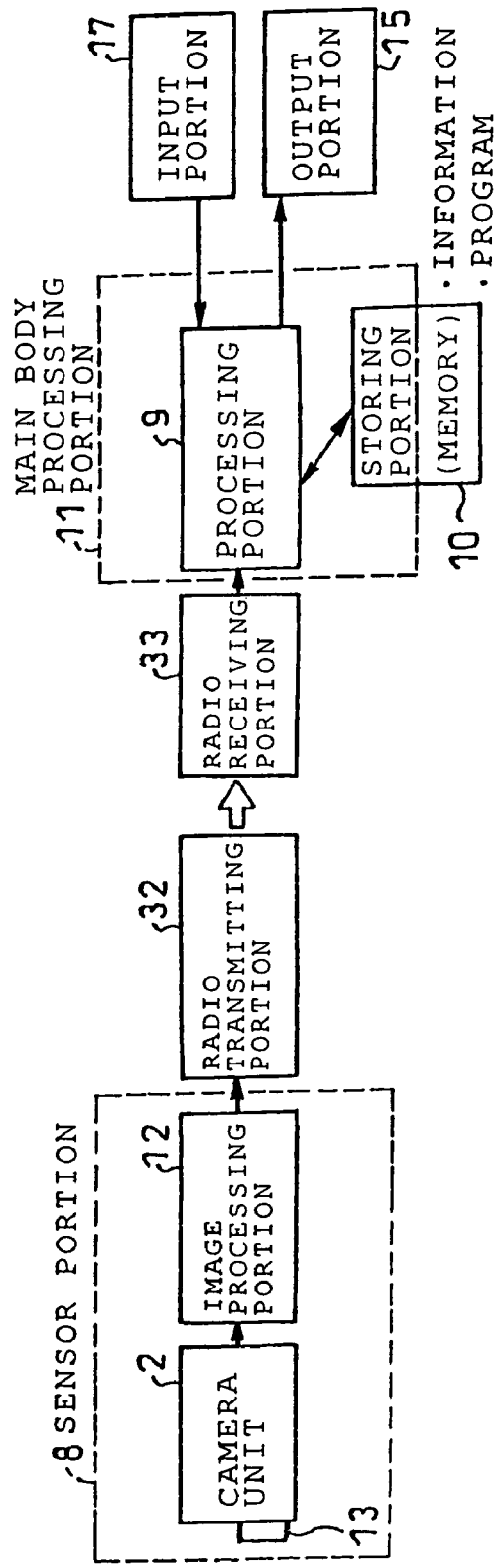
FIG. 32 is a functional block diagram for explaining an embodiment in which a camera unit and an outputting portion are configured separately.
Figure 33:
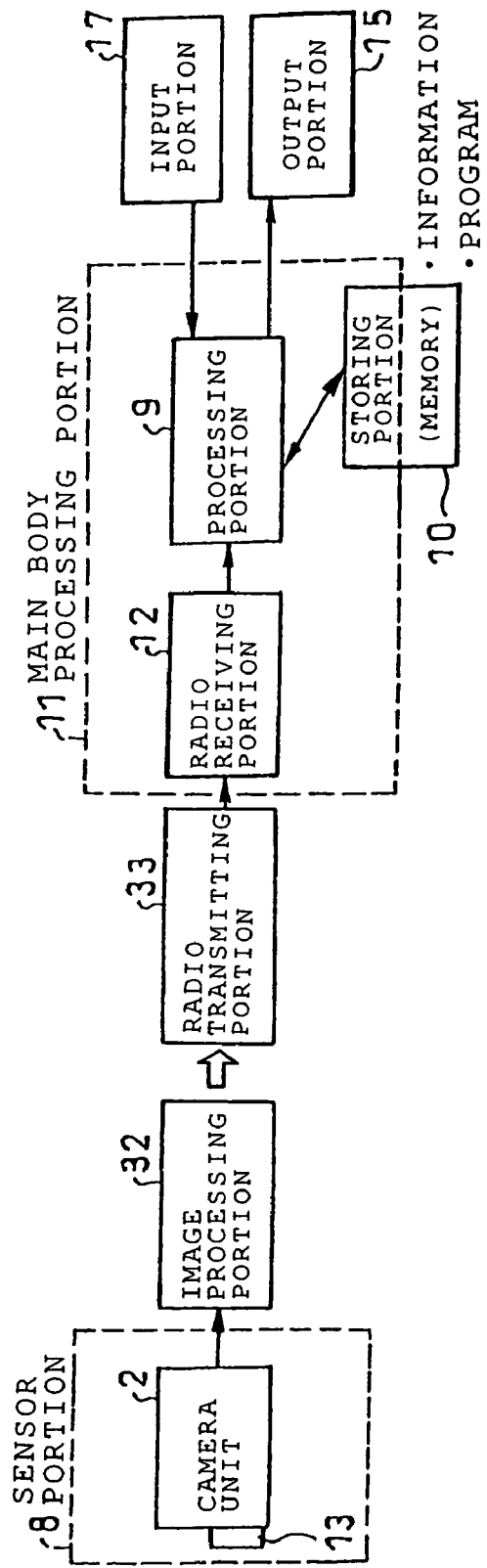
FIG. 33 is a functional block diagram for explaining an embodiment in which a camera unit and an outputting portion are configured separately.

FIGS. 32 and 33 are functional block diagrams each for explaining an embodiment of a camera and an outputting portion configured separately.

In this embodiment, the camera unit 2 can be configured to be separated from the abovementioned image processing portion 12, the storing portion 10, the processing portion 9 and the outputting portion 15 and to enable transmission via an interface portion. Transmission via this interface portion can be performed by wired communication or radio communication. Transmitting by radio communication can be performed by a radio transmitting portion 32 and a radio receiving portion 33 of the interface portion, which is shown in the figures.

The sensor portion 8 in FIG. 33 includes the camera unit 2 only. By this configuration, the sensor portion 8 can be of compact size.

Figure 34:
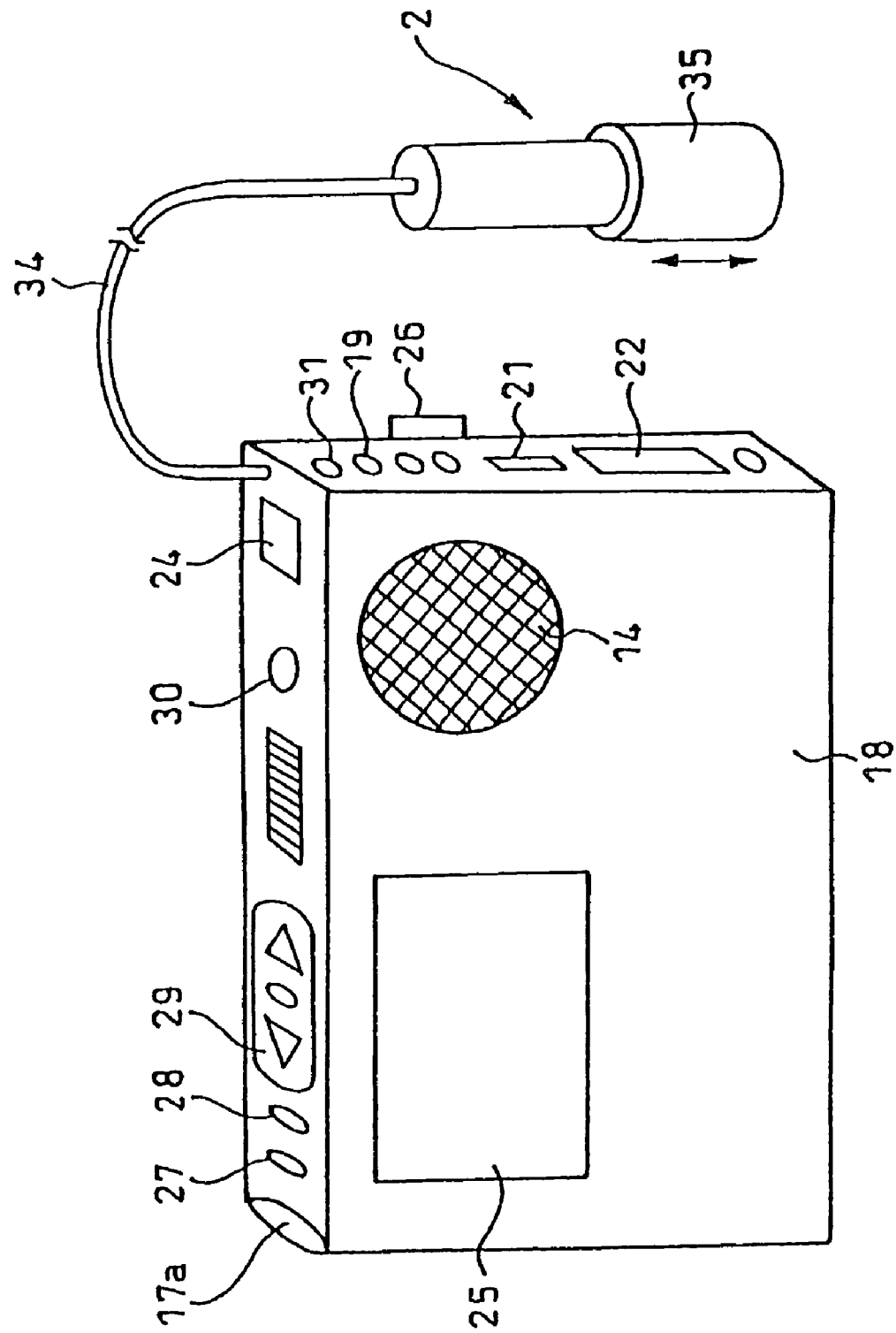
FIG. 34 is a perspective view showing a device in which a camera unit portion and an outputting-side main body are separated.

FIG. 34 is a perspective view illustrating a device having a camera unit portion and an output main body separated.

In the example in FIG. 34, the camera unit portion and the output-side main body are separated and connected by a wired cable 34. Since they are thus separated, the camera unit 2 can be easily abutted on a printed material 5, which makes it possible to use a portable information inputting/outputting device on the table. This camera unit 2 is configured with a ring switch 35 around the camera. With this configuration, only if the camera unit 2 is pushed against the printed material 5, a switch can be turned on, which presents easy operability by one hand.

Figure 35:
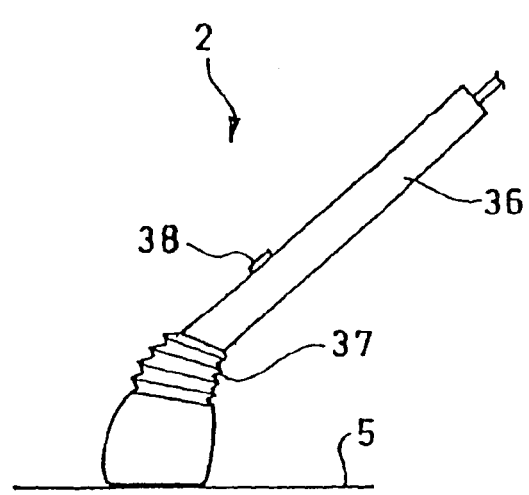
FIGS. 35(a) to 35(d) are perspective views each showing another form of a camera unit portion, and more specifically.
Figure 35:
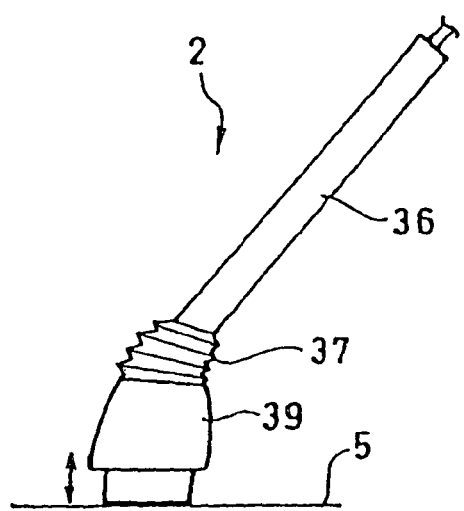
Figure 35:
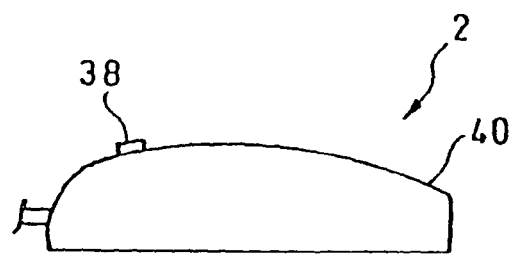
Figure 35:
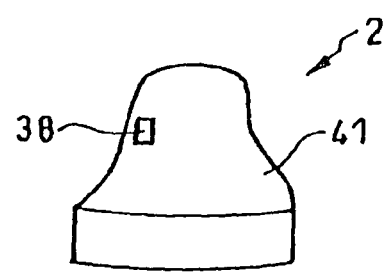

FIGS. 35(*a*) to 35(*d*) are perspective views each illustrating another embodiment of the camera unit portion and specifically, FIG. 35(*a*) shows a pen type camera unit, FIG. 35(*b*) shows a pen type camera unit, FIG. 35(*c*) shows a mouse shaped camera unit and FIG. 35(*d*) shows a stethoscope shaped camera unit.

The pen type camera unit 2 shown in FIG. 35(*a*) is connected to an end of a pen 36 movably by a bayonet 37. This is also provided with a button switch 38 at the pen axis. The pen type camera unit 2 shown in FIG. 35(*b*) is connected to an end of a pen 36 movably by a bayonet 37 and is further provided with a ring switch 39 around the camera. With this configuration, the switch is turned on only by pushing the camera unit 2 against the printed material 5. The mouse shaped camera unit 2 shown in FIG. 35(*c*) is provided in a mouse shaped main body 40 which takes form of a mouse. This is provided with a button switch 38 at the upper surface of the mouse shaped main body 40. Since the mouse shaped camera unit 2 is of size one can hold in his hand, it can be operated on the printed material 5 like a PC mouse. The stethoscope shaped camera unit 2 shown in FIG. 35(*d*) is provided in a main body 41 which can be held by fingers such as a stethoscope. This is also provided with a button switch 38 so that one can operate the camera unit 2 by picking up the camera unit 2 by the fingers.

Figure 36:
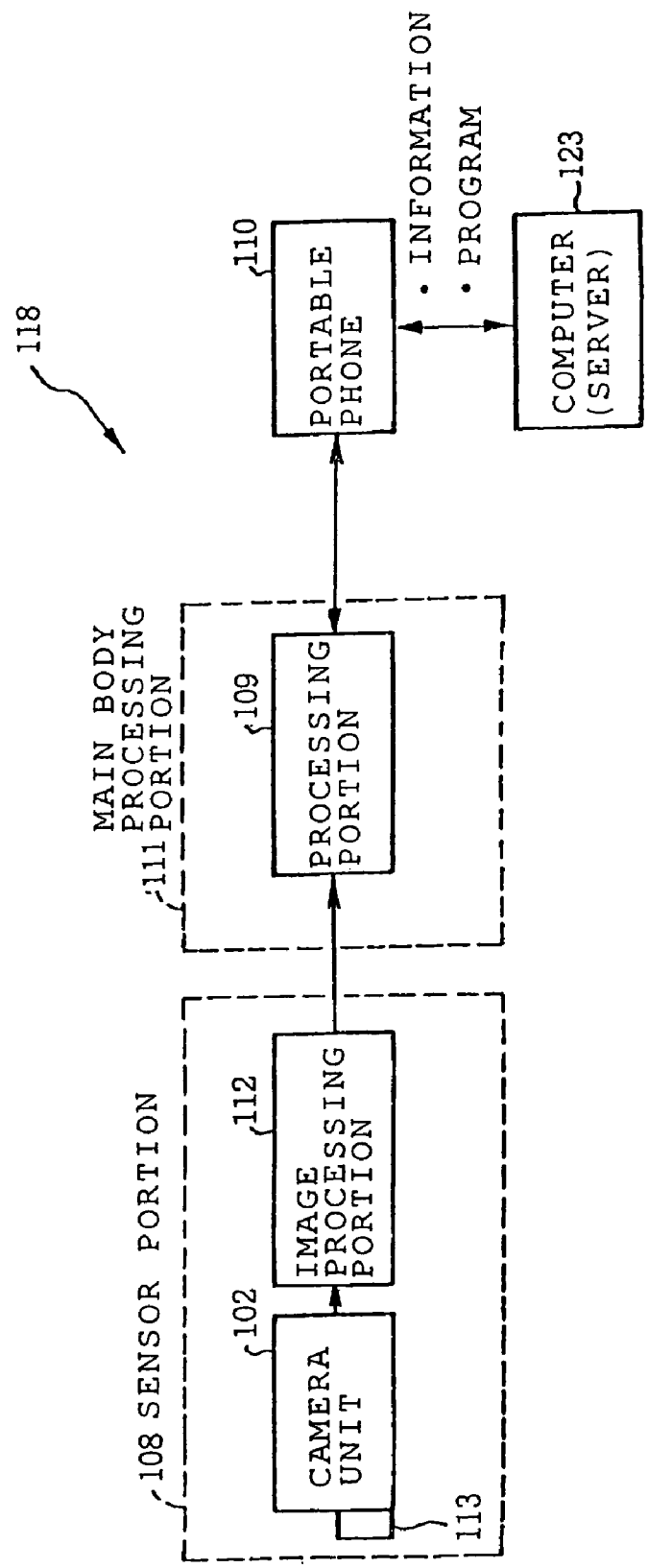
FIG. 36 is a functional block diagram for explaining an embodiment of an information inputting device using a camera for portable phone.

FIG. 36 is a functional block diagram for explaining an information inputting device using a camera for a portable phone.

The information inputting device 118 includes a sensor portion 108 which has a camera unit 102 and a main body processing portion 111 which includes a processing portion 109. This sensor portion 108 includes the camera unit 102 for capturing image data of only a dot pattern portion 6 (refer to FIG. 27) on a printed material 5 and an image processing portion 112 for digitalizing image data into numeric values. An infrared light emitting portion 113 for radiating the printed material 5 with infrared light is provided in the vicinity of this camera unit 102.

The main body processing portion 111 includes the processing portion 109 for outputting and executing information and program stored in advance in a storing portion (memory) of the portable phone 10, corresponding to the dot pattern portion 6, based on the numeric values obtained by image processing at the image processing portion 112. This main body processing portion 111 is further provided with a GPS (not shown) so as to easily display information of a current position.

The storing portion (memory) of the portable phone 110 can store information and a program not only in advance, but later. For example, the storing portion of the portable phone 111 can be configured to store information and a program by voice, image and letter information using a microphone, a camera (not shown) or the like.

Figure 37:
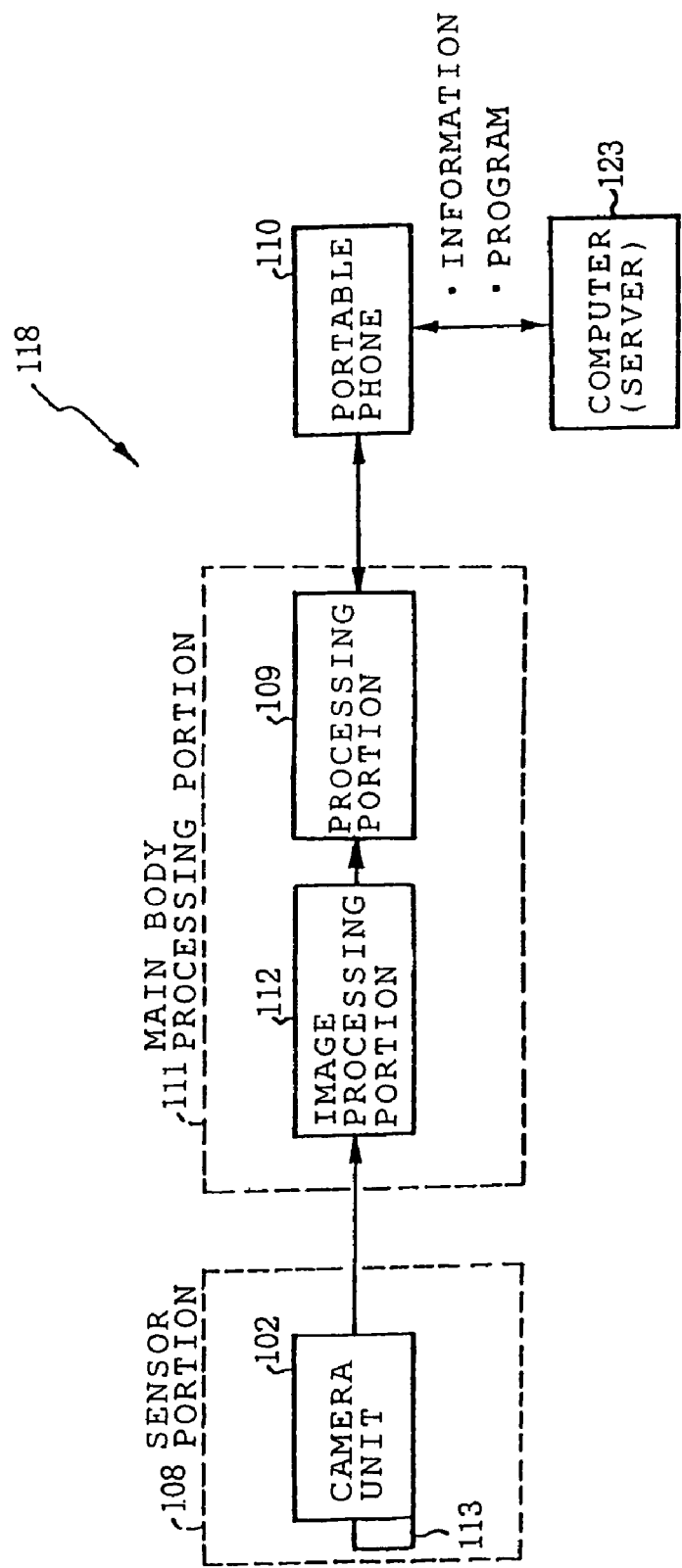
FIG. 37 is a functional block diagram for explaining an embodiment of an information inputting device using a camera.

FIG. 37 is a functional block diagram for explaining an embodiment of the information inputting device using a camera.

An information outputting device according to the embodiment includes a sensor portion 108. Since the sensor portion 108 only includes a camera unit 102, it can be configured to be compact.

Figure 38:
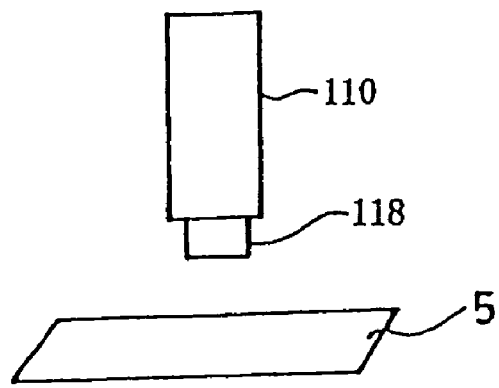
FIG. 38 is an explanatory view showing an information inputting device using a camera for portable phone.

FIG. 38 is a view for explaining an information inputting device using a camera for a portable phone.

The aforementioned information inputting device 118 can be used by being mounted on the portable phone 110. Since the information inputting device 118 is thus mounted on the portable phone 110, information and a program corresponding to the dot pattern portion 6 captured by the camera unit 102 can be output and executed by the portable phone 110.

Figure 39:
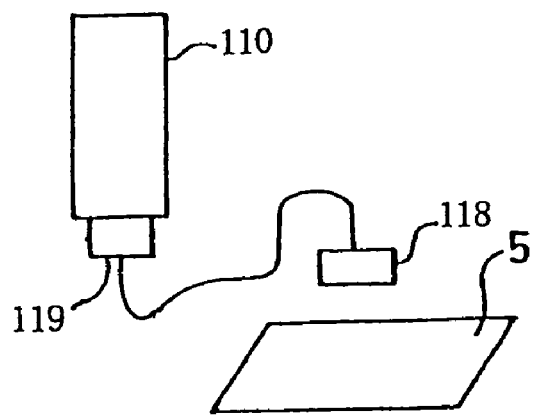
FIG. 39 is an explanatory view showing an information inputting device using a camera for portable phone.

FIG. 39 is a view for explaining an information inputting device using a camera for a portable phone.

The aforementioned information inputting device 118 can be used mounted on the portable phone 110 via an interface portion 19. Since the information inputting device is thus mounted on the portable phone 110 via the interface portion 19, the information inputting device 118 can be only moved freely.

This information inputting device 118 mounted on the portable phone 110 is utilized in the following manner. That is, it is possible to recognize voice information associated with the dot pattern portion 6 together with visual information from the information transfer portion 7 made of letters or illustrations on the printed material 5. At this time, it is possible to display, other than the voice information, image, text and the like simultaneously on the portable phone 110. The printed material 5, a educational material, a text, questions, a magazine, a newspaper, a photograph itself, a card, a member card, a photo stand, an adhesive coated picture, an explanation of a showpiece in a museum, a card game, a board game, a pamphlet, a wish book and the like.

Here, means for mounting the information inputting device 118 on the portable phone 110 is not limited to those shown in the figures, and it is needless to say that modification thereof can be made without departing from the scope of the invention.

Figure 40:
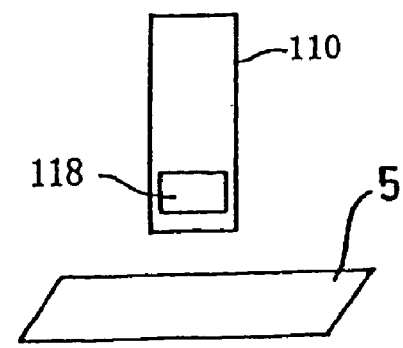
FIG. 40 is an explanatory view for showing a portable phone in which an information inputting device is integrated.

FIG. 40 is a view for explaining a portable phone which includes an information inputting device therein.

The information inputting device 118 of the invention can be embedded in the portable phone 110. Then, by integrating the portable phone 110 and the information inputting device 118, it is possible to present a more compact information inputting/outputting device.

The portable phone 110 can store information and a program in a storing portion from the outside using its communication function and transmit the stored information and program. This configuration makes it possible to transmit information and programs easily.

For example, a dot pattern 1 input by the camera unit 102 is converted into numeric values, which can be transmitted to a computer 123 via the communication function of the portable phone 110. Further, image data of the dot pattern 1 scanned by the camera unit 102 is converted into numeric values, which can be transmitted to a computer 123 via the communication function of the portable phone 110 and then, the portable phone 110 can receive information and programs corresponding to the data. Numeric data of the dot pattern portion 1 input by the camera unit 102 is input and corresponding voices, text an image are input. With this configuration, it is possible to output and execute using a dot pattern a conventionally-provided enormous amount of content for portable phones.

Further, since the communication function of the portable phone 110 is thus used, it is possible to transmit and receive information and programs easily. This configuration can be used to transmit voice information of responses by voice to questionnaire to a computer 123 such as a server. Or, voice responses to questions or a test can be transmitted to the computer 123 such as a server so as to test pronunciation and correct a response.

The portable phone 110 is further provided with a GPS to display information of a current position easily.

Figure 41:
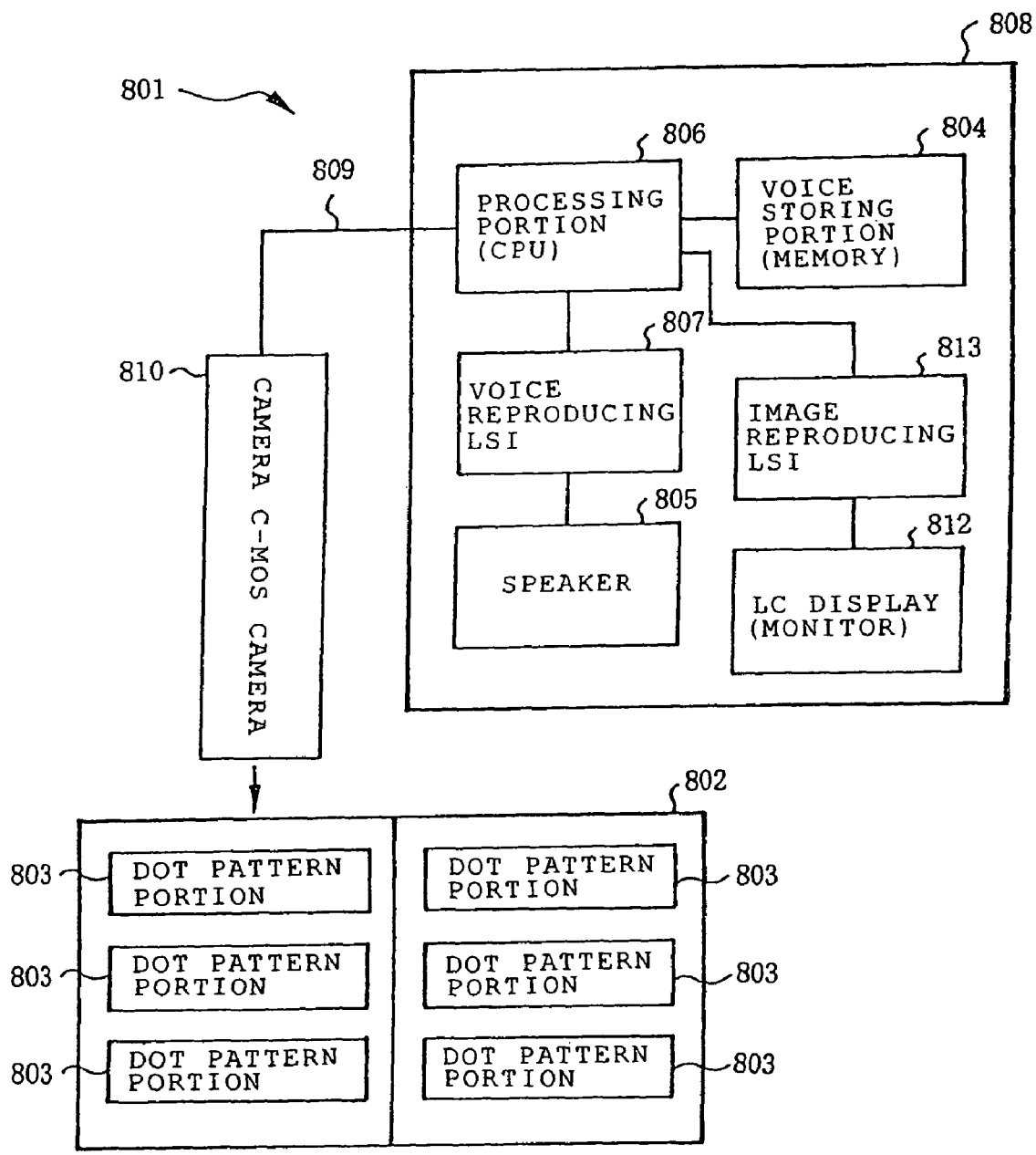
FIG. 41 is a functional block diagram of a portable electronic device according to the embodiment of using a dot pattern portion.
Figure 42:
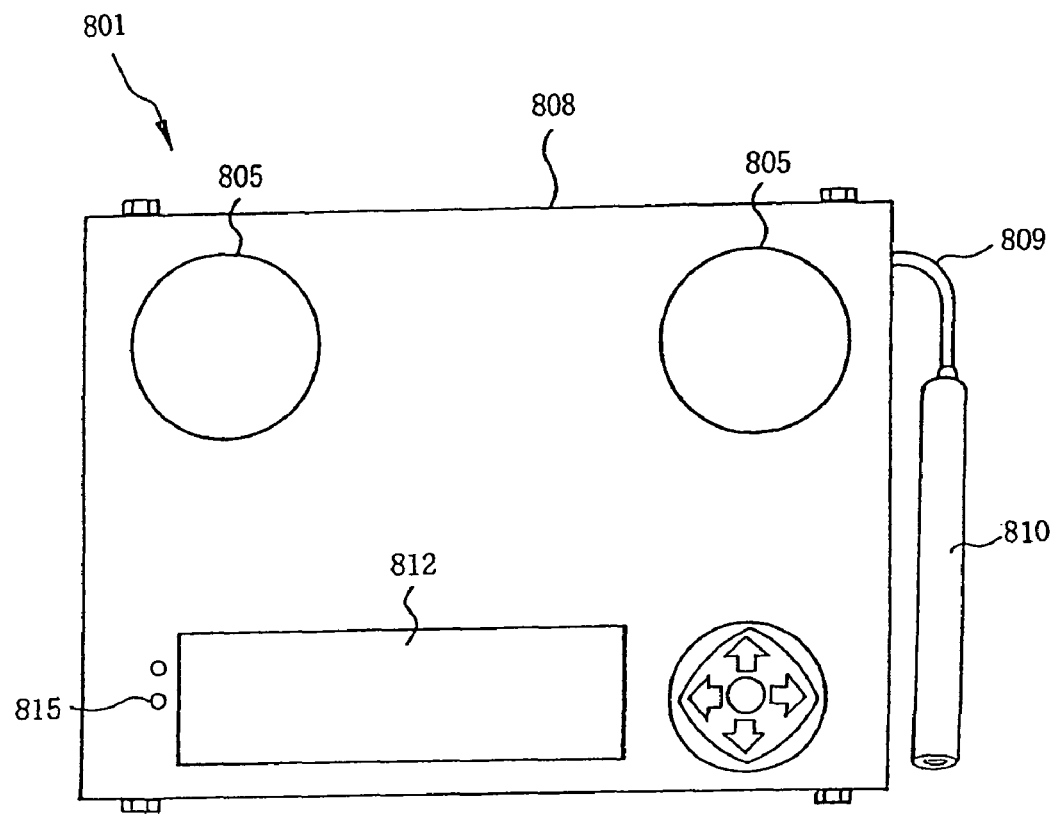
FIG. 42 is an elevation view for showing an embodiment of a portable electronic device using a dot pattern portion.
Figure 43:
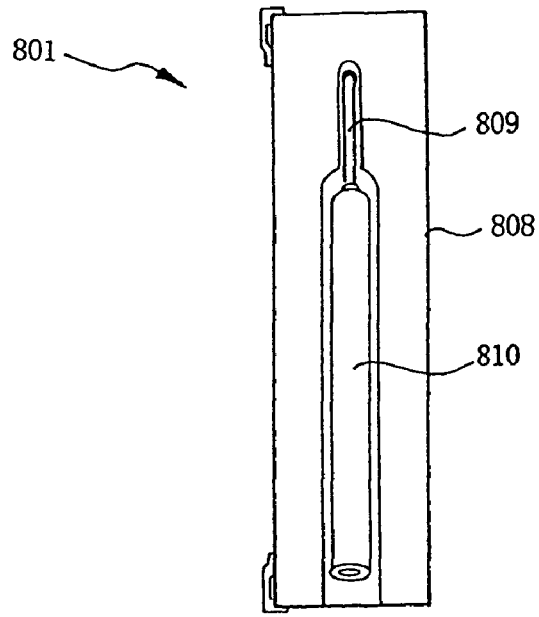
FIG. 43 is a right side view showing a portable electronic toy.
Figure 44:
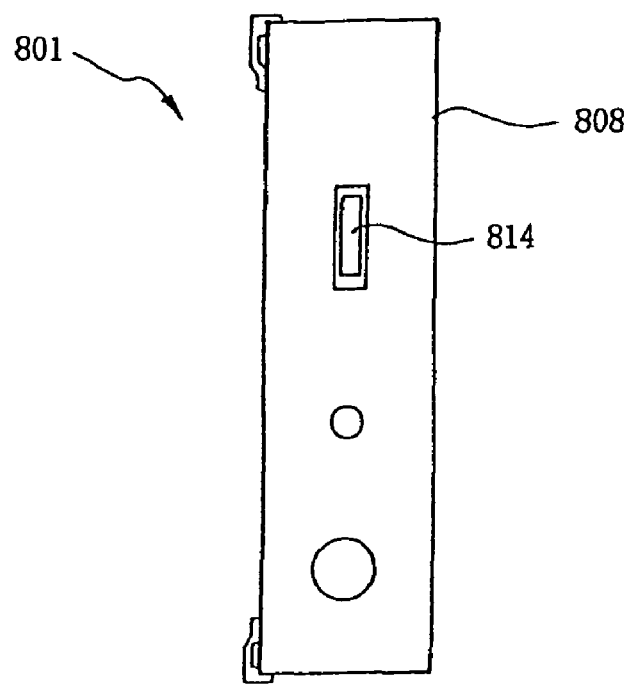
FIG. 44 is a left side view showing a portable electronic toy.
Figure 45:
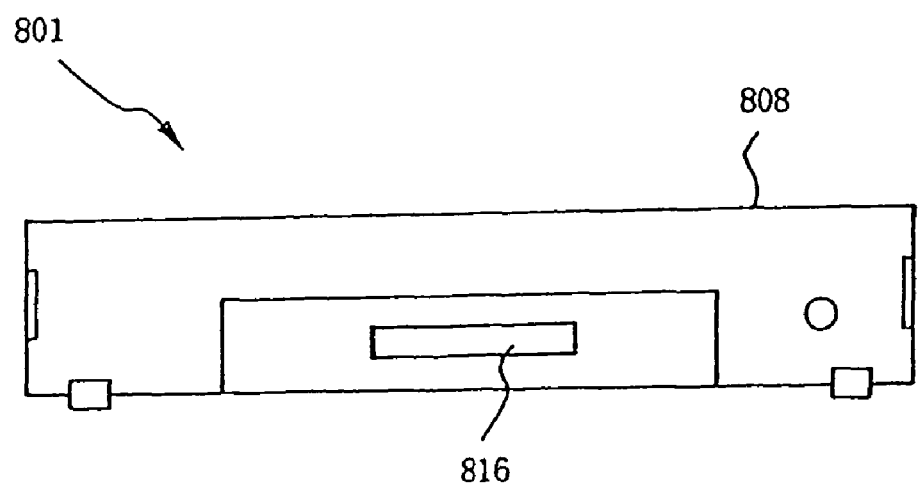
FIG. 45 is a bottom view showing a portable electronic toy.

FIG. 41 is a functional block diagram of a portable electronic toy according to an embodiment using a dot pattern of the invention. FIG. 42 is an elevation view showing a portable electronic toy according to the embodiment. FIG. 43 is a right side view showing a portable electronic toy according to the embodiment. FIG. 44 is a left side view showing a portable electronic toy according to the embodiment and FIG. 45 is a bottom view showing a portable electronic toy according to the embodiment.

A portable electronic toy 801 according to the embodiment is a toy for outputting various voices and music relating to a book, a game card, a small article, a toy or the like which is a medium 802. This portable electronic toy 801 includes a dot pattern portion 803 for recognizing records of a book or the like and a voice relating thereto, a voice storing portion 804 for storing various voices, a processing portion (CPU) 806 for controlling a speaker 805 to reproduce the voice and a voice reproducing LSI 807, which are housed in a case main body 808. This case main body 808 is connected by a cable 809 to a pen type camera 810 for capturing image data of the dot pattern portion 803.

The voice storing portion 804 housed in the case main body 808 of the portable electronic toy 801 stores voices to be reproduced based on information of the dot pattern portion 803 for recognizing the records of the book and its relating voices. This voice storing portion 804 can not only be used as an internal memory but also be used to capture latest contents by using an external memory. For example, the voice content can be updated by down loading a program from the outside, which enables one portable electronic toy 801 to be used repeatedly.

The camera 810 is configured to capture image data of the dot pattern portion 803 attached to a book, a game card, a small article or a toy, or image data of the dot pattern portion 803 which includes a number, a letter or the like as a recognition signal printed directly on the book or the like. Since the image data of the dot pattern portion 803 captured by the camera 810 is subjected processing by the image processing algorithm to extract dots and distortion due to the camera 810 is then corrected by the distortion correction algorithm, even when the image data of the dot pattern portion 803 is captured by a popular camera 810 of higher distortion ratio, accurate recognition can be achieved.

This camera 810 recognizes information of the dot pattern portion 803, and a voice and a music corresponding thereto is reproduced by the voice reproducing LSI 807 to be outputted via the speaker 805.

The case main body 808 of the portable electronic toy 801 according to the invention is of portable size of "a personal organizer" having a height of 13 cm× a width of 18 cm. Then, one can hold the portable electronic toy 801 in the hand and carry it in a bag.

Further, an LC display portion 812 provided at the case main body 808 is used to display other information than voices at a time. Display of this LC display 812 is implemented by an image reproduce LSI 13. Since other information than music can be also obtained at the same time, a portable electronic toy 801 according to the invention presents a wide range of application. In this portable electronic toy 801, when a switch 14 at the lateral face of the case main body 808 is turned on, a pilot lamp 15 is lighted on.

The voice storing portion 804 may utilize a storing medium 816 including a flash memory, a compact flash, a smart media, storing IC card, a memory stick, and the like, thereby facilitating change of a stored voice.

The voice storing portion 804 stores, for example, content data that is usable as an educational material for teaching pronunciation of a foreign language by voice (voice data, image data, moving image data, character code data of letters, symbols and the like). In addition, the voice storing portion 804 stores content usable as a picture book for creating music or a band with figures, a content as an educational material for emitting voices in combination with toys such as assembly blocks, content usable as a picture book for emitting music and conversation of a central character and the like as well as pictures of the picture book as a "sound picture book", and a content usable as a dictionary software for translating a foreign language by tracing a word or text as a "sound dictionary".

Further, the invention can be used as a versus game or an RPG software in combination with versus game cards, as a pamphlet for explaining by voice features of a product and company profile as a "sales promoting tool", or an electronic device for explaining by voice establishment of a museum and the like or notable sights of a sightseeing area.

The camera 810 can be housed in a side surface of the case main body 808 so that after the camera being used the portable electronic toy 801 can be taken along.

Light (not shown) is provided in the vicinity of the camera 810 and the dot pattern portion 803 is lighted on, thereby achieving accurate recognition of the dot pattern portion 803 even in the dark.

The portable electronic toy 801 according to the invention can be realized in the following various ways when being used by combining the dot pattern portion 803 with a medium 802 including a book, a game card, a small article and a toy.

<Sound Educational Material>

The portable electronic toy 801 according to the invention can be used as an educational material of miniature size book which can be set on the bottom of the case main body 808. The invention utilizes an advantage of excellent portability to present a "sound educational material" which can be used in studying anywhere at any time, for users in any generation, from children to adults or the aged. For example, letters in a book is traced to reproduce a voice. Using this configuration, the portable electronic toy 801 according to the invention can be used as a supplemental educational material of language education such as English conversation, child education including intellectual education and music, drill or the like.

<Versus Card Game>

The portable electronic toy 801 according to the invention can be used as a "versus card game". It is configured that when a "special seal and data collection" corresponding to the versus card game is created and a dot pattern portion 803 corresponding to each card is attached, a character of the card can start to speak in a vivid manner from the speaker 805 of the portable electronic toy 801. Besides, explanation is given by the voice of character, or tricks are introduced, the invention can be utilized as an item for extending the card function.

Or, if "special seal and data collection" corresponding to a famous film card is created, it is configured to output voice or music of the film by attaching a dot pattern portion 803 corresponding to the card. Or, if "special seal and data collection" corresponding to an idol card of an idol who has fixed fan base is created, it is configured to output a voice of the idol by attaching a dot pattern portion 803 corresponding to each card. Here, this can be utilized for tie-up development such that one phrase of a song is flowed for each card and all the song is flowed if all cards are collected.

The portable electronic toy 801 according to the invention can be used with enjoyment by attaching a dot pattern portion 803 to various materials near at hand to made sound. "Special seal and data collection" is created mischievously. Then, if a dot pattern portion 803 is attached to a material near at hand and the dot pattern portion 803 is traced by a camera 810, it can make sound. For example, for boys, the invention is combined with their favorite mini car kits and "special seal and data collection" is created to form a road that makes sound. A dot pattern portion 803 is attached to a road kit for mini cars including a cross over and buildings, so that when a car comes near the cross over, it clangs like "kan kan kan" or when a car goes away from the road, it sounds like "kikee (eg. sound of car slipping due to sudden braking)! Look!", thereby to enhance presence.

The portable electronic toy 801 according to the invention can present a new way of use such that a T-shirt is produced with many dot pattern portions 803 printed thereon to enjoy wearing it.

The portable electronic toy 801 according to the invention is usable as a "fortune-teller device". A user can enjoy himself with the portable electronic toy, and also, the portable electronic toy can be used in an entertainment of a party such as a welcome party for freshmen or an year end party. For example, when letters written on a "dedicated letter plate" (dot pattern portion 803) are traced in a sequential order by a camera 810, an interesting comment is outputted at random. By inputting a name using the letter plate, it can be used for "name-based fortune teller". A comment such as "today's fortune" is outputted. For example, the following weak comment can be made: "love fortune, job fortune and health fortune are all horrible, but, animal fortune is only great. If you go out, you may fall in love with a walking dog."

<Treasure Hunting Game>

The portable electronic toy 801 according to the invention can be utilized as a "treasure hunting game".

Portable electronic toys 801 according to the invention corresponding in number to participants are prepared and dot pattern portions 803 are invisibly attached to various areas in advance. After that, the participants start at the staring point (eg. entrance) all together, look for the hidden dot patterns portion 803 while following the instruction to go to the next place such as "look for the corridor". Then, one who is the first to have found the dot pattern portion 803 at the goal will win the game.

<Foreign Language Translator>

A portable electronic toy 801 according to the invention can be utilized as a "foreign language translator".

When a user encounters an unknown word while reading English newspaper or a foreign magazine, he traces the word (dot pattern portion 803) by a camera 810 and then, the toy translates the word into Japanese and reads it aloud.

A USB connector (not shown) can be provided at the case main body 808 so that a plurality of portable electronic toys 801 can be connected in a network. Cables to USB connectors are connected to each other and also to PCs and the like so as to be networked.

Figure 46:
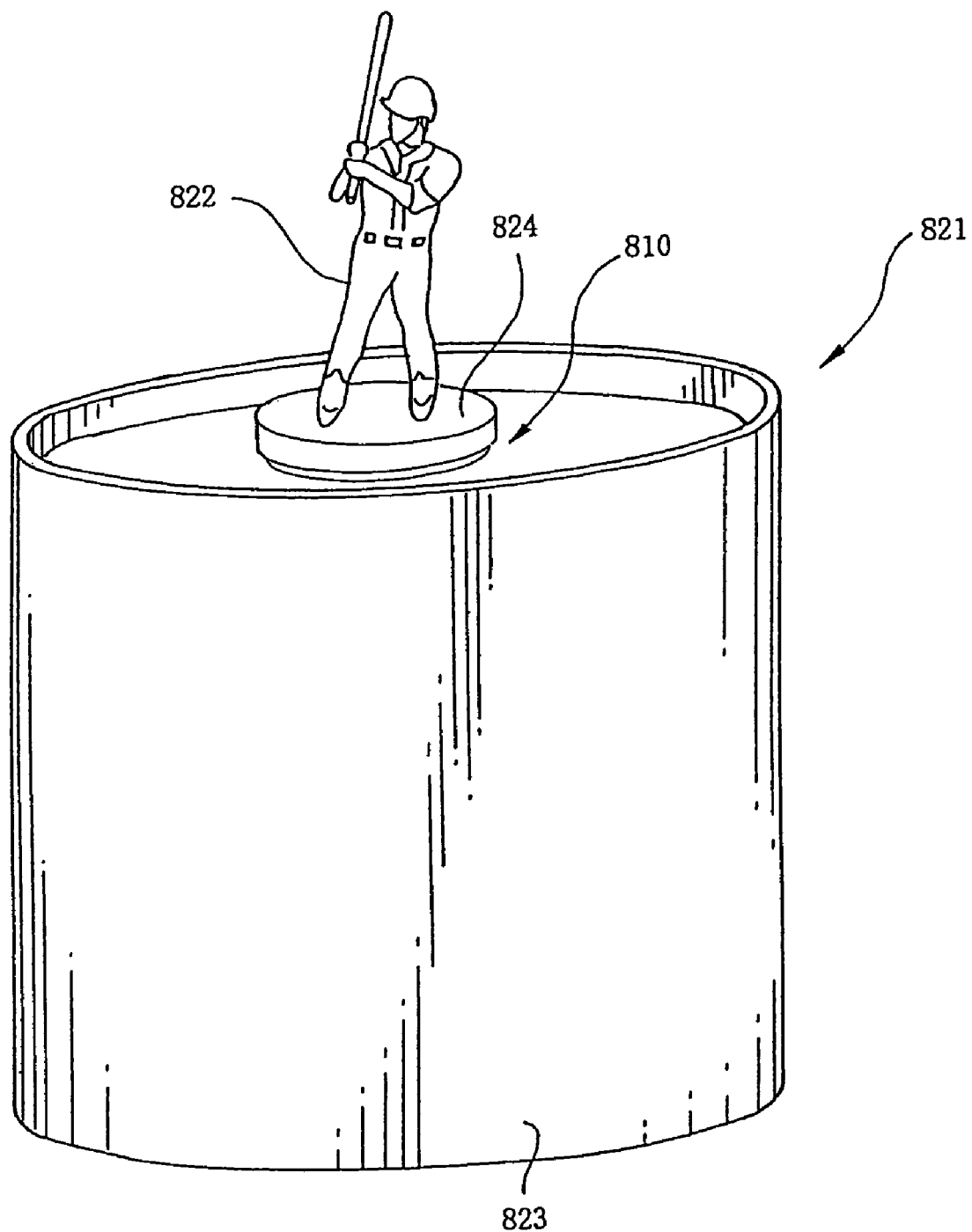
FIG. 46 is a perspective view for showing an embodiment of a portable electronic toy which emits a voice mainly corresponding to a mini figure.
Figure 47:
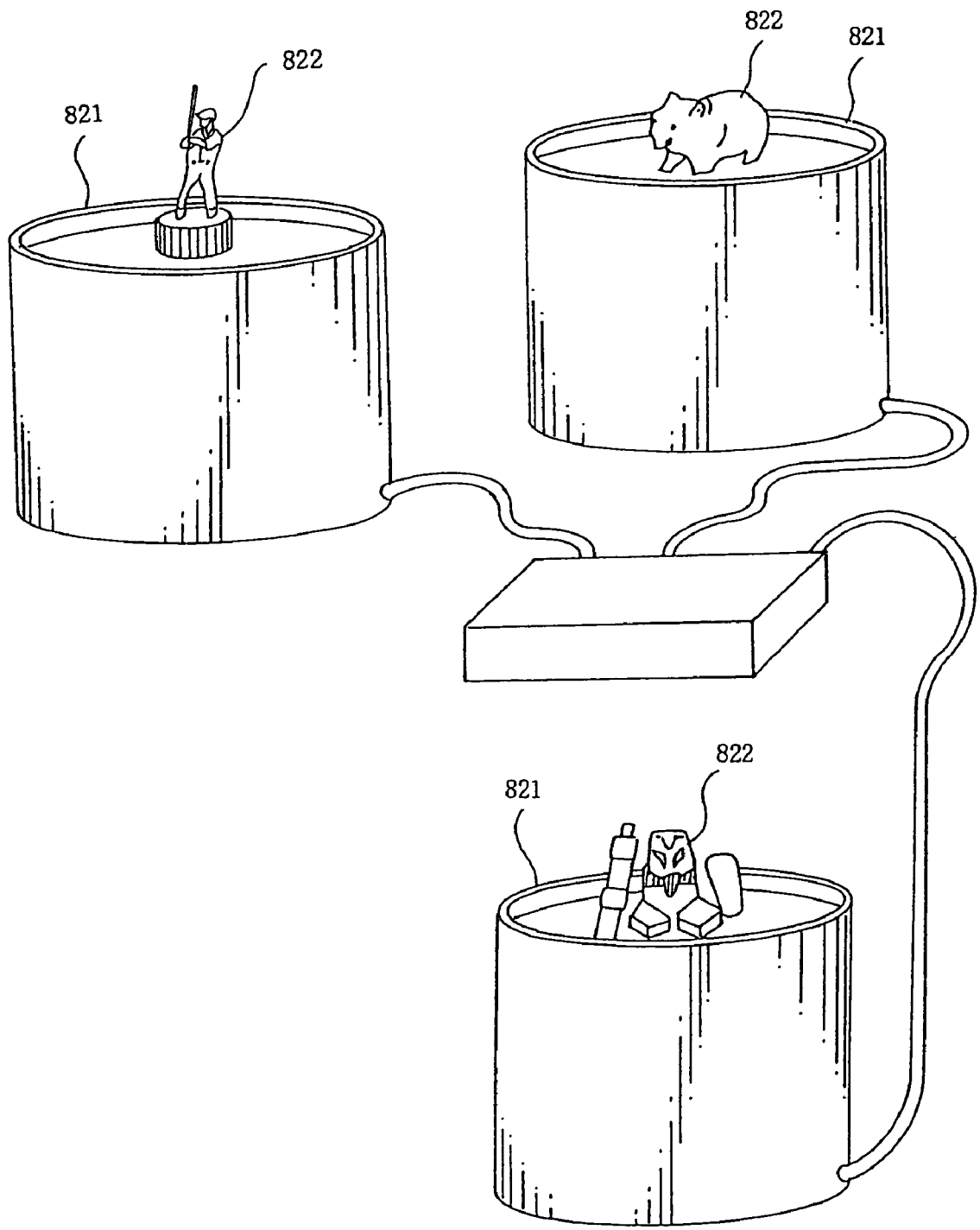
FIG. 47 is a functional block diagram of a portable electronic toy according to the embodiment.

FIG. 46 is a perspective view showing an embodiment of a portable electronic toy which generates voices corresponding mainly to a mini figure. FIG. 47 is a perspective view showing a plurality of voice emitting toys being connected to a controller unit.

A portable electronic toy 821 is a toy which generates a voice corresponding mainly to a mini figure. This portable electronic toy 821 include a dot pattern portion 803 which records code information for generating voice information corresponding to a character of mini FIG. 822, a voice storing portion 804, housed in a case main body 823, which stores a voice, a camera 810, a processing portion (CPU) 806 for making a speaker 805 to output a voice, and a voice reproducing LSI 807.

The dot pattern portion 803 is configured by a round sheet member that can be attached to a table 824 of the mini FIG. 822 or the inner ceiling of a bottle cap, and one surface of the dot pattern portion is coated with an adhesive agent and the dot pattern portion 803 is displayed on the other surface of the sheet member. However, instead of using the sheet member, the dot pattern portion 803 can be printed on the mini FIG. 822, itself.

The voice storing portion 804 housed in the case main body 823 of the portable electronic toy 821 can not only be used as an internal memory but also capture latest content data by use of an external memory. For example, a program or data is input from the outside or downloaded via a network to update the substance of the voice, thereby enabling one portable electronic toy 821 to be used repeatedly.

Preferably, there is light provided as lighting means in the vicinity of the camera 810 at the center of the case main body 823. With this configuration, the dot pattern portion 803 is lightened up and thereby the image data of the dot pattern portion 803 can be recognized accurately even in the dark.

Figure 48:
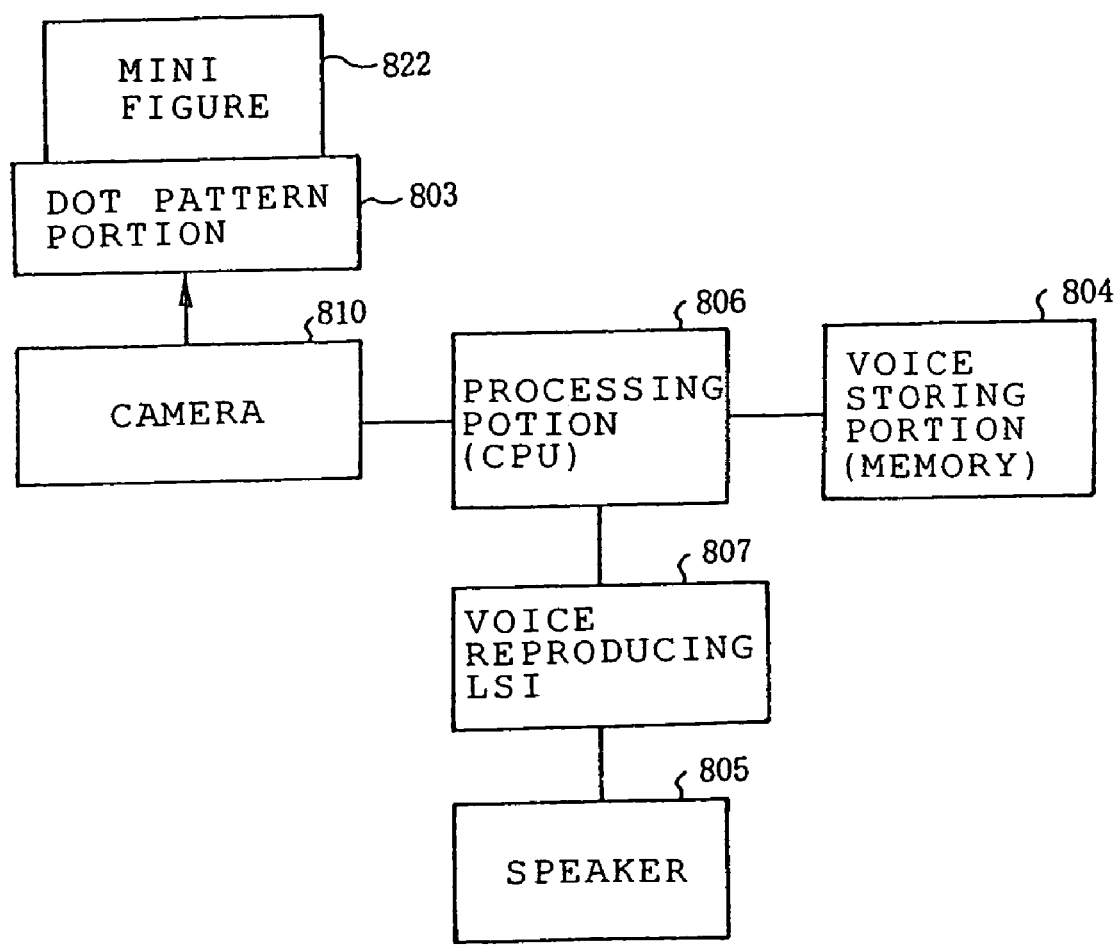
FIG. 48 is a perspective view showing a plurality of voice emitting toys being connected to a controller unit.

FIG. 48 is a functional block diagram illustrating a portable electronic toy according to the embodiment.

Each case main body 823 is provided with a USB connector (not shown) so that a plurality of portable electronic toys 821 can be connected corresponding to a network environment. A cable connected to the USB connector is coupled to a PC or the like to be networked.

Figure 49:
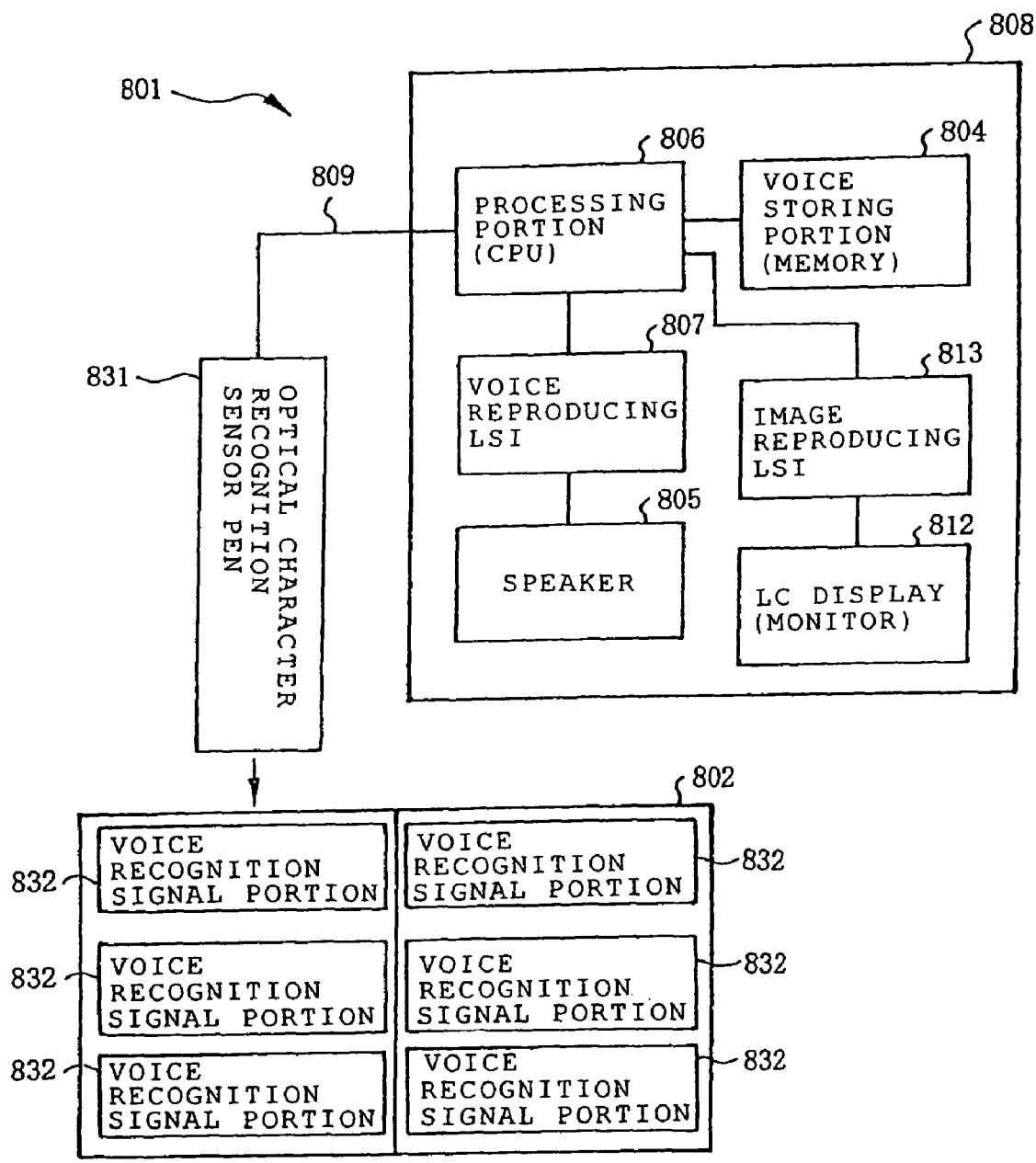
FIG. 49 is an elevation view showing n embodiment of portable electronic toy which utilizes optical character recognition (OCR).

FIG. 49 is a functional block diagram illustrating a portable electronic toy of an embodiment that utilizes an optical character recognition (OCR) according to the invention.

This embodiment employs, in place of the camera 810 and the dot pattern portion (recognition seal) 3 of the above-described embodiment, an OCR sensor pen 831 and a voice recognition signal portion 832. In other words, by utilizing OCR, the portable electronic toy 801 is a toy for emitting a various voice and music relating to a book, a game card, a small article, a toy or the like which is a medium 802. This portable electronic toy 801 includes a voice recognition signal portion 832 for recognizing records of a book or the like and its relating voice, a voice storing portion 804 for storing various voices, a processing portion (CPU) 806 for making a speaker 805 to output the voice, and a voice reproducing LSI 807, which are housed in a case main body 808. Connected to this case main body 808 is an OCR sensor pen 831 by a cable 809.

The OCR sensor pen 831 is a pen for tracing an icon seal (voice recognition signal portion 832) attached to a book, a game card, a small article, a toy or the like or the voice recognition signal portion 832 on which a number, letters or the like as a recognition signal of the book or the like are directly printed. In other words, the OCR sensor pen 831 recognizes a number, a simple mark or the like added on the voice recognition signal portion 832 and corresponding voice and music are reproduced by the voice reproduce LSI 807 to be outputted by the speaker 805.

Figure 50:
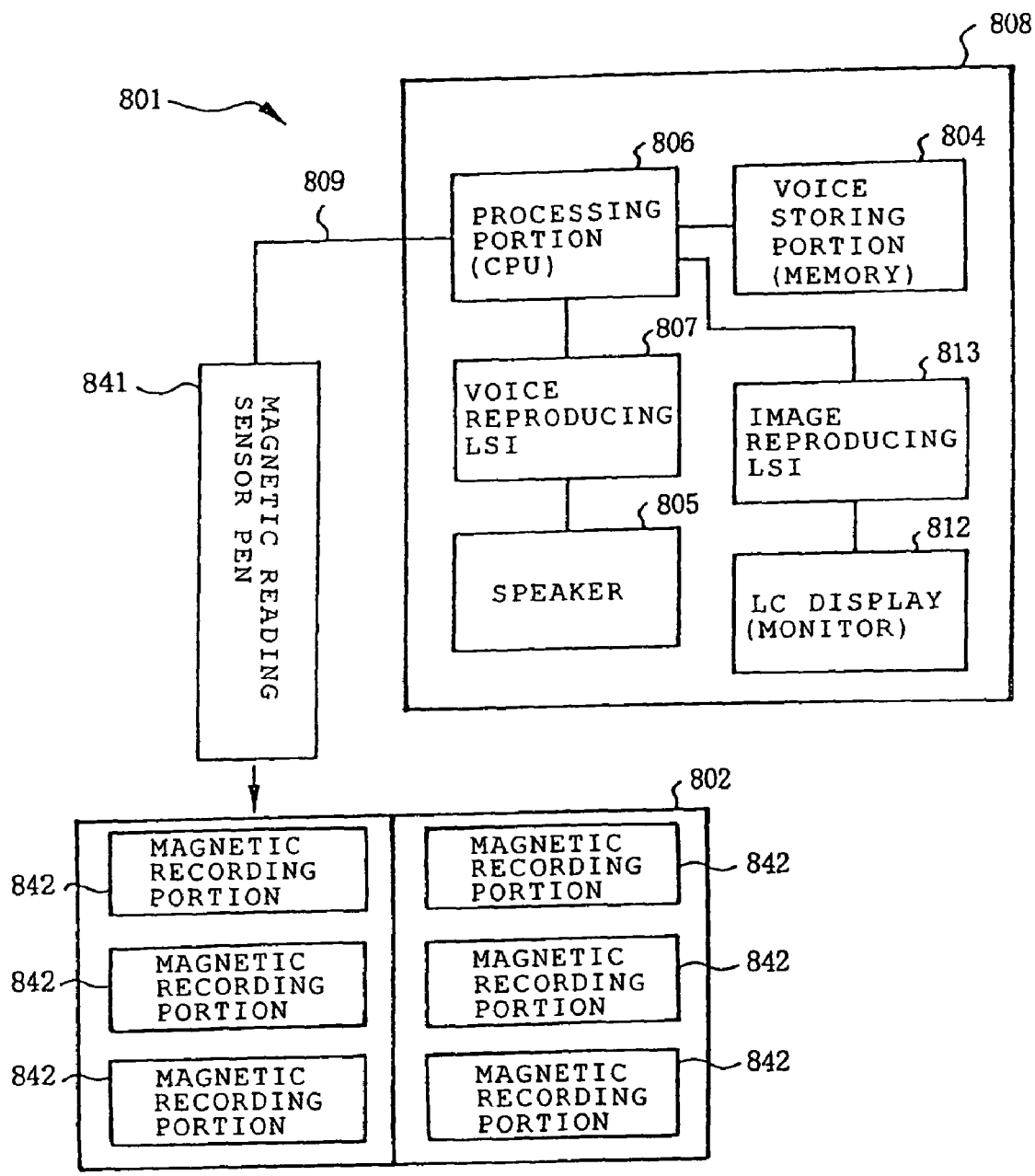
FIG. 50 is a functional block diagram of a portable electronic toy showing an embodiment which utilizes a magnetic member.

FIG. 50 is a functional block diagram of a portable electronic toy, showing an embodiment which utilizes a magnetic member.

This embodiment employs, in place of the camera 810 and the dot pattern portion (recognition seal) 3, a magnetic scanning sensor pen 841 and a magnetic recording portion 42. In other words, this portable electronic toy 801 employs the magnetic recording portion 42 for recognizing a voice corresponding to a medium or the like, the voice storing portion 804 for storing the voice corresponding to the magnetic recording portion 842, and the magnetic scanning sensor pen 841 for scanning the magnetic recording portion 842. This magnetic scanning sensor pen 841 is used to scan the magnetic recording portion 842 and the voice reproducing LSI 807 reads a corresponding voice from the voice storing portion 804 to reproduce the voice via a speaker 805.

In this embodiment, in addition to reproducing a voice and music corresponding to the medium 802, it is possible to readily change recorded data of the magnetic recording portion 842 attached to the medium 802. Then, a user is allowed to change the voice into his favorite voice.

Figure 51:
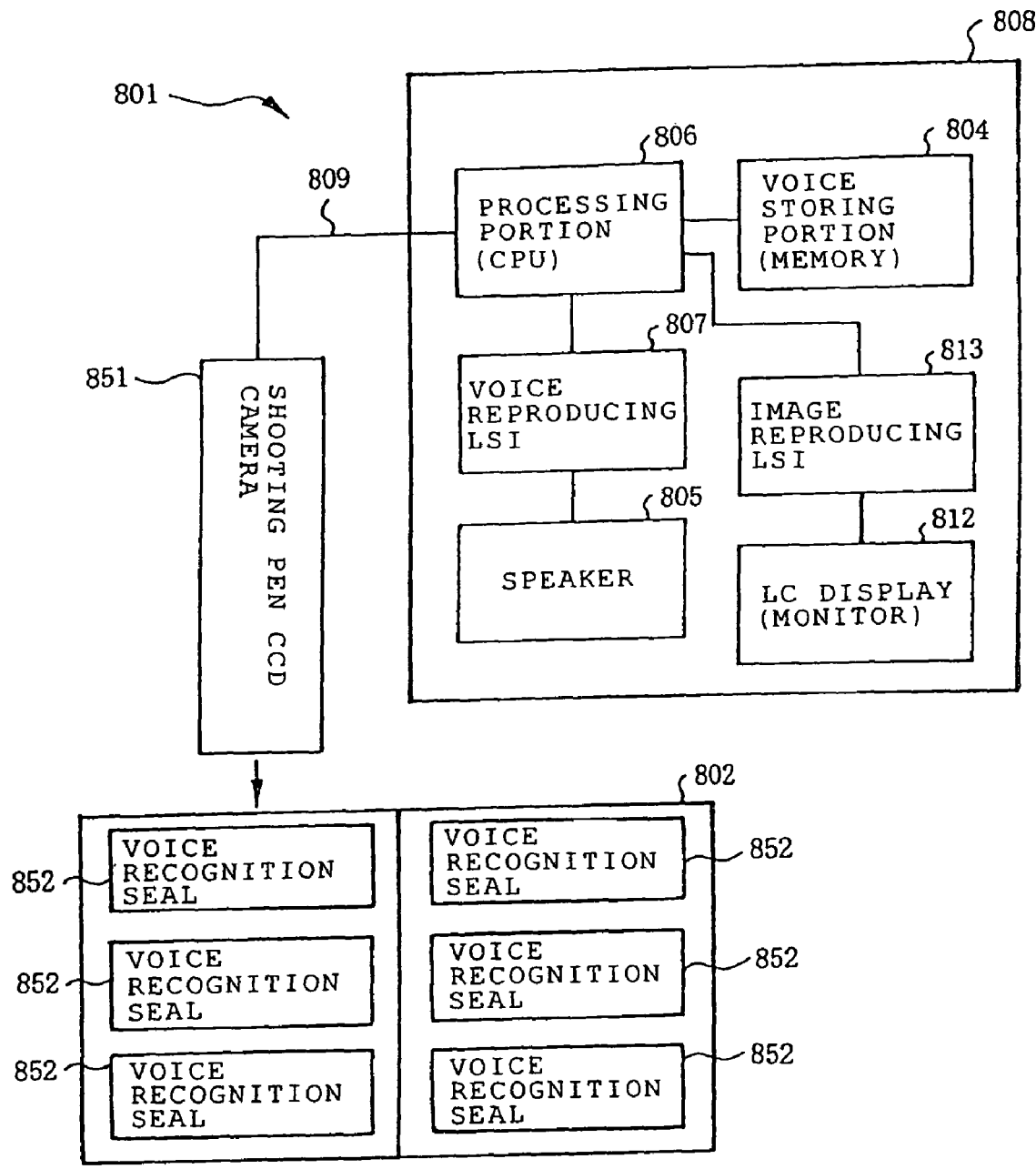

FIG. 51 is a functional block diagram illustrating a embodiment which utilizes a shooting pen of a camera or the like.

In this embodiment, the dot pattern portion (recognition seal) 803 of the above described embodiment is replaced with a voice recognition seal. In other words, the portable electronic toy of the embodiment includes a voice storing portion 804 for storing a voice corresponding to each shape or color printed on the medium 802, a shooting pen 851 such as a CCD camera for shooting a shape or the like printed on the medium 802, and a processing portion 806 for reading from the voice storing portion 804 a voice corresponding to a color or shape shot by the shooting pen 851 and image relating to the color to output the voice via a speaker 805.

According to this embodiment, it is possible to reproduce a voice and music corresponding to a shape and color printed on the medium 802 without employing the dot pattern portion 803, the voice recognition signal portion (recognition seal) 832 or the magnetic recording portion (magnetic sheet) 842. Here, light (not shown) is further provided in the vicinity of the shooting pen 851 such as a CCD camera. With this configuration, the medium 802 is lighten up thereby to shoot a shape thereof accurately even in the dark.

Further, provision of the shooting pen 851 such as a CCD camera makes it possible to generate various voices and music corresponding to the medium 802 by use of the voice recognition seal 852. For example, it is configured to include a voice recognition seal 852 which can be attached to the medium 802 and recognizes a voice corresponding to the medium 802 or the like, a voice storing portion 804 for storing a voice corresponding to the voice recognition seal 852, a shooting pen 851 for shooting the voice recognition seal 852 and a processing portion 806 for reading from the voice storing portion 804 a voice corresponding to a number, letter or the like as a recognition signal of the voice recognition seal 852 shot by the shooting pen 851 to output the voice from the speaker 805.

Here, the invention is not limited to the above described embodiments. The configuration of the invention needs only to recognize a medium 802 such as a book itself and reproduce a given voice by the voice reproducing LSI 807 via the speaker 805, and is not limited to the shape of the case main body 808 shown in the figures. Further, it is needless to say that various modifications of the invention can be made without departing from the scope of the invention.

Figure 52:
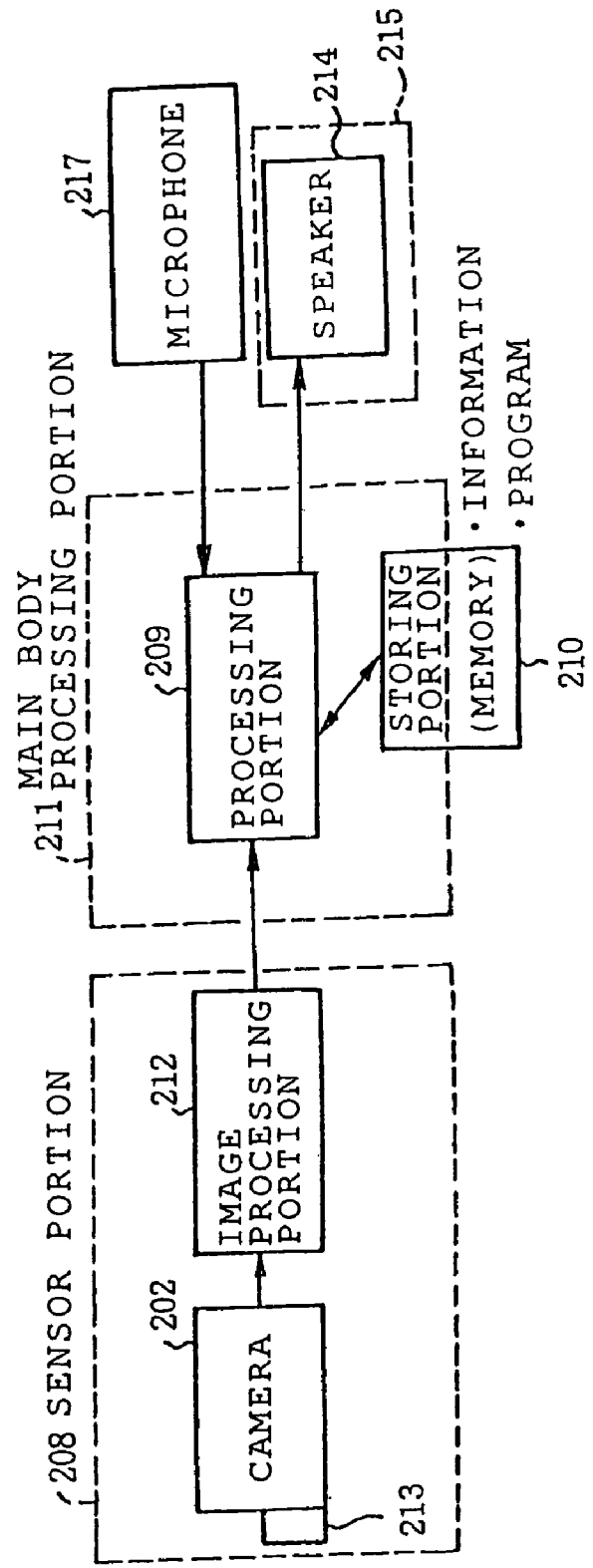
FIG. 52 is a functional block diagram for showing a figure unit having an information outputting function by camera inputting, in which a camera unit and an outputting unit are configured separately.
Figure 53:
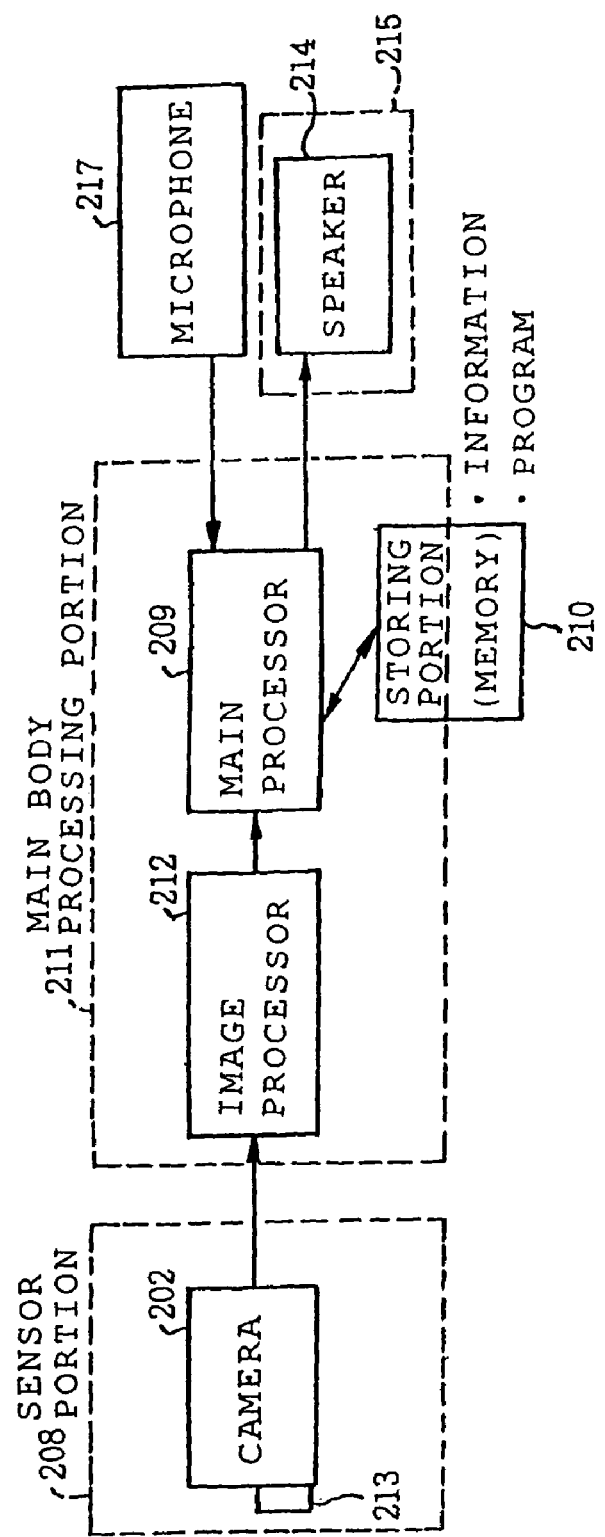
FIG. 53 is a functional block diagram for explaining a modified example of the embodiment.

FIGS. 52 and 53 are functional block diagrams of a figure unit having an information outputting function by camera inputting, in which embodiment a camera and an outputting portion are integrally formed.

The figure unit according to the embodiment includes a sensor portion 208 which has a camera 202 and an image processing portion 212, a main body processing portion 211 which has a processing portion 209 and a storing portion (memory 210). The camera 202 of the sensor portion 208 captures only image data of a dot pattern portion 803 on a printed material and the image processing portion 212 digitalizes this image data into numeric values. In the vicinity of this camera 202 there is provided an infrared light emitting portion 213 for radiating the printed material 5 with infrared light.

The processing portion 209 of the main body processing portion 211 is for outputting and executing information and a program stored in advance in the storing portion (memory) 210, corresponding to a dot pattern portion 803 based on the numeric values obtained by the image processing at the image processing portion 212. This main body processing portion 211 includes an outputting portion 15 such as a speaker 14.

The storing portion 10 can store information and programs not only in advance, but also later. For example, the storing portion 10 is capable of storing information and programs which are inputted later by a microphone 17.

FIG. 53 is a modification of the embodiment on FIG. 52, in which the sensor portion 208 includes only a camera 202. By this configuration, it is possible to configure a compact sensor portion 208.

Figure 54:
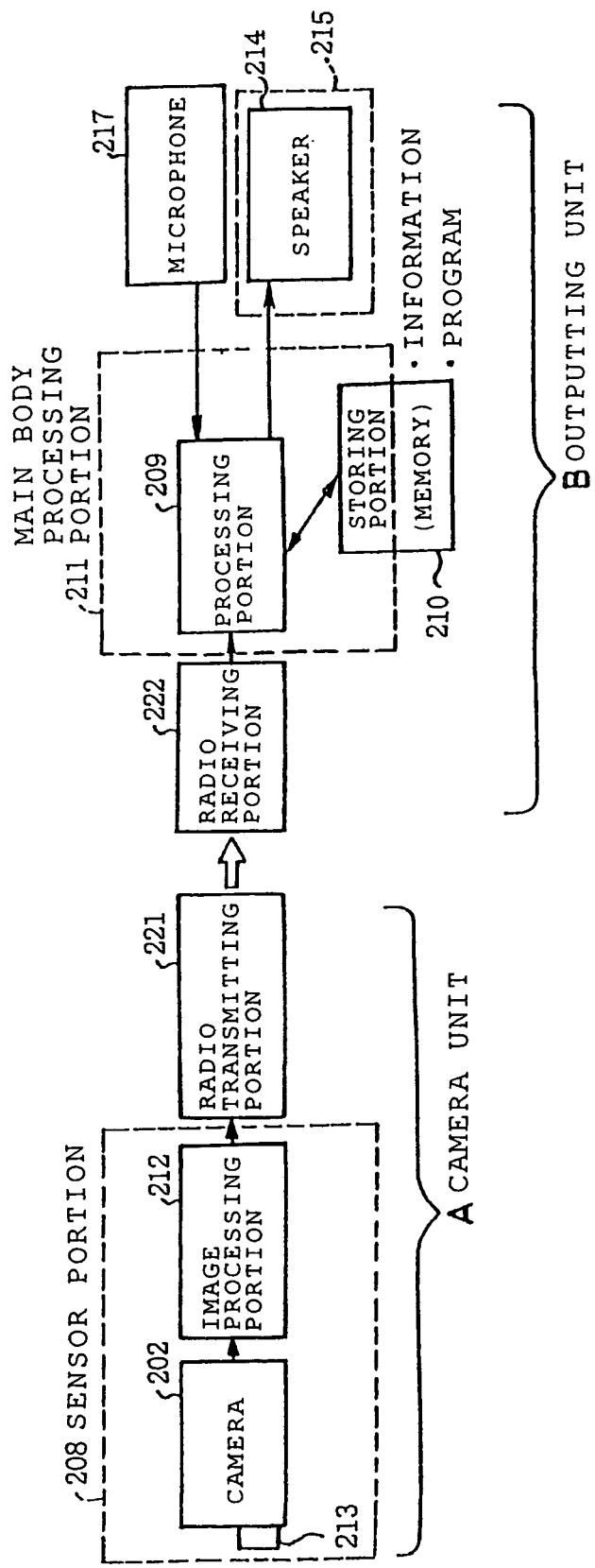
FIG. 54 is a functional block diagram for showing a figure unit having an information outputting function by camera inputting, in which a camera unit and an outputting unit are configured separately.
Figure 55:
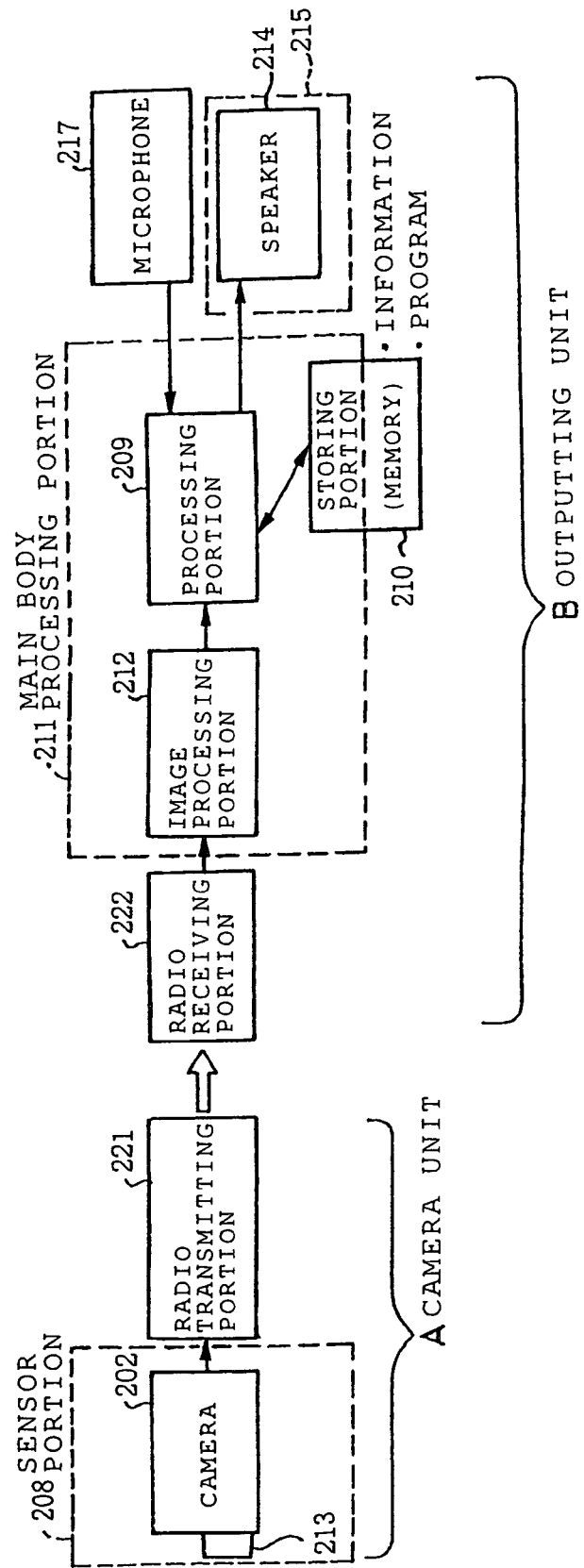
FIG. 55 is a functional block diagram for explaining a modified example of the embodiment.

FIGS. 54 and 55 are functional block diagrams illustrating a figure unit which has an information outputting function by camera inputting, in which embodiment a camera unit and an outputting unit are provided separately.

The figure unit of this embodiment includes a camera unit A and an outputting unit B. The camera unit A includes: a sensor portion 208 which has a camera 202 and an image processing portion 212; and a radio transmitting portion 21 which an interface portions. The camera 202 of the sensor portion 208 capture only image data of a dot pattern portion 803 in a printed material 5, and the image processing portion 212 digitalizes the image data into numeric values. In the vicinity of the camera 202 an infrared light emitting portion 213 is provided for radiating the printed material 5 with infrared light.

The outputting unit B includes: a radio receiving portion 22; a main body processing portion 211 having a processing portion 209 and a storing portion (memory) 210; and an outputting portion 15 such as a speaker 14. The processing portion 209 of the main body processing portion 211 is for outputting and executing information and programs stored in advance in the storing portion (memory) 210, corresponding to the dot pattern portion 803, based on the numeric values obtained by the image processing by the image processing portion 212. The radio transmitting portion 21 and the radio receiving portion 22, which are interface portions, communicate by using infrared light. This outputting unit B can use a PC directly.

FIG. 55 is a modification of the embodiment on FIG. 54, in which the sensor portion 208 only includes a camera 202. This configuration makes it possible to configure a compact sensor portion 208.

Figure 56:
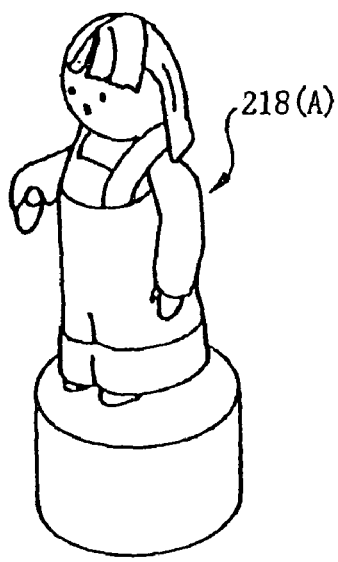
FIGS. 56(a) to 56(d) are perspective views each showing a figure with a camera unit and more specifically.
Figure 56:
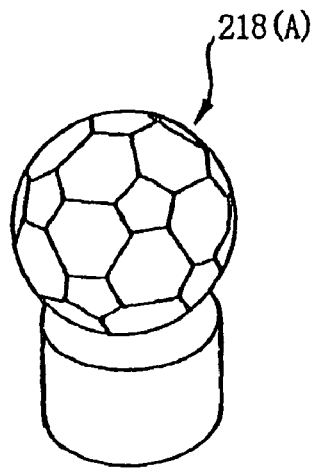
Figure 56:
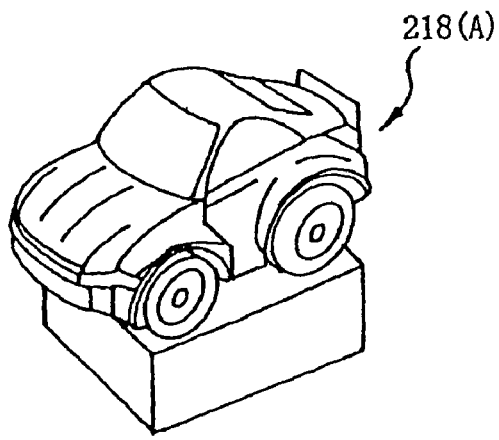
Figure 56:
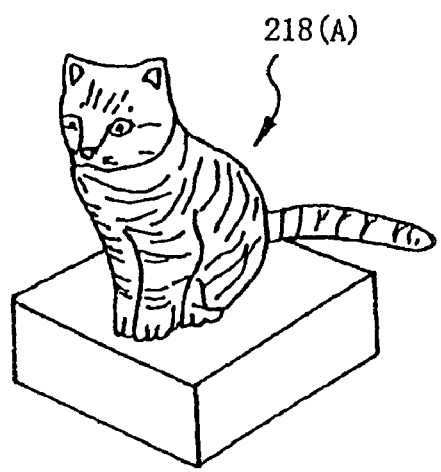

FIG. 56(*a*) to FIG. 56(*d*) are perspective views each illustrating a figure with a camera unit. More specifically, FIG. 56(*a*) is an example of a doll, FIG. 56(*b*) is an example of a soccer ball, FIG. 56(*c*) is an example of a car and FIG. 56(*d*) is an example of an animal.

Each of the examples in the figures shows a figure unit including a camera unit A of a FIG. 218 with a camera 202. When this FIG. 218 is put on a printed material 5 and image data of a dot pattern portion 803 is captured, this dot pattern portion 803 is radiated with infrared light thereby to scan only the dot pattern portion 803, which is printed with a carbon ink, separately from an information transfer portion 7 printed with a non-carbon color ink. Here, the shape of a FIG. 218 is not limited to those in the figures, and various modifications can be made without departing from the scope of the invention.

In a figure unit of the invention as described above, it is possible to output and execute various types of voice information via a medium such as the printed material 5. Examples of how to use a figure unit are described below.

<Usage as a Piece of "SUGOROKU" or "Board Game">

A FIG. 218 of the present invention can be used as a piece of a "SUGOROKU" or a "board game". When the FIG. 218 is put on the "SUGOROKU" or "board game", a camera 202 of the FIG. 218 is used to output a certain voice of a dot pattern 803 on a printed material 5 so as to provide instructions by voice. Then, it is possible to extend the range of the way of playing "SUGOROKU" and "board game".

<Usage as a Piece of "Japanese Military Chess" (Military Shogi)>

A FIG. 218 of the invention can be used as a piece of a Japanese military chess. When this FIG. 218 is put on a chase board (printed material 5) of "Japanese military chess", a camera 202 of the FIG. 218 is used to scan a dot pattern portion 803 on the base (printed material 5) of the board game thereby to output a given voice. Since instructions can be notified by voice, this game can be developed as a game that has been never seen and has a new aspect. For example, a processing program of the main body is used to provide match of pieces (FIG. 218) with contingency and time axis. Such added values contribute, as essential factors, to realistic reproduction of a battle area and production of new strategies that have never seen in the normal Japanese military chess, and thereby people can enjoy playing the game.

Figure 57:
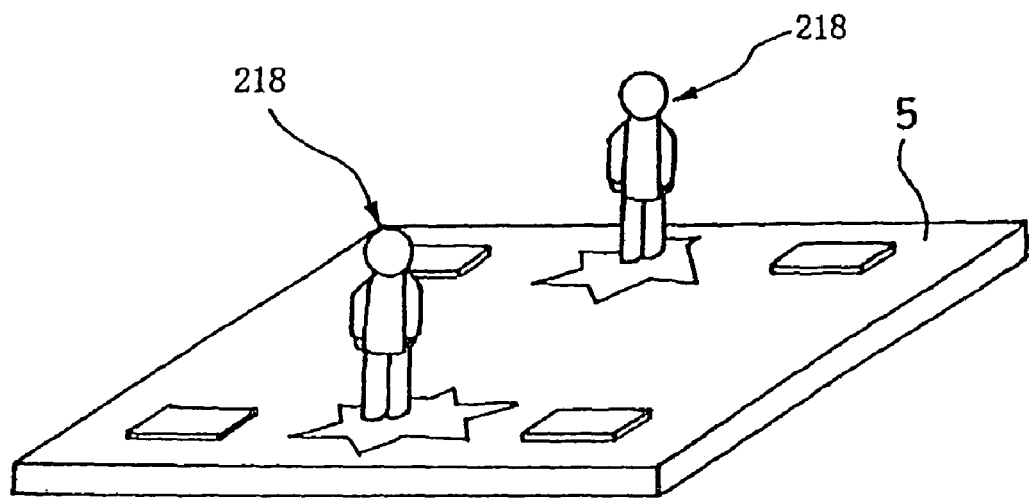
FIG. 57 is a perspective view showing figure units put on the center battle stage of a new simulation board game.

FIG. 57 is a perspective view of a figure unit of the invention being put on a central battle stage of a new simulation board game.

<Usage as a Piece of "New Simulation Board Game">

A figure unit of the invention can be used as a piece of a "board game". When a base (printed material 5) and a FIG. 218 are set up, the figure can be put on the base (printed material 5) to play a game. In match, FIG. 218 are arranged face to face with each other on a central battle stage (printed material 5). On the stage, a dot pattern portion 803 and an information transfer portion 7 are printed. This dot pattern portion 6 is scanned by a scanner 202 of a FIG. 218, and based on an inside processing program, a complicated versus game can be developed.

Thus, since the figure unit of the present invention can be used as an input interface printed on the printed material 5 or the like, an interface suitable for each content can be manufactured. Besides, if a paper interface is downloaded in PDF or the like and outputted by a printer and a program corresponding thereto is downloaded to be installed in a PC or the like, the interface can be supplied via a network.

Figure 58:
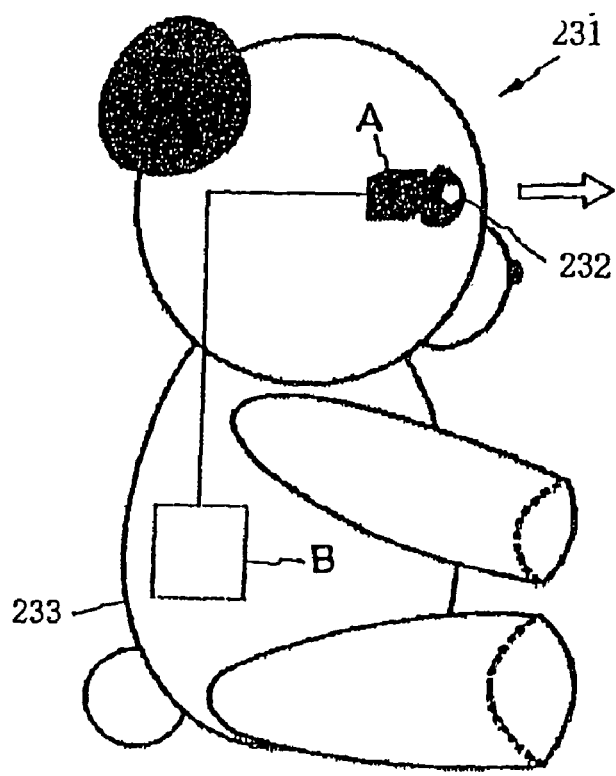
FIG. 58 is a cross sectional view for explaining another embodiment of the invention in which a camera unit and an outputting unit are housed in a stuffed toy that is one form of the figure.

FIG. 58 is an explanatory cross sectional view illustrating another embodiment of the invention in which a camera unit and an outputting unit are integrated in a stuffed toy as one type of figure.

The camera unit A and the outputting unit B of the invention can be integrated in a stuffed toy 231, which is one type of the above-described FIG. 218 and created by stuffing an elastic material such as a cotton or a sponge in an outer skin of predetermined shape. For example, a lens portion of camera units A are arranged at eye boll portions 232 of the stuffed toy 231 and an outputting unit B is housed in a body 233 of the stuffed toy 231 in such a manner that the outputting unit B can be freely put in and out. By this configuration, a favorite stuffed toy 231 itself can be used as a device for reproducing given information and voice.

Figure 59:
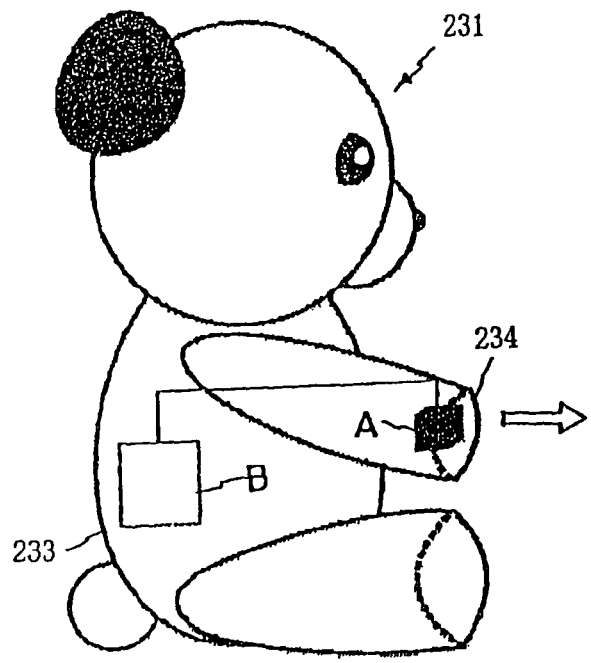
FIG. 59 is a cross sectional view for explaining another embodiment in which a camera unit and an outputting unit are housed in a stuffed toy that is one form of the figure.
Figure 60:
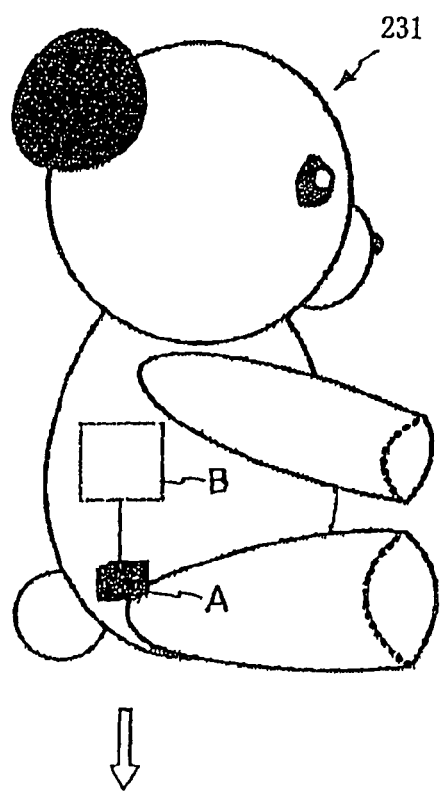
FIG. 60 is a cross sectional view for explaining another embodiment of the invention in which a camera unit and an outputting unit are housed in a stuffed toy that is one form of the figure.

FIGS. 59 and 60 are explanatory cross sectional view illustrating another embodiments of a stuffed toy as one type of figure in which a camera unit and an outputting unit are integrated.

Regarding a camera unit A housed in a stuffed toy 231, it is not always necessary to arrange camera units A at eye ball portions 232 of the stuffed toy 231. For example, camera units A can be arranged at hands 34 of the stuffed toy 231, instead of the eye ball portions 232 of the stuffed toy 231, which is shown in FIG. 59. A camera unit A can no doubt be arranged at another desired position, for example, at the bottom portion, the chest portion, or at the legs. The position where the camera unit A is arranged is determined depending on the kind of a stuffed toy 231, its size or the way of enjoying with the stuffed toy.

However, the invention is not limited to the above-described embodiments. The invention can adopt any configuration that enables various ways of use by recognizing only a dot pattern portion 6 on a printed material 5 to reproduce given information and voice. Modifications of the invention can be made without departing from the scope of the invention.

Next description is made about specifications of a dot pattern in the invention with reference to FIGS. 103 to 106.

Figure 105:
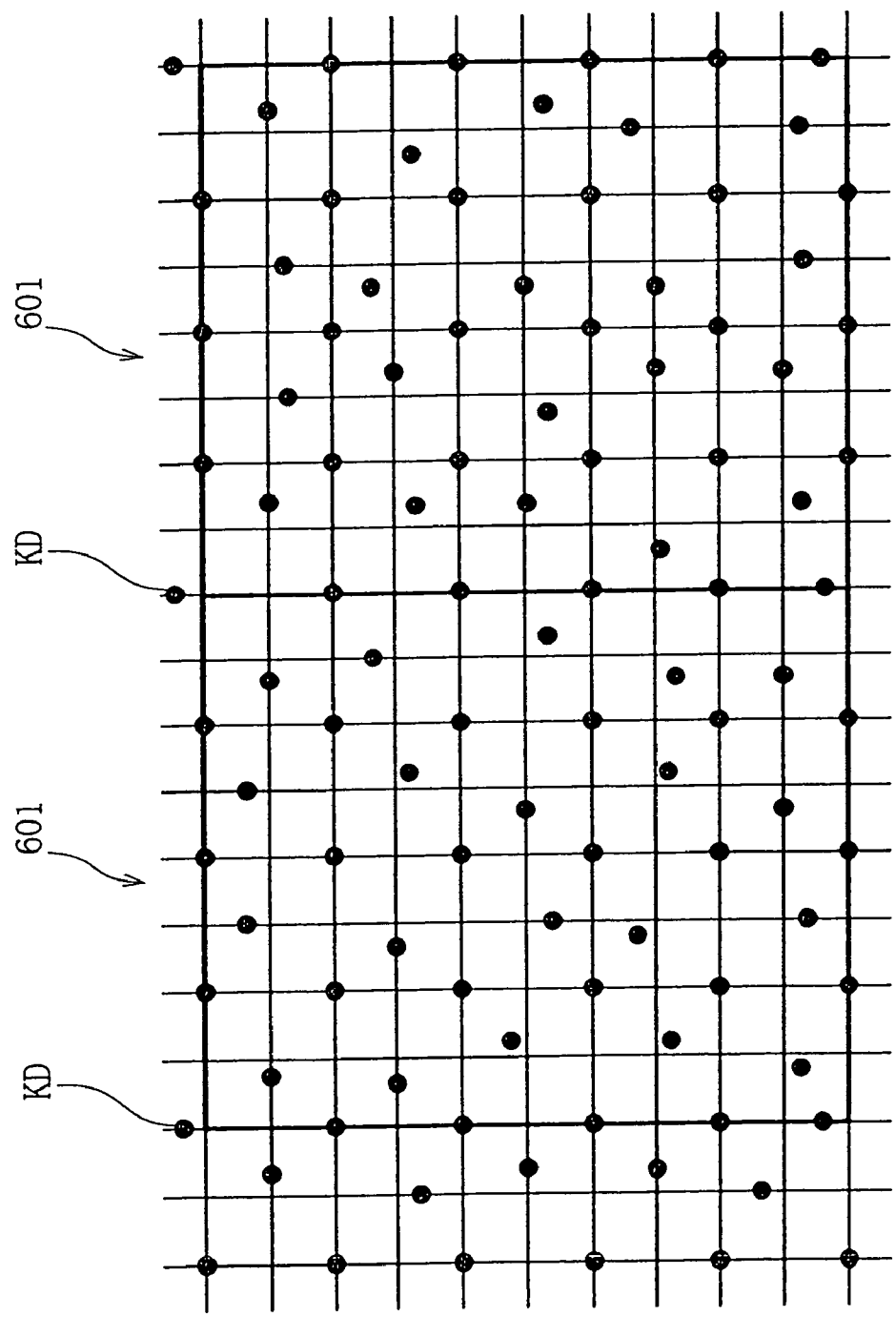
FIG. 105 is an explanatory view (3) of specifications of dot pattern according to the embodiment.
Figure 106:
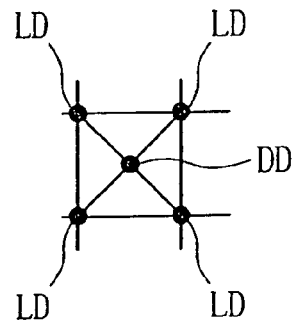
FIG. 106 is an explanatory view (4) of specifications of dot pattern according to the embodiment.
Figure 106:
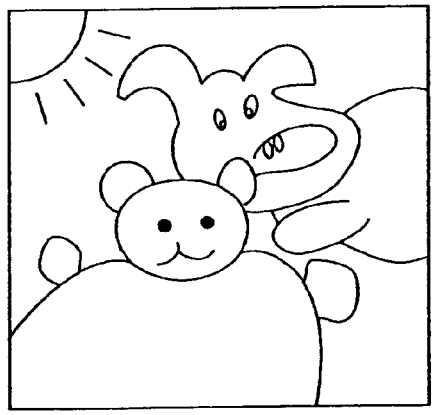
Figure 106:
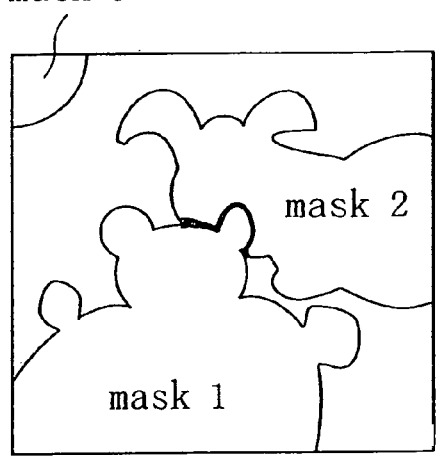
Figure 106:
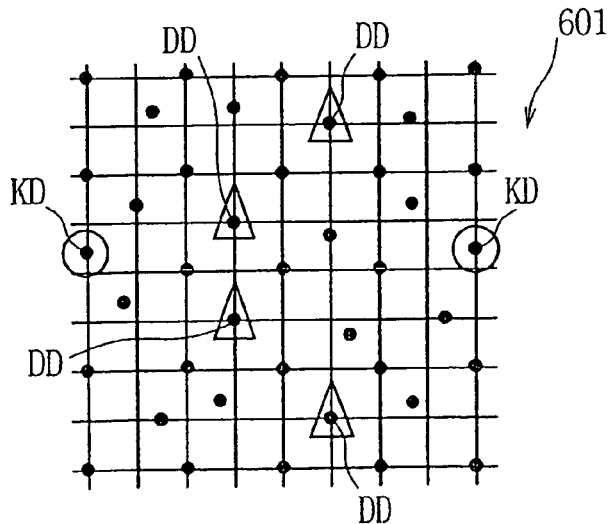

A dot pattern 601 is configured of lattice-arranged dots, as shown in FIG. 105. Lattice lines in the longitudinal and horizontal directions are shown only for explaining the position of dots, and they do not exist on the printed material in fact.

Then, 4×4 lattice area is called a data block or lattice block, a lattice dot LD is arranged at each of four corners of this lattice area (intersections of lattice lines). A spacing between two lattice dots (LDs) is in the range of 0.35 mm to 1.0 mm, preferably around 0.5 mm. Besides, the diameter of a dot is preferably 8 to 10% of the spacing between lattice dots.

A Key dot (KD) is arranged in order to show from which block to which block one data ranges.

The KD is at the position shifted from a LD. In other words, a lattice dot is fundamentally arranged on a lattice point, while a KD is arranged shifted from the LD. Here, shift of a KD from a lattice point is preferably about 20%.

An area surrounded with KDs or an area having a KD as its center consists in one data piece.

Figure 104:
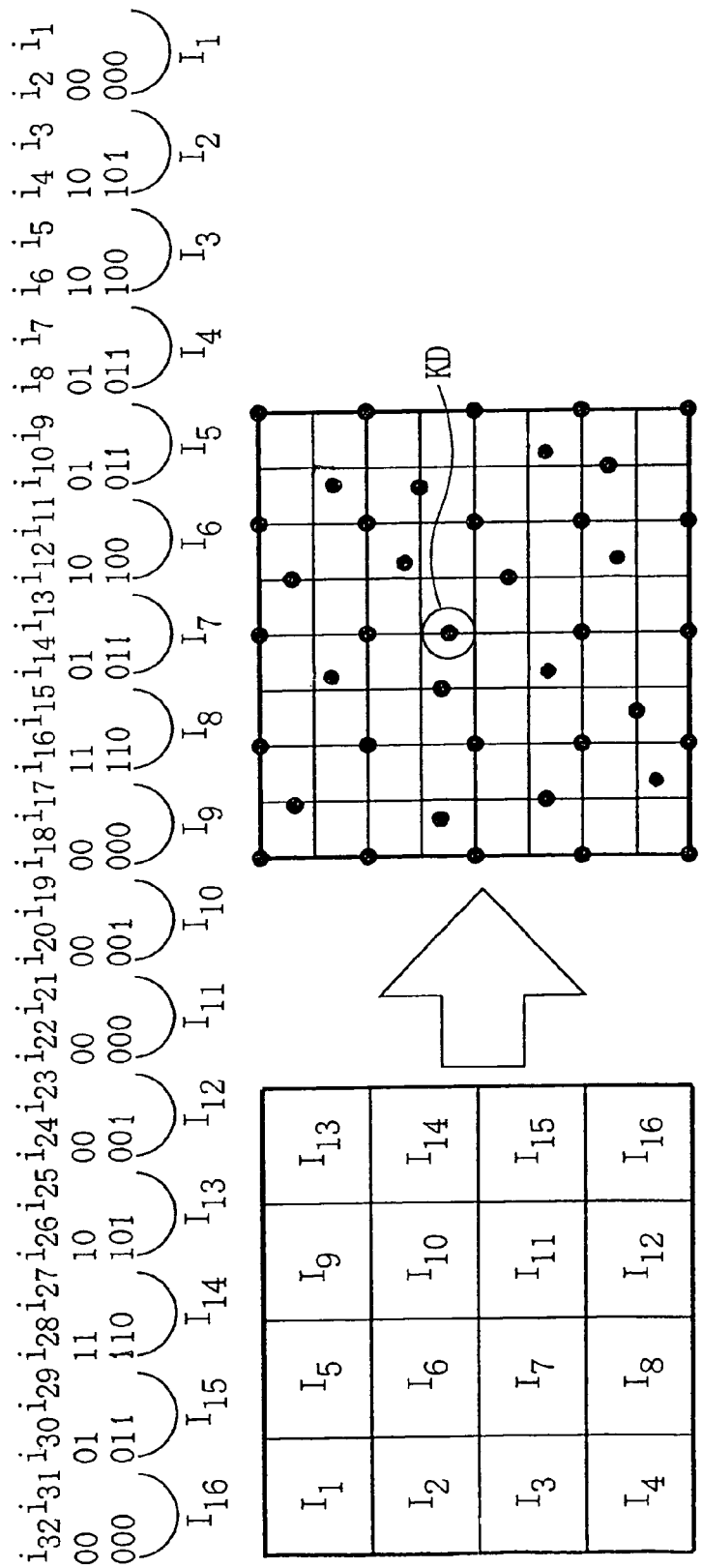
FIG. 104 is an explanatory view (2) of specifications of dot pattern according to the embodiment.

Arrangement of the data is made sequentially from the upper left to the downward direction, as shown in FIG. 104.

Figure 103:
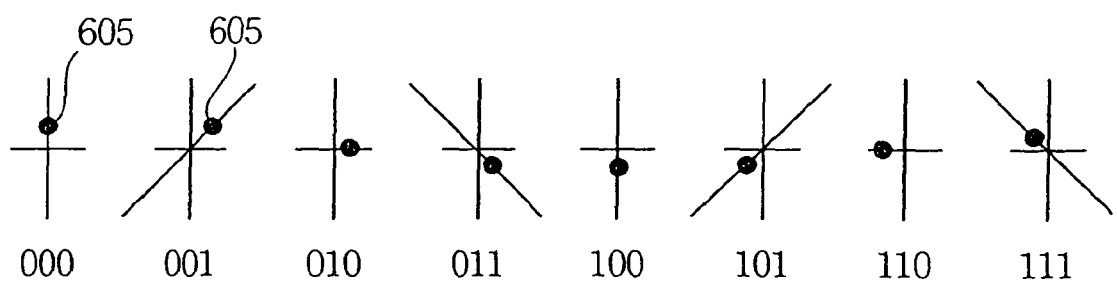
FIG. 103 is an explanatory view (1) of specifications of dot pattern according to an embodiment.

The data can be, as shown in FIG. 103, defined by how far a dot 605 is shifted from the center point in a lattice area. In FIG. 103, eight points are defined as equally 45 degree shifted from the center, and thereby, eight kinds, or 3 bits data can be expressed in a single lattice block. Further, the distance from the center point is changed to define further eight points. Accordingly, as sixteen points are totally defined, four bit data can be expressed.

A dot pattern of the invention has a feature in that lattice consisting in one data block can be defined freely. That is, since a KD defines a range of data area as mentioned above, if arrangement of KDs is changed, a lattice block group of any variable length can be treated as a data storing area.

Besides, according to the invention, dot pattern portions can have different meanings by changing shift of a KD even if they are at the same position. In other words, a KD functions as a KD if the KD is shifted from the lattice point. If the way of shifting is changed so that KDs are equally 45 degree shifted from the lattice point, eight patterns of KDs can be defined.

Here, when a dot pattern portion is shot by shooting means such as a C-MOS, the shot data is recorded in a frame buffer of the shooting means. If the shooting means is at the position rotated around the vertical axis (shooting axis) on paper, or the position (shifted position) turned around the shooting axis, the shifted amount (angle of camera) around the shooting axis of the shooting means is seen from the positional relationship between shot lattice dots and KD. The principle being applied, even if the same area is shot by a camera, it presents an angle as a parameter of another dimension. Therefore, even when the same area at the same position is scanned, other information can be output per angle.

So to speak, angular parameter enables hierarchical information to be arranged in one area.

Figure 74:
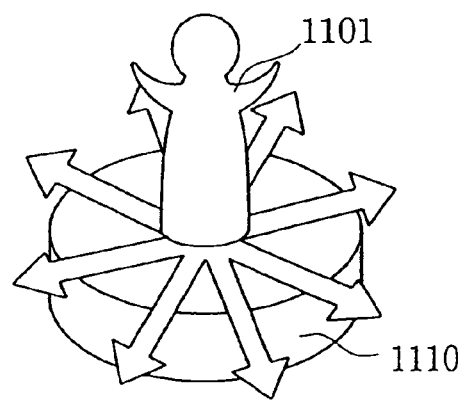
FIG. 74 is a view illustrating an example of use of the embodiment.
Figure 76:
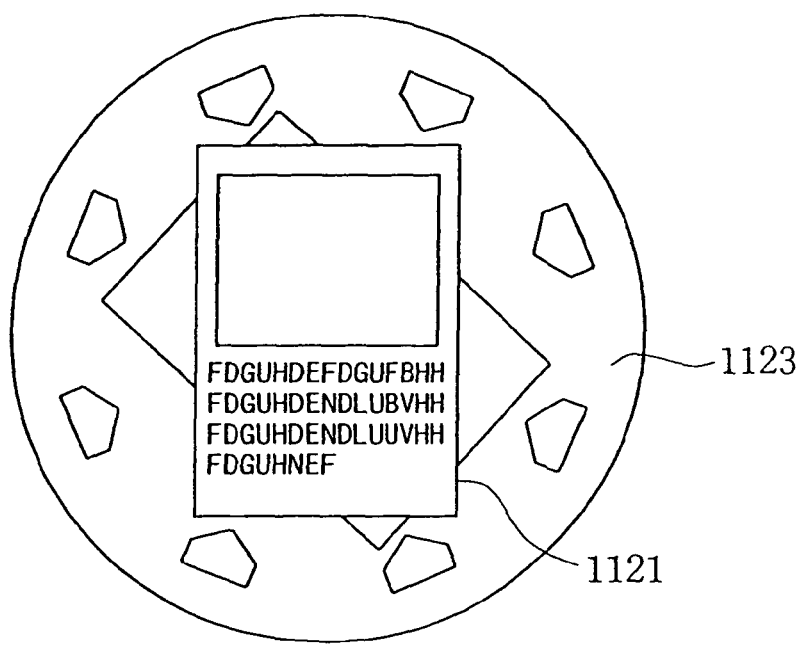
FIG. 76 is a view illustrating an example of use of the embodiment.
Figure 77:
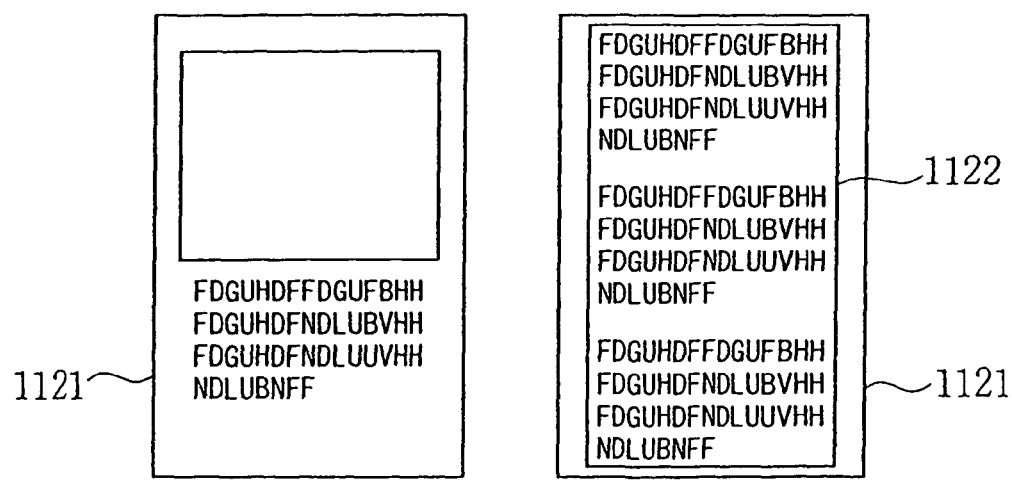
FIG. 77 is a view illustrating an example of use of the embodiment.
Figures 78, 79:
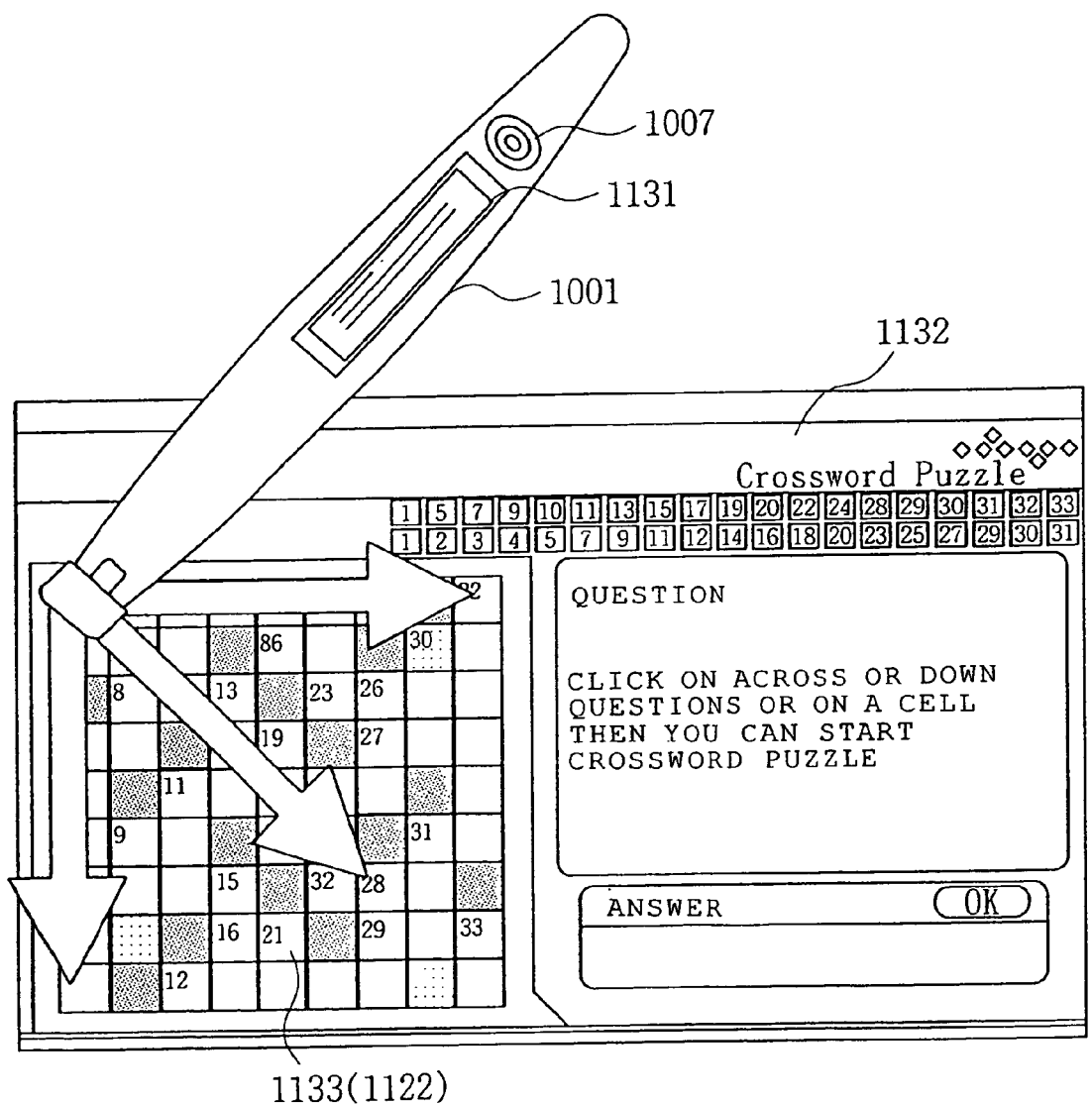
FIG. 78 is a view illustrating an example of use of the embodiment.
FIG. 79 is a view illustrating an example of use of the embodiment.

Applications of this principle are shown in FIGS. 74, 76 and 78. In FIG. 74, a scanner portion 1105 provided at the bottom of a mini FIG. 1101, and the mini FIG. 1101 is turned by 45 degree on a base. Then, different-angle information as well as scanned information of a dot pattern portion can be obtained thereby to output eight types of voices.

In the invention a dummy dot (DD) can be set. This DD is defined as a dot arranged at the right center of four lattice dots (LDs) (refer to FIG. 106(a)). Such a DD is suitable for a picture book or the like in which a boundary is defined in every mask area. As shown in FIG. 106(c), a DD is arranged at the boundary between mask 1 and mask 2. Such arrangement of a DD area at a mask area prevents simultaneous scanning of code information defined at mask areas. FIG. 106(d) shows arrangement of DDs.

Preferably, an empty dot in which no dot is arranged at the center of lattice dots is arranged in a background portion of a picture of the like. Since an empty dot is small in number of dots compared with normal data dot on which information is recorded, it is possible to print with indistinctive dots. In addition, since successive empty dots prevent patterning, they are suitable for whole-colored back ground.

Further, according to the invention, it is necessary to analyze data of one block including shooing center. However, lattice data (information data) at several blocks in the vicinity of shooting center can be set as scanning data. In this case, data corresponding to information data lacked in one original block is read from another adjacent block, with which original one block data can be complemented to complete input.

Regarding a data pattern which define x and y coordinates, a block different from the block at the shooting center is utilized to read information dots composing corresponding x and y coordinates, which is then subjected to correction to be x and y coordinates at the shooting center.

The invention has a feature of not being affected much by shooting conditions since a dot pattern using lattice dots are utilized as described above. In other words, when the whole dot pattern is distorted due to the shooting conditions (distorting of lens of a camera, shooting angle of camera, change in shape of paper), position shift of a shape formed of four lattice dots and information dots are equally made, relative position from the lattice dots are not changed and if correction calculation is performed on the basis of these lattice dots, the real position of each information dots and key dots can be known.

That is, a dot pattern using lattice dots according to the invention is resistant to distortion.

FIGS. 61 to 67 are views for explaining a method for scanning a dot pattern corresponding to one block composed of sub blocks by a camera using a preferred embodiment of the invention of a dot patter inputting method by a camera of the invention.

Figure 61:
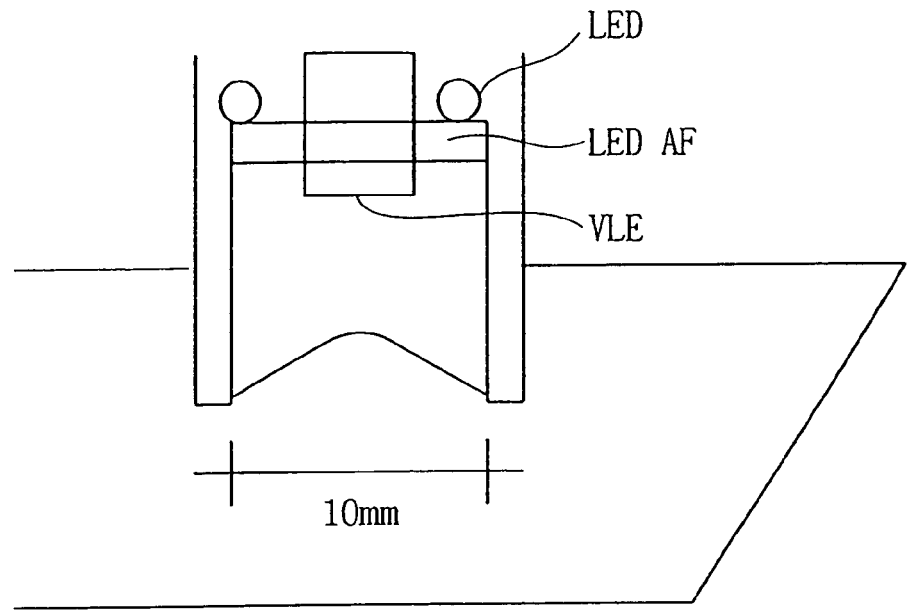
FIG. 61 is a cross sectional view of a camera.
Figure 62:
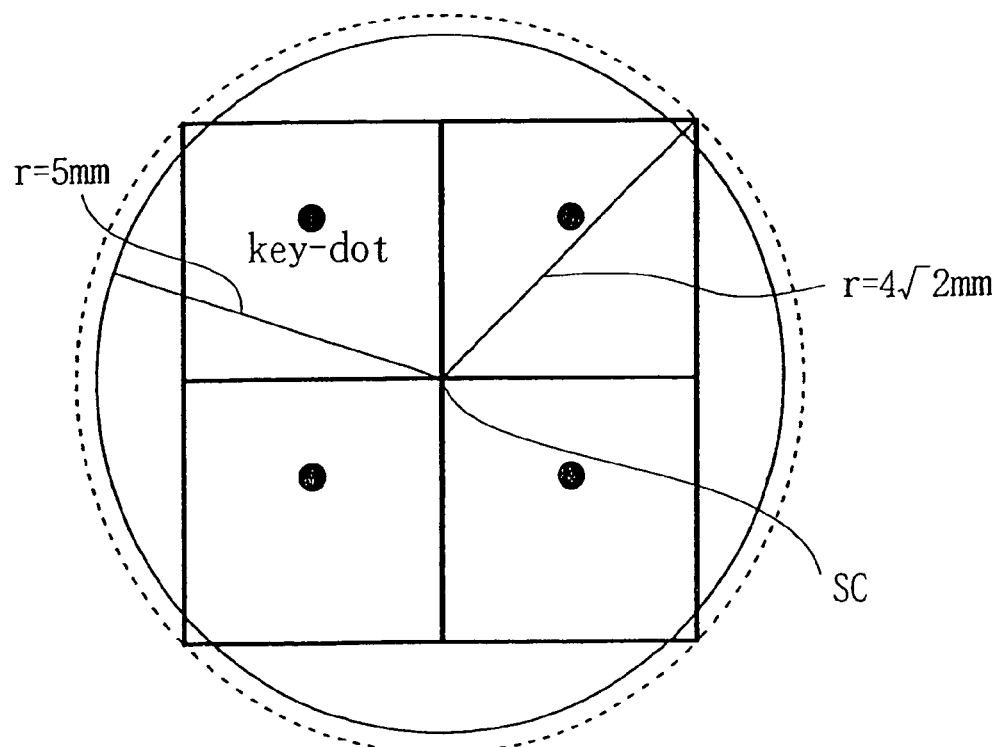
FIG. 62 is a view for explaining an image pickup area of a camera.

As shown in FIG. 61, a camera includes: an LED for radiating an object with light; an LED acrylic filter for filtering light output from the LED; and a visible light filter (infrared transparent filter) for filtering reflected light from the object. A tube housing the camera is approximately 10 mm in the longitudinal direction. If the diameter of the imaging area of a dot patter is 10 mm, when one block of 4 mm×4 mm dot pattern (I1 to I16) is scanned, an imaging area of $2r=2\times 4\sqrt{2}=11.28$ mm at the maximum is required (refer to FIG. 62). In order to solve this, sixteen information dots to be arranged around a key dot of one block are not scanned sequentially, but they are scanned by four information dots (¼ block (sub block)) having information independent from other information dots. With this configuration, instead of information dots in ¼ block out of the imaging area, corresponding information dots (¼ block) in another block in the imaging area are input thereby enable one block information to be input within the imaging are of the diameter of 10 mm.

When there occurs an error in either ¼ block input by the above-described method, corresponding information dots in another block (¼ block) are input to correct the error.

Figure 64:
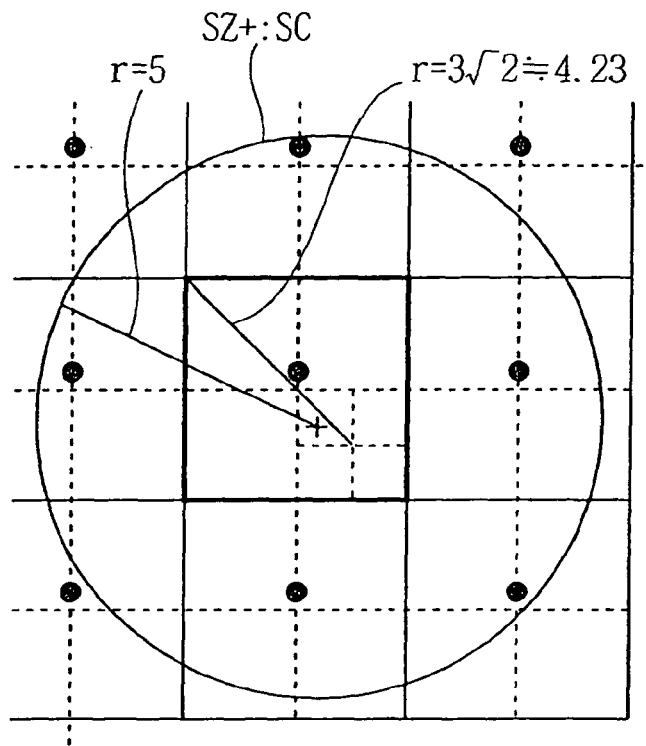
FIG. 64 is a view for explaining the image-pickup center position of a camera and the input procedure of a sub block.

In FIG. 64, the imaging center of a camera is $I_8$ in B1 block, and [$I_1$ to $I_{16}$] in B1 block nearest the center of the camera are input.

Figure 65:
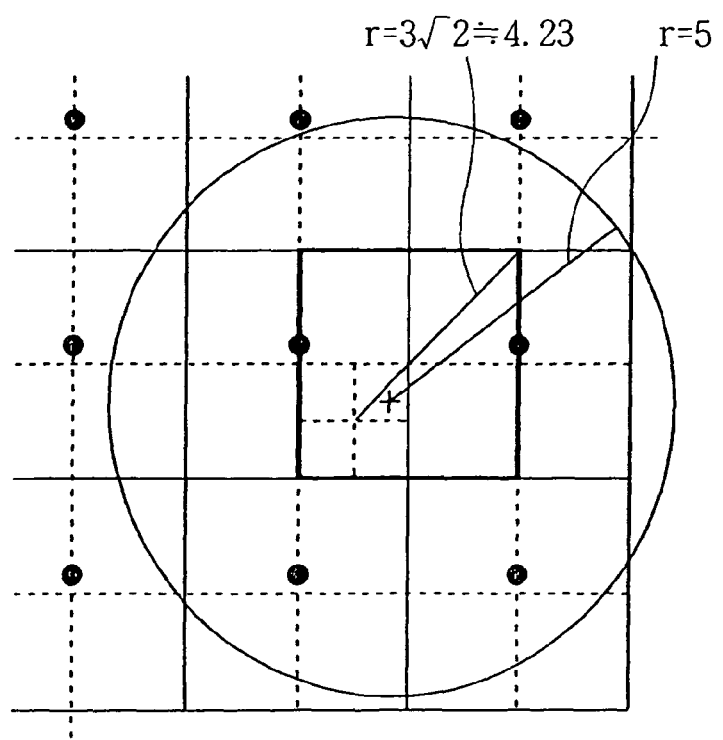
FIG. 65 is a view for explaining the image-pickup center position of a camera and the input procedure of a sub block.

In FIG. 65, the imaging center of a camera is $I_8$ in B1 block, and [$I_1, I_2, I_3, I_4$] and [$I_5, I_6, I_7, I_8$] in B1 block and [$I_9, I_{10}, I_{11}, I_{12}$] and [$I_{13}, I_{14}, I_5, I_{16}$] in B2 block nearest the center of the camera are input.

Figure 66:
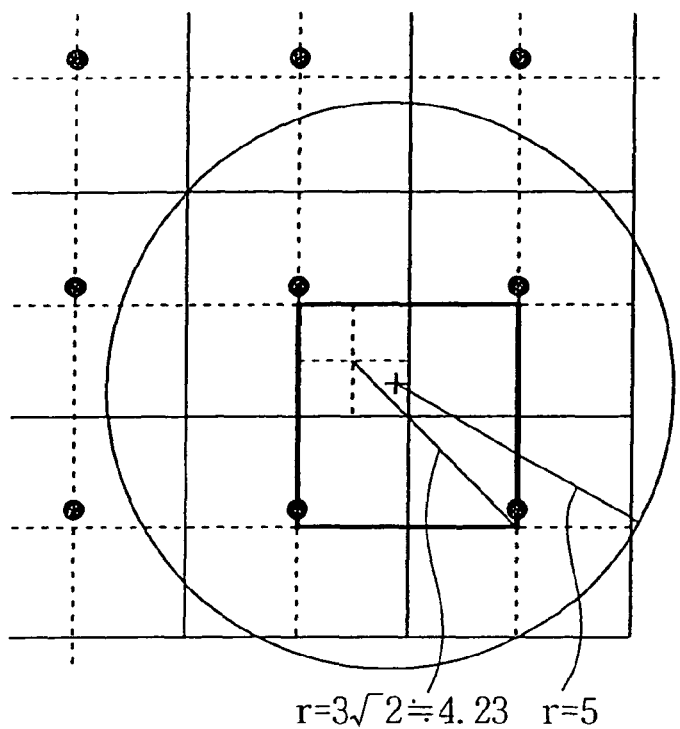
FIG. 66 is a view for explaining the image-pickup center position of a camera and the input procedure of a sub block.

In FIG. 66, the imaging center of a camera is $I_6$ in B1 block, and [$I_5, I_6, I_7, I_8$] in B1 block, [$I_9, I_{10}, I_{11}, I_{12}$] in B2 block, [$I_{13}, I_{14}, I_5, I_{16}$] in B3 block and [$I_1, I_2, I_3, I_4$] in B4 block nearest the center of the camera are input.

Figure 67:
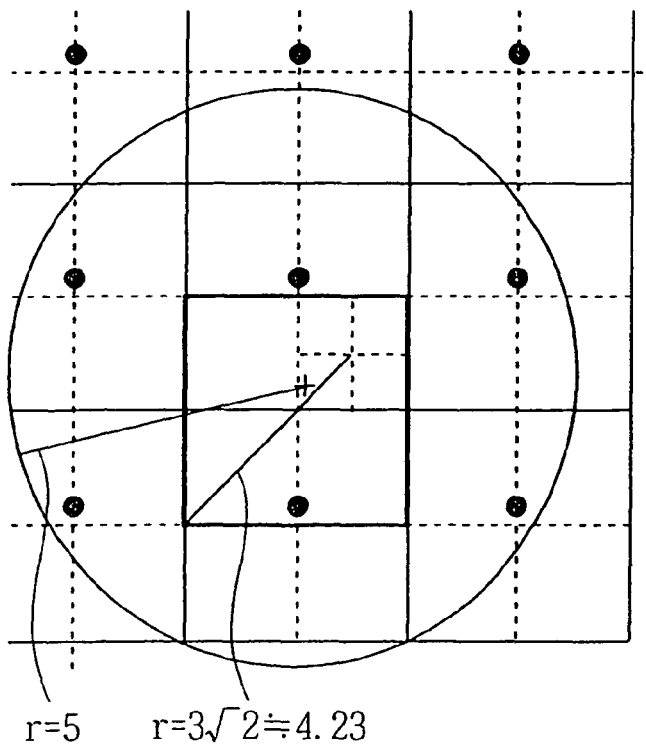
FIG. 67 is a view for explaining the image-pickup center position of a camera and the input procedure of a sub block.

In FIG. 67, the imaging center of a camera is $I_7$ in B1 block, and [$I_5, I_6, I_7, I_8$] and [$I_9, I_{10}, I_{11}, I_{12}$] in B1 block and [$I_1, I_2, I_3, I_4$] and [$I_{13}, I_{14}, I_5, I_{16}$] in B4 block nearest the center of the camera are input.

In FIGS. 64 to 67, when there occurs an error in input dot pattern, there are eight ¼ block dot patters at the maximum that can be input alternatively.

A dot pattern according to the invention as described above is printed on a printed material such as a picture book, a text and the like, the dot patter is captured as image data by the camera, and image data is digitalized into numeric values thereby outputting information and a program corresponding to the numeric values by a PC, an information outputting device, a PDA, a portable phone or the like.

Next, the principle for scanning dots and a configuration of a device therefor are described with reference to FIGS. 107 to 113.

Reflection of light includes specular reflection and diffuse reflection that occur at a given ratio on the surface of an object by characteristic of the surface. The specular reflection is, as shown in right figure of FIG. 110, reflection of light incident on a flat and smooth surface of an object in such a manner that the incident angle and the reflection angle are the same. Particularly, when the surface is smooth, a specular reflection factor is increased, reflection of light is heavy, and there occurs a highlight.

Figure 107:
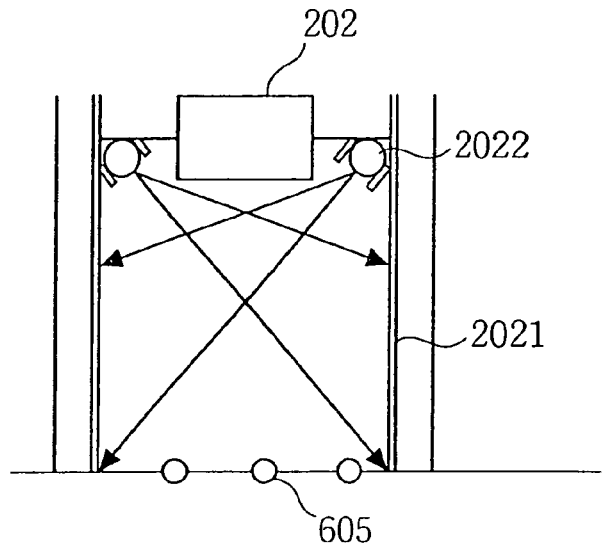
FIG. 107 is a view (1) for explaining a device configuration of means for scanning a dot pattern portion according to the embodiment.
Figure 110:
FIG. 110 is a view (4) for explaining a device configuration of means for scanning a dot pattern portion according to the embodiment.
Figure 111:
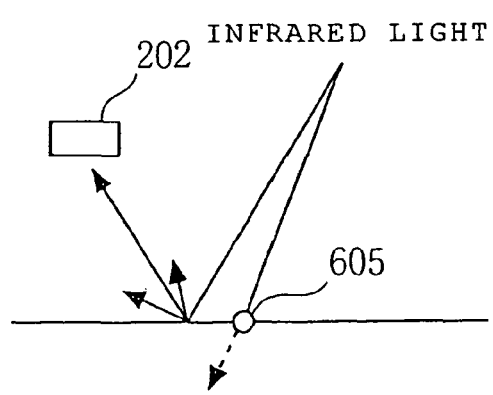
FIG. 111 is a view (5) for explaining a device configuration of means for scanning a dot pattern portion according to the embodiment.
Figure 111:
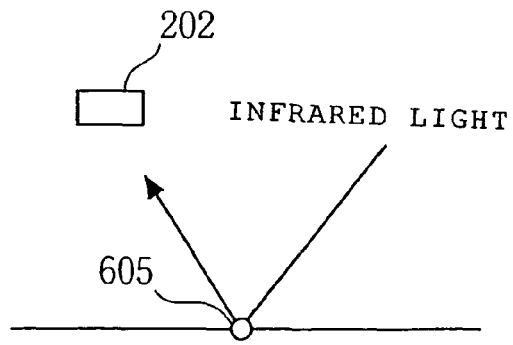

The diffuse reflection is as shown in left figure of FIG. 110, such that light incident on a minutely rough surface is diffused in every direction and reflected. In this diffuse reflection, light at a given wavelength determined by a characteristic of the object surface is absorbed. Accordingly, when a paper surface is rough like bond paper or mat paper, a carbon ink included in a printed dot 605 absorbs incident light by the LED 2022 and the light is not reflected. Then, the dot 605 is mapped by a C-MOS camera 202 (refer to left figure of FIG. 111). However, when dots are printed on paper of a flat and smooth surface such as coat paper or art paper, a film, plastic or the like, or the surface of printed dots is coated or covered with a transparent film, there occurs specular reflection. In this case, a carbon ink does not absorbs light of the LED 2022 and becomes a highlight, and accordingly, the dot 605 is not imaged by the C-MOS camera 202 (refer to right figure of FIG. 111). In other to avoid this, as shown in FIG. 107, the LED 2022 is arranged at the position at which direct light from the LED 2022 is not specular-reflected to be input to the C-MOS camera 202, that is, the position near the C-MOS camera, and light from the LED 2022 is reflected against the inner wall 2021 not to occur a highlight.

Figure 108:
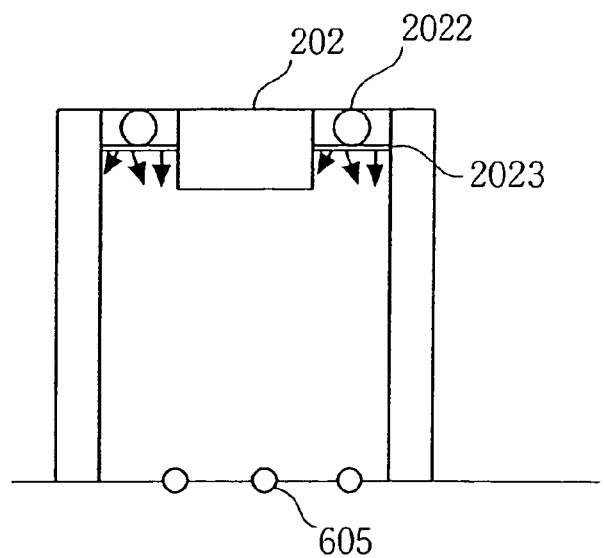
FIG. 108 is a view (2) for explaining a device configuration of means for scanning a dot pattern portion according to the embodiment.

Also, as shown in FIG. 108, light from the LED 2022 is made to pass a filter 2023 such as an acrylic filter to diffuse the light equally on the paper, thereby to present highlight from occurring. Further, as shown in FIG. 2023, an acrylic filter 2023 may be mounted to coat around an LED 2022.

Figure 112:
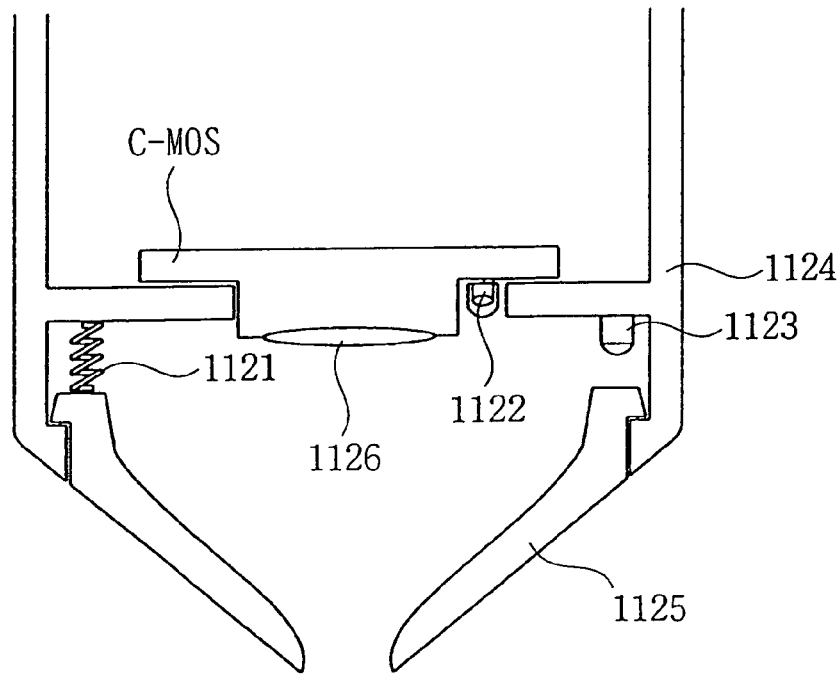
FIG. 112 is a view (6) for explaining a device configuration of means for scanning a dot pattern portion according to the embodiment.
Figure 113:
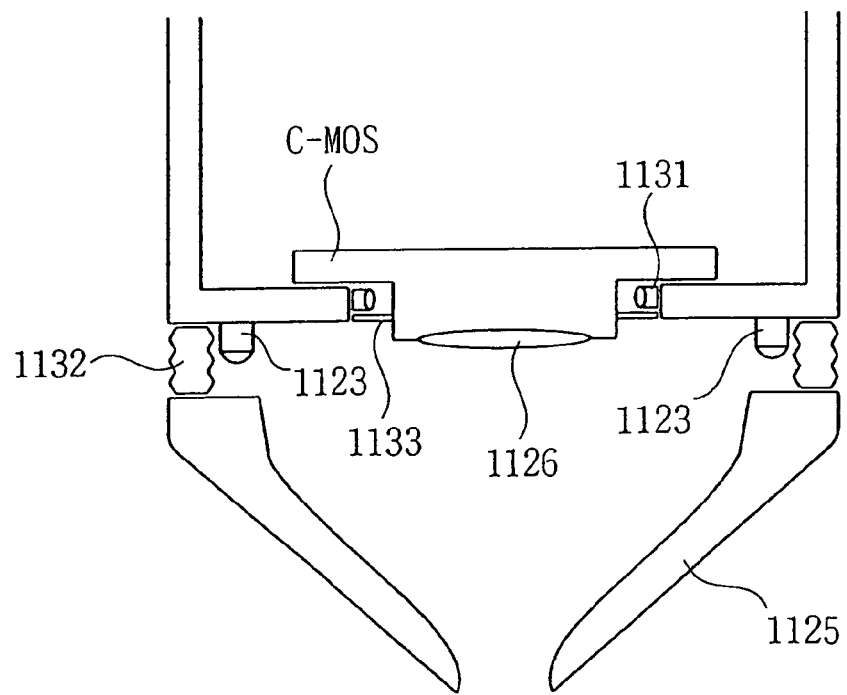
FIG. 113 is a view (7) for explaining a device configuration of means for scanning a dot pattern portion according to the embodiment.

FIGS. 112 and 113 a reviews each for explaining inner configuration of an end portion of a pen type scanner which realizes such ideal arrangement of C-MOS camera and an LED 1122.

Figure 109:
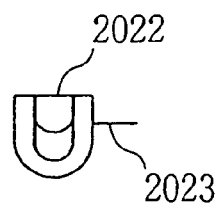
FIG. 109 is a view (3) for explaining a device configuration of means for scanning a dot pattern portion according to the embodiment.

In FIG. 112, a nose portion 1125 with a long tapered end is engaged with a tube case 1124. The nose portion is movable in the axial direction, and movement of the nose portion is biased by an elastic member 1121 such as a spring or rubber provided on a protruding wall on the inner surface of the nose portion 1125. The protruding wall is equipped with a C-MOS camera, a lens 1126 mounted on the center of the C-MOS camera is arranged to see through an opening of the end of the nose portion so that the camera can image reflected light passing through the opening. At the lens 1126 side, an LED 1123 (2022) equipped with a filter 2023 is provided, as shown in FIG. 109. This LED 1123 is provided at the back of lens face of the lens 1126 in the tube case 1124 so that light from the LED 1123 is not input directly to the lens face.

The protruding wall is provided with a switch 1123 for electrically conducting to an electric circuit by pressure. When the nose portion 1125 moves in the direction of the tube case 1124 against biasing of the elastic member 1121, a base portion of the nose portion 1125 pusses the switch 1123 to start operation.

By actuation of the switch 1123, the LED 1123 is brought into an irradiating state thereby to start scanning processing by the C-MOS camera.

Since the end of a pen type scanner is configured as shown in FIG. 112, assembly is completed only by inserting the nose portion 1123 to the tube case 1124 thereby improving assembly efficiency.

Further, FIG. 113 shows another configuration of an end of a pen type scanner. In the configuration on FIG. 113, the nose portion 1125 is connected via the rubber (elastic member) 1132 by an adhesive agent. Further, the switch 1123 is arranged at a given position inside of the rubber 1132 so that the base portion of the nose portion 1125, which is biased to be moved against elastic force, pushes the switch 1123.

Furthermore, LEDs 1131 are arranged via respective acrylic filters 1133 near the lens 1125 of the C-MOS camera. When the switches 1123 are actuated, radiated light of the LEDs 1131 is outputted via the acrylic filters 1133, through the opening of the nose portion 1125 to the outside.

FIG. 68 to FIG. 111 show further modifications of the embodiments.

Figure 68:
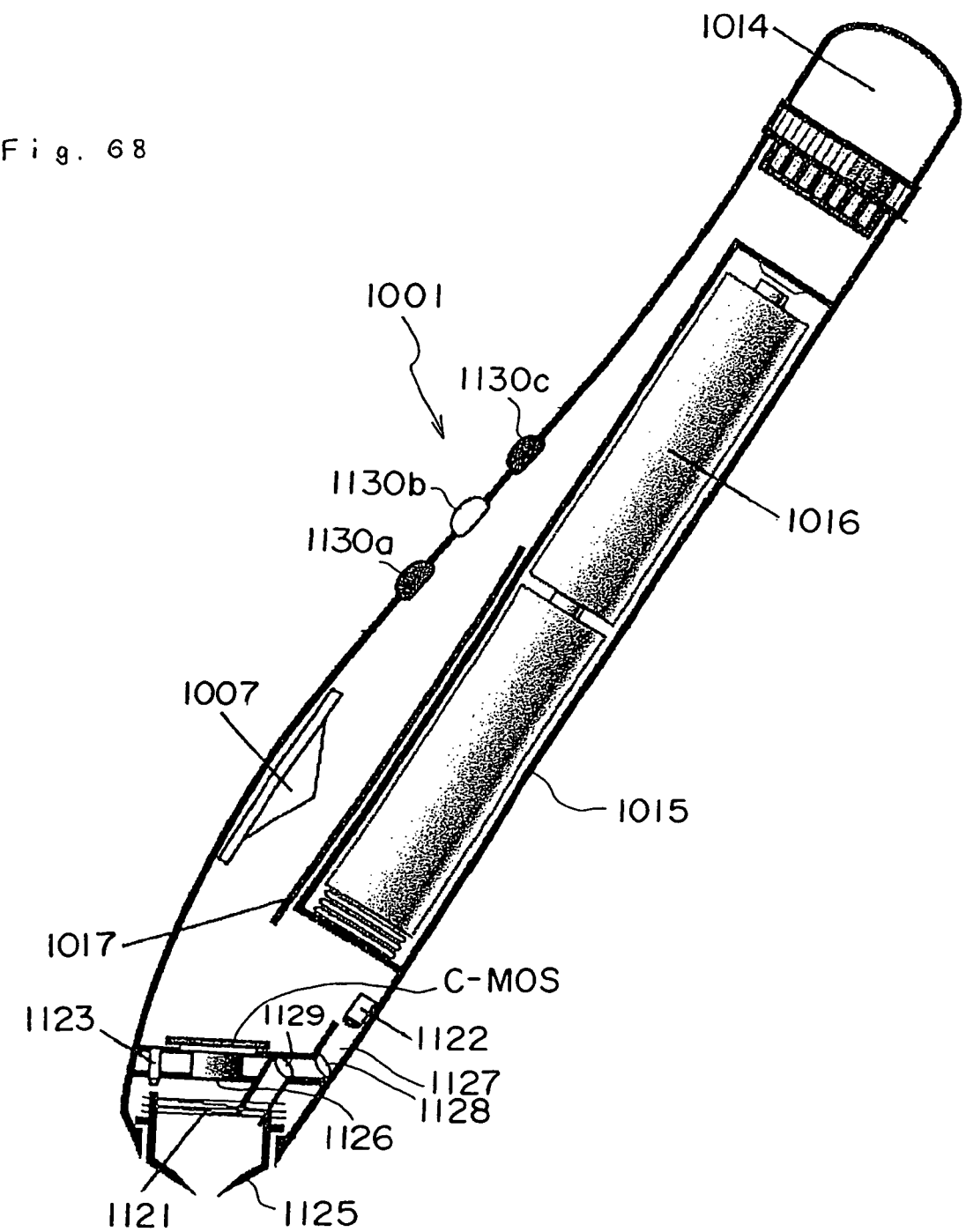
FIG. 68 is a view for explaining a configuration of a pen type scanner.

FIG. 68 is a view of a camera which is housed in a pen shaped case (device main body) 1015 as a pen type scanner 1001.

The case 1015 includes a battery 1016, a speaker 1007 and a circuit board 1017, which are mounted therein. A central processing unit (CPU) and a memory are implemented on the circuit boar 1017 in such a manner that their surfaces are fully attached to the board. A microphone (not shown) may be integrated. In addition, at the rear end of the case 1015 (upper right side of the figure), a memory cartridge 1014 is inserted detachably. This memory cartridge 1014 is configured to register a program, existing voice data or the like. The memory cartridge 1014 is provided replaceably, can be replaced with a ROM cartridge, a micro unit cartridge or the like.

On the surface of the case 1015 buttons 1130a to 1130c are provided for controlling start of scanning, start of recording, voice reproducing and the like.

Among the buttons, when the recording button is pushed, a microphone (not shown) can be used to record voices. The recorded voice data is stored in the memory cartridge 1014. At this time, when the dot pattern portion is scanned while the recording button being pushed, recorded voice data is allocated to the dot pattern portion. When the dot pattern portion is scanned while the deleting button being pushed, allocation of the voice data to the dot pattern portion can be cancelled. Then, the voice data may be left stored in the memory cartridge 1014.

In the figure, in the end of the case 1015 (lower left side of the figure), as the case 1015 is abutted on a medium surface while being inclined by about 45 degree, a C-MOS camera unit, a spring 1121 and a tapered nose portion 1125 are provided along the vertical axis of the medium surface. When the case 1015 is pushed in the direction of the medium surface, the nose portion 1125 moves backward against biasing of the spring 1121 and then the switch 1123 is pushed on.

Inside the nose portion 1125, a lens 1126 of the C-MOS camera unit is mounted to command the inside of the nose portion 1125 so that the lens 1126 can take an image of a window of the end of the nose portion.

Inside the nose portion 1125, an irradiation tube 1127 is provided which has two crank-shaped 45-degree bent portions.

The irradiation tube 1127 is configured of a cylindrical member of transparent resin and an end face thereof is faced with an LED 1122 so that a radiated light beam from the LED 1122 is input into the irradiation tube. Inside the irradiation tube, a diffused component of the radiated light beam (an optical component of which the angle with respect to the optical axis is larger than 45 degree) passes the inner surface of the irradiation tube to be output to the outside. On the other hand, a straight-traveling component of the radiated light (an optical component of which the angle with respect to the optical axis is smaller than 45 degree) is reflected on the inner surface of the irradiation tube to proceed in the tube. In the radiated light, only a component approximately parallel to the optical axis in the irradiation tube is output from the end face toward the opening of the nose portion 1125.

Since the radiated light passes through the crank-shaped irradiation tube made of transparent resin to become focused light parallel to the optical axis, it is possible to provide an even amount of light over the whole area of the opening of the nose portion 1125. Thus, according to the present embodiment, there does not occur peripheral darkness in the case of diffused light, thereby enhancing the accuracy of scanning the dot pattern portion 607.

Figure 69:
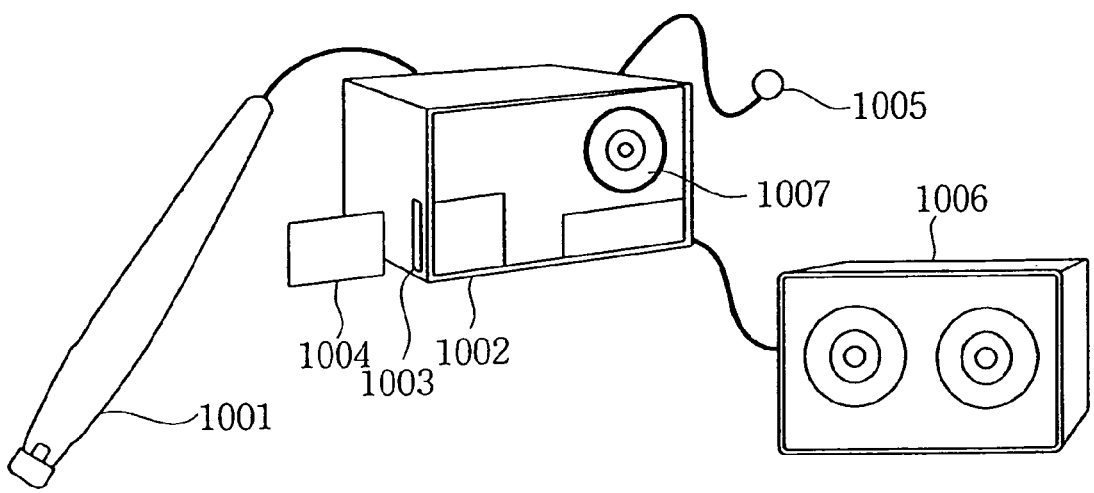
FIG. 69 is a view illustrating an example of use of the embodiment.
Figure 70:
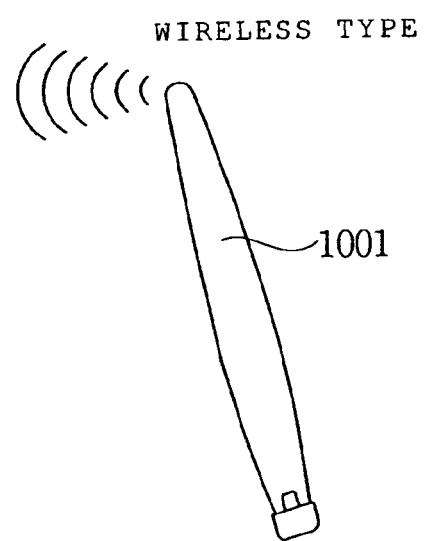
FIG. 70 is a view illustrating an example of use of the embodiment.

FIG. 69 shows such a pen type scanner being connected to a device main body 1002. In FIG. 69, the device main body 1002 includes a memory card slot 1003. A memory card 1004 in which voice data and/or a program are registered can be inserted into the memory card slot 1003. The device main body 1002 is also connected to a microphone 1005 so that voice data from the outside can be registered in the memory inside the device main body. The voice data can be output from a speaker 1007 mounted on the device main body 1002 or a speaker 1006 connected to the device main body 1002.

In FIG. 69, the pen type scanner 1001 and the device main body are connected by a cable. However, a radio interface is built in the pen type scanner so that the pen type scanner can connected with the device main body 1002 by radio communication.

Figure 71:
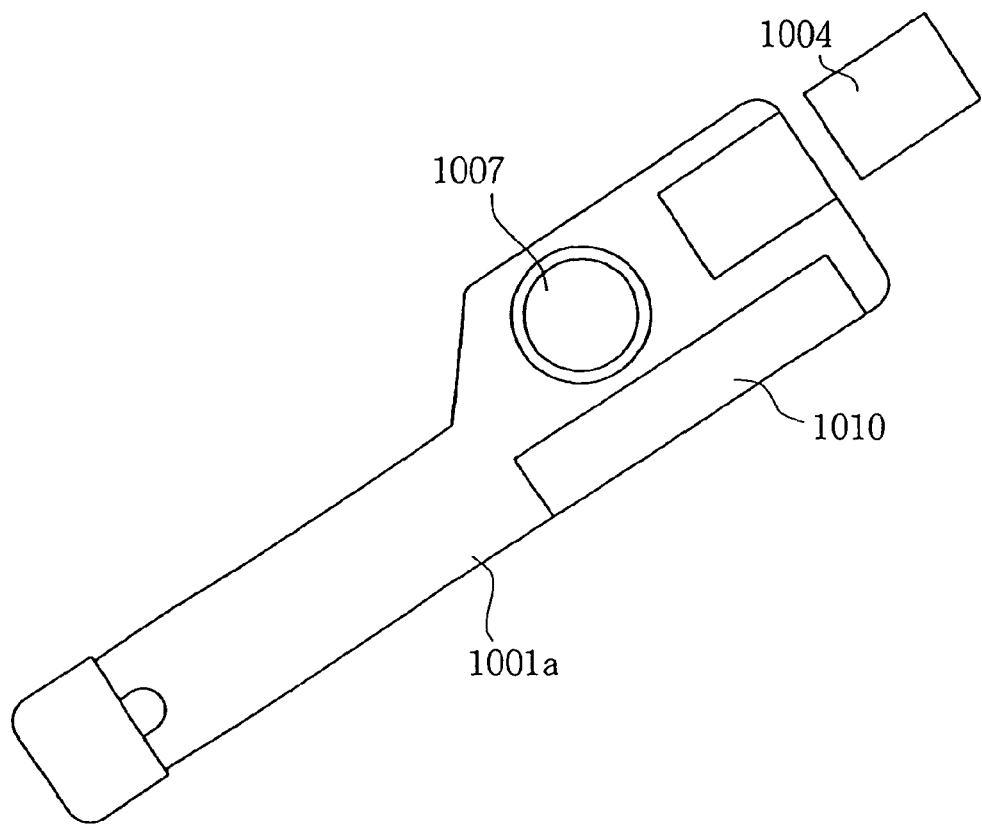
FIG. 71 is a view illustrating an example of use of the embodiment.

FIG. 71 shows a modification of a pen type scanner. As shown in FIG. 71, the pen type scanner 1001a includes a battery 1010 and a speaker 1007 and is also configured to receive a memory card 1004 including an SD card, a memory stick and a smart media.

Figure 72:
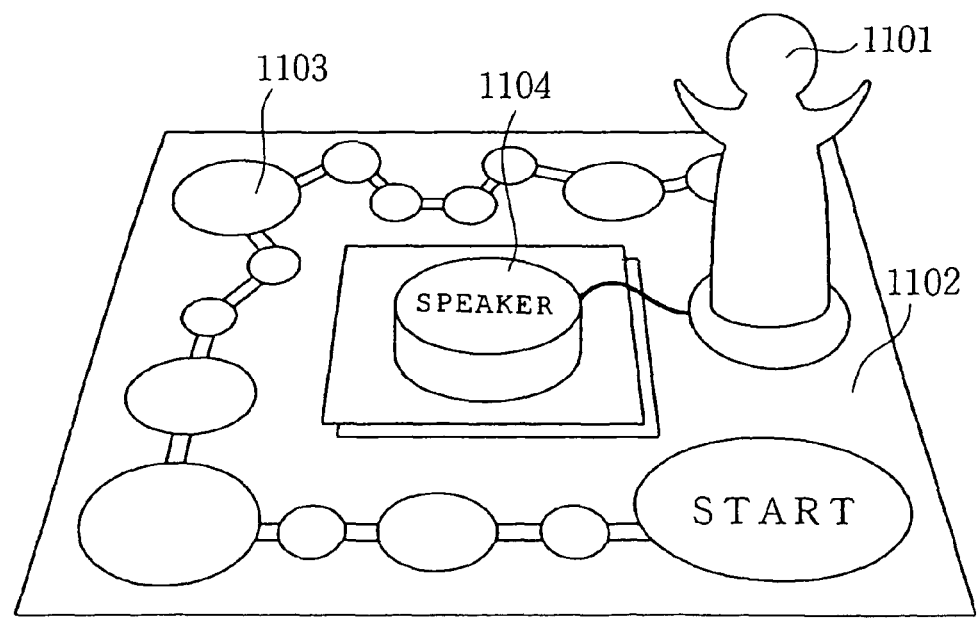
FIG. 72 is a view illustrating an example of use of the embodiment.

FIG. 72 shows the invention applied to a board game. A mini FIG. 1101 as a piece is moved along circles 1103 marked on the board 1102 and the number of circles the min FIG. 1001 passes is determined by dice or a speaker 1104. On the bottom of the mini FIG. 1101, a scanning device such as a CCD or a C-MOS is mounted. A dot pattern portion is formed on each of the circles of the board 1102. When the mini FIG. 1401 is put on a circle, voice information corresponding to the circle can be output from the speaker 1104 connected by a cable. This enables necessary information for game proceeding such as instructions to move to the next circle to be output.

Figure 73:
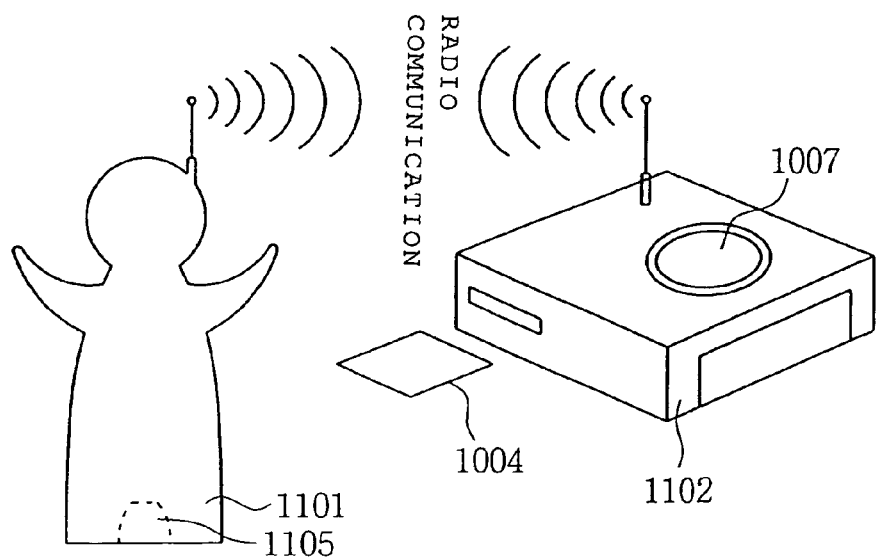
FIG. 73 is a view illustrating an example of use of the embodiment.

FIG. 73 shows a mini FIG. 1101 and a device main body 1102 which are separated. A scanner portion 1105 mounted on the bottom surface of the mini FIG. 1101 is used to scan a sot pattern portion so that a signal corresponding to the dot pattern portion is transmitted to the device main body 1102 by radio communication. The device main body 1102 includes a speaker 1007 so that voice information corresponding to the signal is read out of a memory card 1004 to be output.

Here, with this configuration, in order to reduce communication traffic, a decoder is provided in the mini FIG. 1101, and image data of scanned dot pattern is decoded to be converted into several digit code information. Then, the code information is only transmitted as a scanned signal to the device main body 1102.

FIG. 74 shows a modification in which a scanner portion 1105 provided on the bottom of a mini FIG. 1101 is used to scan a dot pattern portion formed on the surface of the seat 1110. According to the present embodiment, it is possible to change a scanned portion depending on the position of the scanner portion 1105 with respect to the dot pattern. For example, when the mini FIG. 1101 is inclined from the standing axis of the mini FIG. 1101 by a given angle with respect to the dot pattern, a scanned signal can be changed so that the voice data to be output can be changed depending on the direction the mini figure is oriented. Description of the method of changing voice data by changing the angle of the mini figure with respect to the dot pattern portion was made above and is omitted now.

Figure 75:
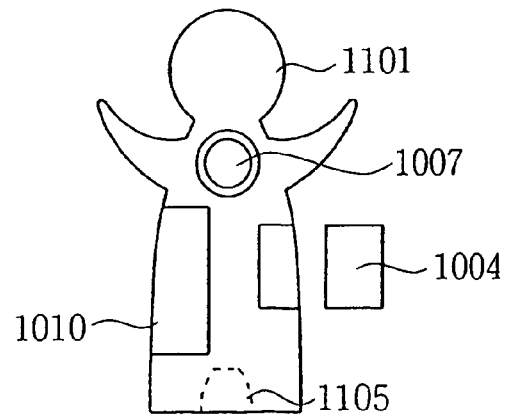
FIG. 75 is a view illustrating an example of use of the embodiment.

FIG. 75 shows another configuration example of a mini FIG. 1101. In this embodiment, the mini FIG. 1101 includes, in addition to the scanner portion 1105, a battery 1010 and a speaker 1007. Further, a memory card 1004 can be inserted into the mini figure. A program or voice data is changed by changing memory cards 1004 so that the game or the mini FIG. 1101 can be changed into completely different game or character.

The mini FIG. 1101 shown in the figure is described using a doll shape which is simple in terms of drawings. However, it is needless to say that the mini figure can be any animation character, a small animal such as a pet, a fictional animal, a model of a person.

FIG. 76 shows a dot pattern portion 1122 formed on a card 1121. This is a toy such that when the card 1121 is arranged horizontally turned by a given angle on a sear 1123 in which a scanner is mounted for scanning the dot pattern portion 1122, voice data or display data are used to output a score.

FIG. 78 shows an example of a pen type scanner 1001 which is used to work a crossword puzzle 1132 printed on a magazine or the like. A dot pattern portion 1122 of the invention is formed in a white space 1133 of the crossword puzzle 1132 paper. When the end of the pen type scanner 1001 is abutted on a given blank space 1133, a hint of a word in a down word line or a across word line is displayed on an LC display 1131 of the pen type scanner 1001.

In this case, when the end of the pen type scanner 1001 is abutted on the white space of which a hint is desired, a dot pattern formed in the white space is scanned and the hint of the word can be displayed on the LC display 1131. Then, if the scanner is abutted on one white blank, a hint in the down word line, a hint of the across word line or a hint in the oblique word line can be displayed depending on the angle of the pen type scanner 1001 being abutted. In this time, as described above, since tilt of a camera (shift in the rotational direction of the image pickup device with the vertical axis of paper as the center) can be calculated when a shift from a lattice point of a key dot with respect to a lattice point is calculated by the CPU, the vertical, horizontal and oblique direction of the crossword puzzle can be recognized depending on the tilt of the camera. Accordingly, a hint corresponding thereto can be read to be displayed and/or output from the speaker 1007.

Here, when the pen type scanner 1001 is moved two cells in the vertical (down) direction, horizontal (across) direction or oblique direction, movement in the x and y coordinates is detected (detecting method is described above) thereby to display a word hint in the direction on the display 1131 and/or output by voice information from the speaker 1007.

Figure 80:
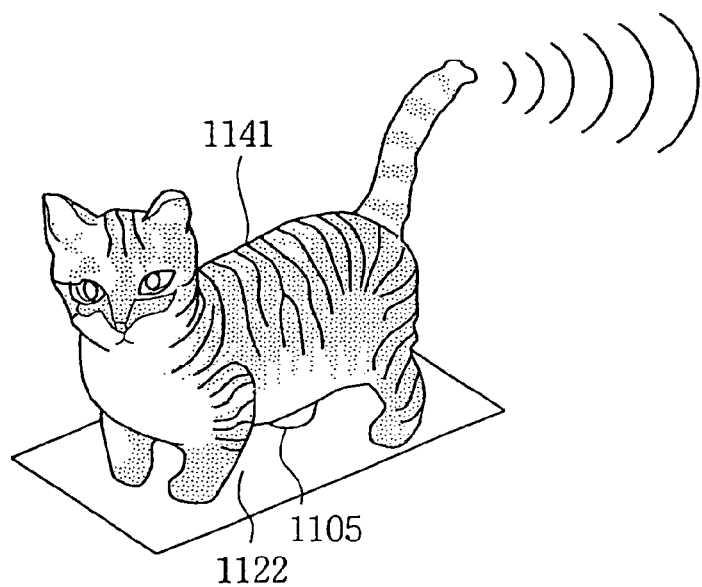
FIG. 80 is a view illustrating an example of use of the embodiment.

FIG. 80 shows a scanner portion 1005 mounted on the stomach of a self-advancing cat stuffed toy 1141. When the stuffed toy 1141 runs on a dot pattern portion 1122 formed on the floor in a house or a board of seal or the like, the dot pattern portion 1122 is captured, thereby to transmit the captured signal to the device main body 1102.

Figure 81:
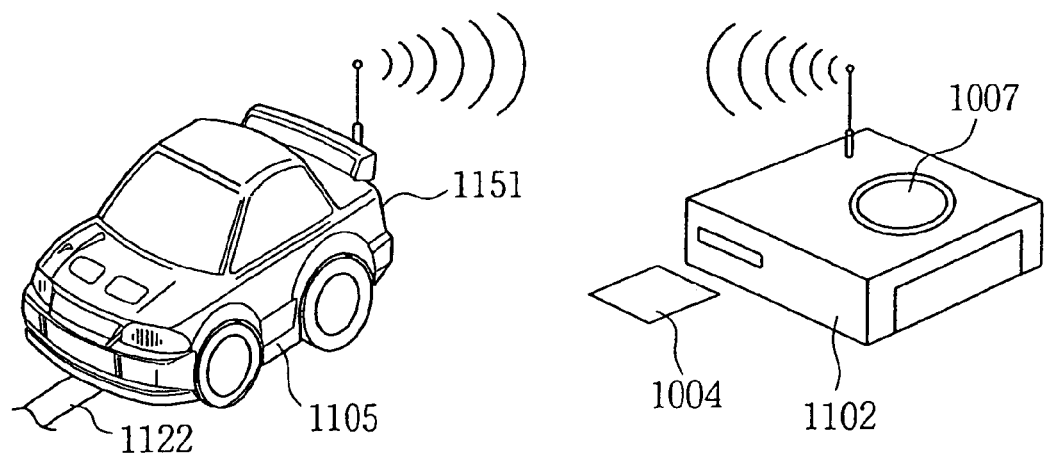
FIG. 81 is a view illustrating an example of use of the embodiment.

FIG. 81 shows a scanner portion 1105 mounted on the bottom surface of a self-running or radio-controlled car toy 1151. The scanner portion 105 captures a dot pattern portion 1122 formed on a bard or a floor by seal or the like to send a scanned signal to the device main body. Thereby the device main body 1102 can output voice information corresponding to the dot pattern portion 1122 from the speaker 1007.

For example, a sheet on which city roads are printed is prepared. When the car toy runs on the sheet, seals on which dot pattern portion 1122 are formed are attached to positions in front of street crossing and railroad crossing on the sheet. When the car toy approaches the street crossing or railroad crossing, voice information for urging the car to stop can be output from the speak 1007 of the device main body 1102.

Figure 82:
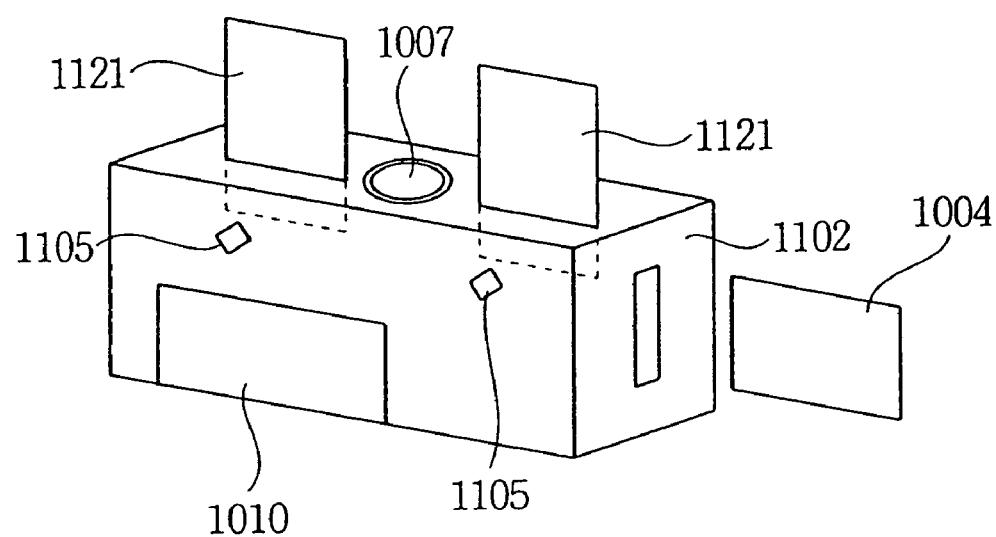
FIG. 82 is a view illustrating an example of use of the embodiment.

FIG. 82 shows an explanatory view showing that the invention is applied to a versus card game.

Figure 83:
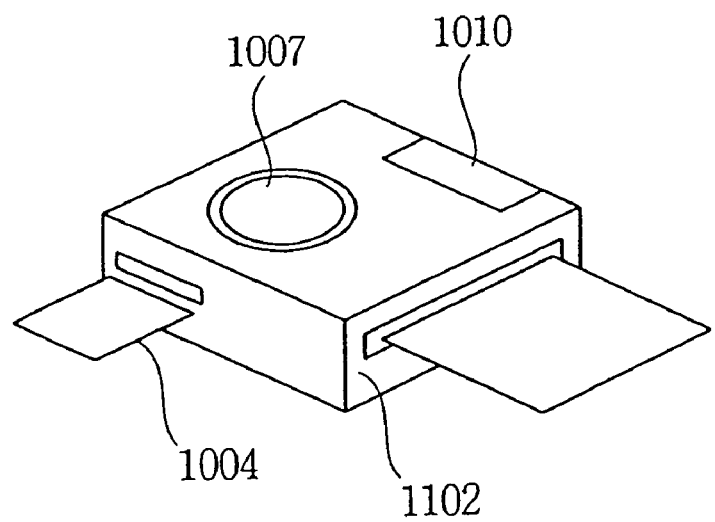
FIG. 83 is a view illustrating an example of use of the embodiment.

As shown in FIG. 82, a pair of card slots are provided on a device main body 1102, when cards 1121, 1121 of two players are inserted into the card slot like one card into one slot, superiority between the parameters set on the cards 1121, 1121 is judged. On the surface of each of the cards 1121, a dot pattern portion 1122 is provided as explained on FIG. 77, and when this dot pattern portion 1122 is scanned by the scanner portion 1105 of the device main body 1102, the parameter corresponding to the dot pattern portion 1122 is read out of a memory card 1004 thereby to judge a winner. Here, an LC display screen can be mounted on the device main body 1102 so that a winning result can be displayed. FIG. 83 shows an example of the device main body into which only one card 1102 can be inserted.

Figure 84:
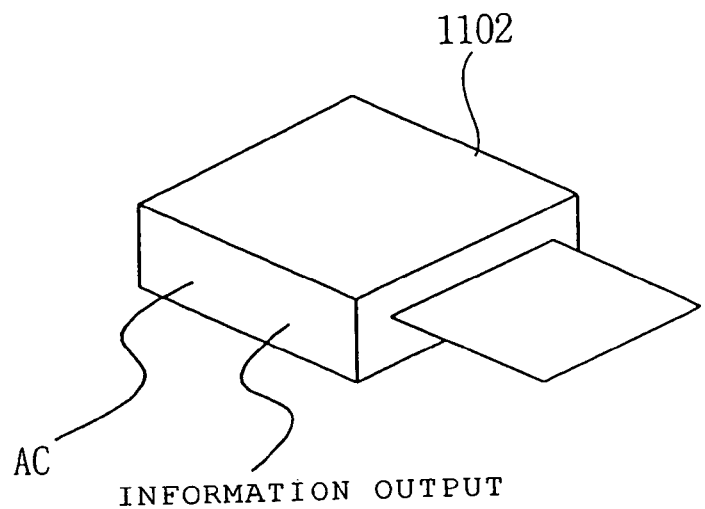
FIG. 84 is a view illustrating an example of use of the embodiment.
Figure 85:
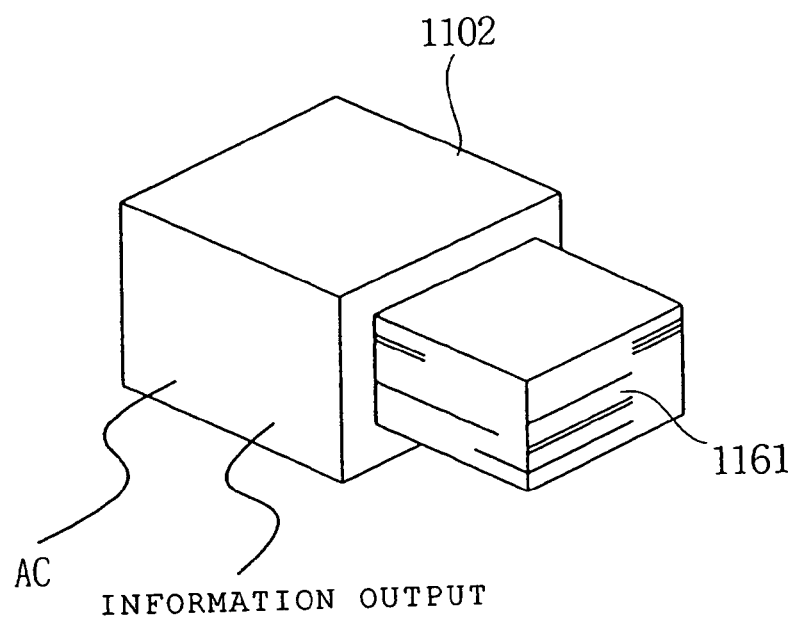
FIG. 85 is a view illustrating an example of use of the embodiment.

FIG. 84 shows an embodiment in which the device main body 1102 is a simple card reader and the device main body 1102 is connected to a personal computer. FIG. 85 shows an example of a device main body 1102 for sequentially scanning postcard-sized sheets 1161 on which dot pattern portions are formed. For example, the device main body is suitably configured to scan return postcards from users on which dot pattern portions are formed.

Figure 86:
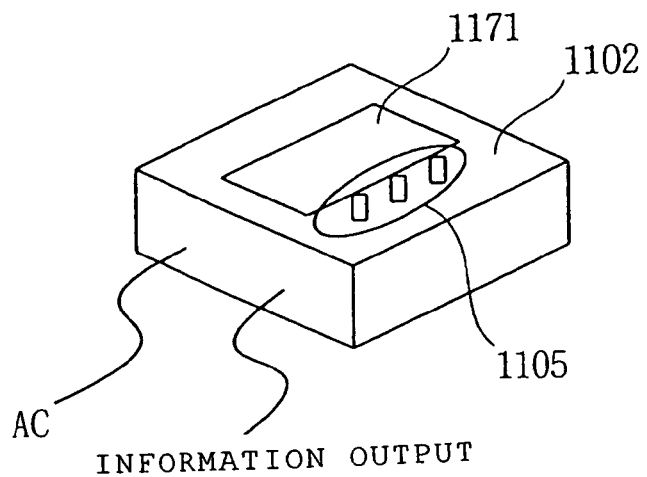
FIG. 86 is a view illustrating an example of use of the embodiment.

FIG. 86 shows an example of a device main body 1102 which can be utilized in a POS register or the like. A scanner portion 1105 arranged under a glass face 1171 is used to scan a dot pattern portion 1122 attached to an article which passes on the glass face 1171, thereby enabling goods management, sales management and so on, just like a barcode. In this case, according to the invention, since it is possible to form a dot pattern portion on a printed face of a wrapping paper sheet or a wrapping box in such a manner that the dot pattern portion is superimposed on the printed face, it is possible to avoid awkward occupation of a barcode on a surface of an article like in the barcode system.

Figure 87:
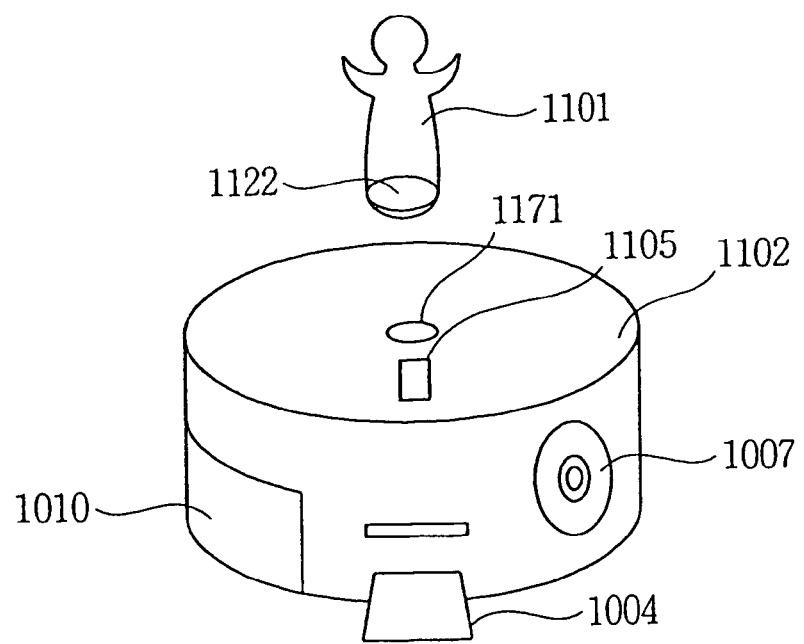
FIG. 87 is a view illustrating an example of use of the embodiment.

FIG. 87 shows an example of a device main body consisting of a seat 1102 which is combined with a mini FIG. 1110. According to this embodiment, a glass plate 1171 is arranged on the upper face of the seat 1102 and a scanner portion 1105 is provided under the glass plate 1171. Then, when the mini FIG. 1101 on which a dot pattern portion 1122 is formed on the bottom is deposed on the seat 1102 the dot pattern portion 1122 is scanned by the scanner portion 1105 and thereby voice data corresponding to code number read from the dot pattern portion 1122 is read out of a memory card 1004 to be output from a speaker 1007.

Figure 88:
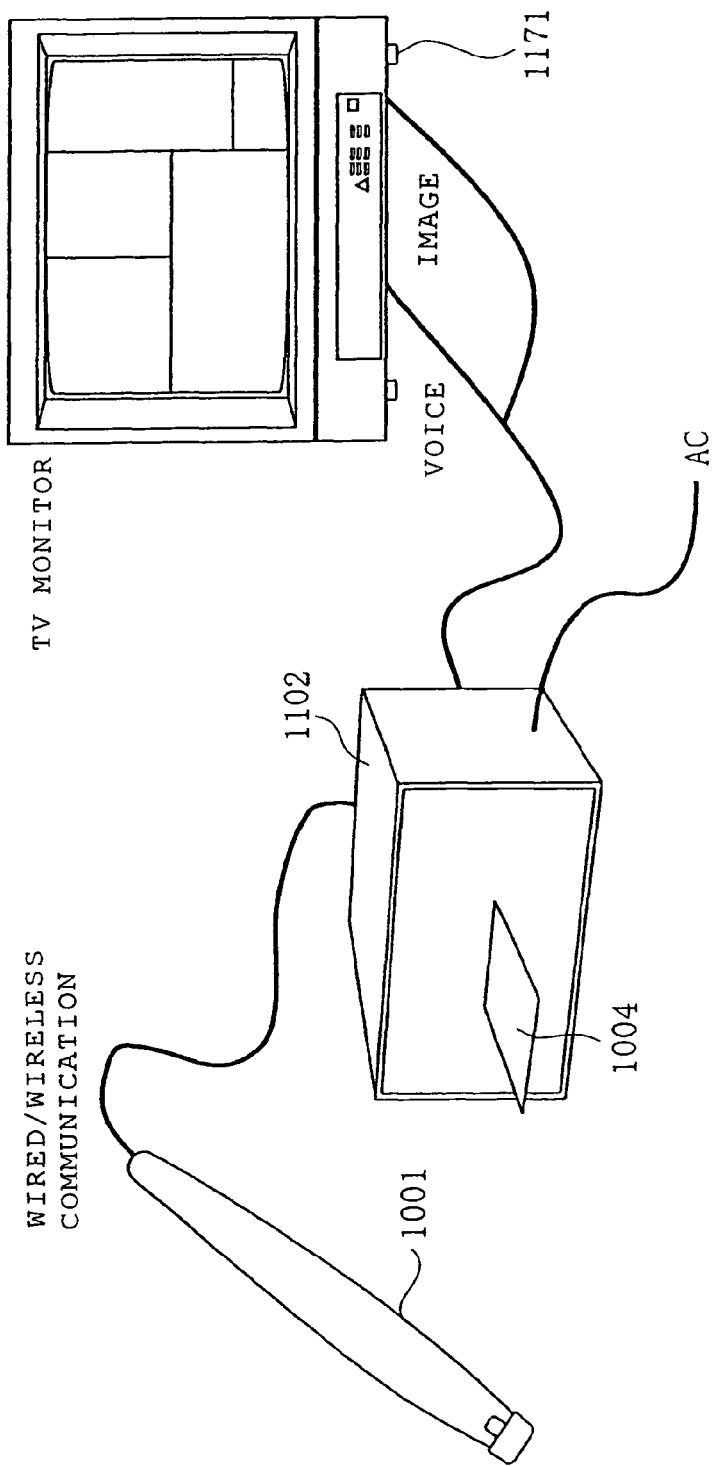
FIG. 88 is a view illustrating an example of use of the embodiment.

FIG. 88 shows an example of the device main body 1102 connected to a TV monitor 1171. An image signal and a voice signal from the device main body 1102 is to be output via a pin plug to the TV monitor 1171. The voice signal and the image signal are stored in a memory card 1004 or a built-in memory of the device main body 1102. The motion data corresponding to a dot pattern portion 1122 captured by a pen type scanner 1001 is divided into voice data and image data, which are input to the TV monitor 1171 to be output from a screen and speaker of the TV monitor 1171.

Figure 89:
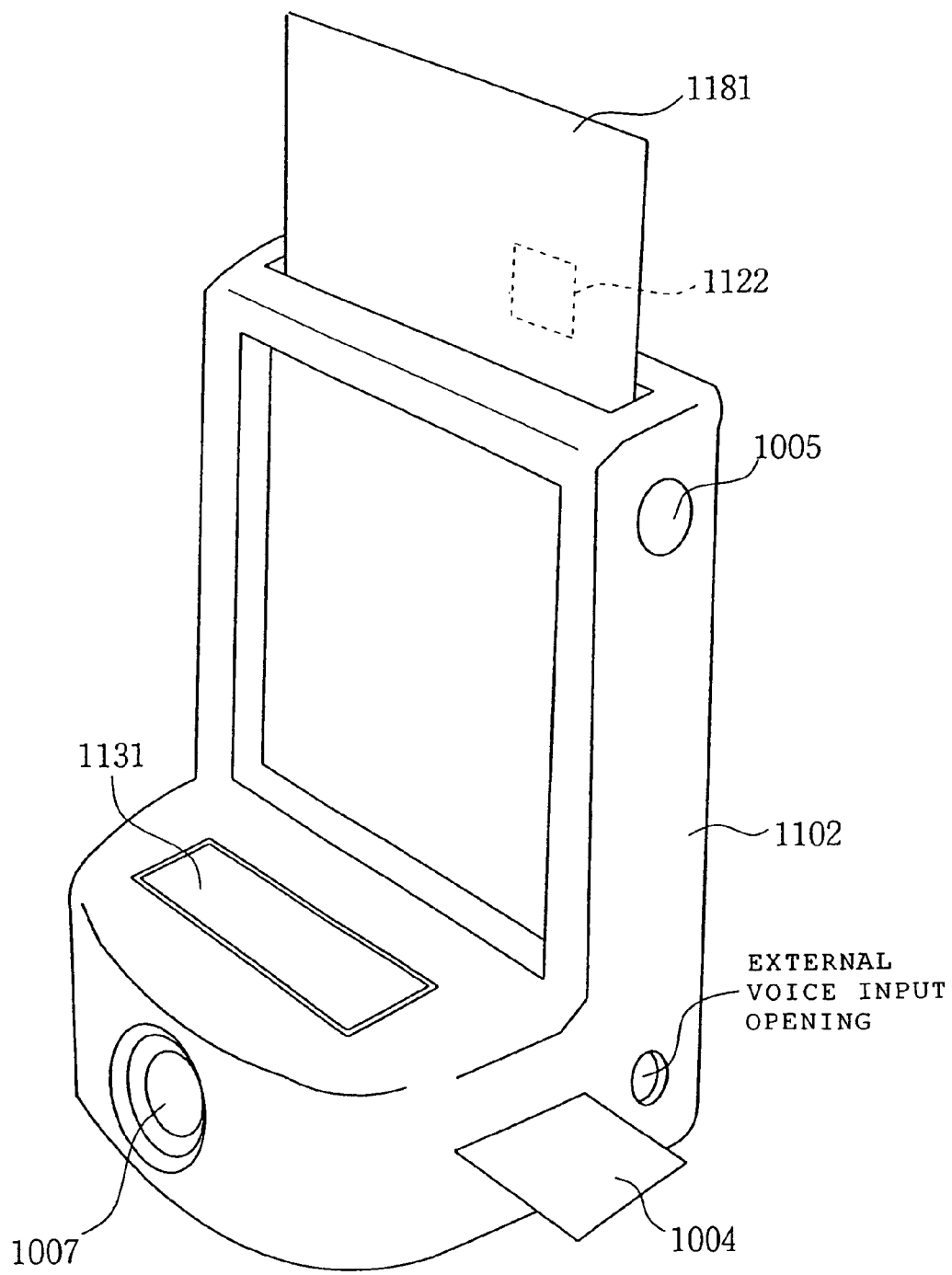
FIG. 89 is a view illustrating an example of use of the embodiment.

FIG. 89 shows a photo-stand-type device main body 1102. A dot pattern portion 1122 is formed at the back side of a picture 1181. A scanner portion (no shown) is provided at a back surface of the stand portion of the device main body 1102. Voice information corresponding to a code number of the scanned dot pattern portion 1122 is read out of a memory built in the device main body 1102 or a memory card to be output from a speaker 1007. According to this embodiment, since a voice corresponding to a dot pattern portion 1122 can be registered in a built-in memory or a memory card 1004 in advance for each picture 1181, a comment at the time of taking the picture or a voice message like "happy birthday" can be reproduced from the speaker 1007.

In addition to the speaker 1007, a microphone 1005 is mounted. Voice data is registered in a built-in memory or a memory card 1004 and may be associated with a dot pattern portion 1122 attached in advance to a back surface of a picture 1181.

Further, the photo-stand-type device main body 1102 in FIG. 89 has a LC display 1131. Data such as a shooting date, message text or the like is associated with a dot pattern portion 1122 and the data are also associated with the picture 1181 to be displayed on the LC display 1131.

Figure 90:
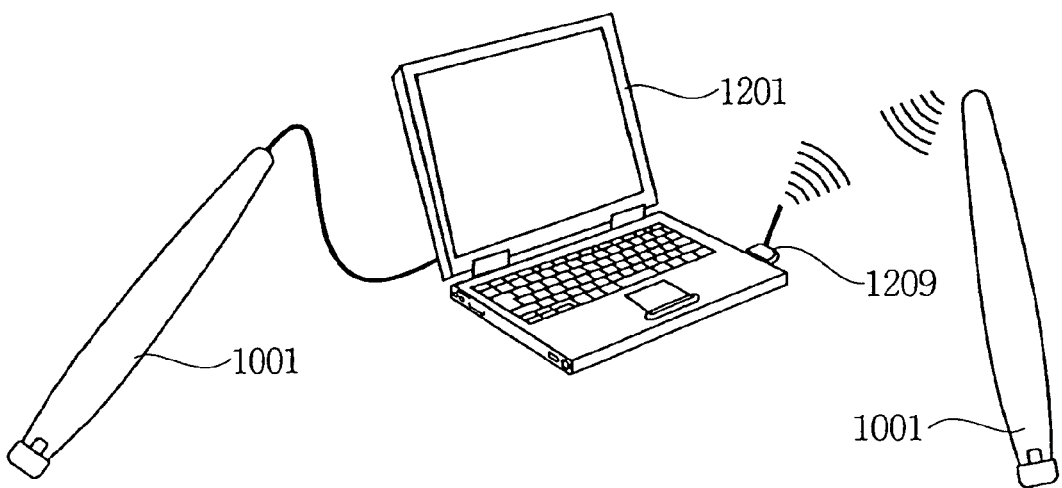
FIG. 90 is a view illustrating an example of use of the embodiment.

FIG. 90 shows a pen type scanner 1001 connected to a PC 1201 via a USB cable. Connection between the pen type scanner 1001 and the PC 1201 may be realized using, other than the USB interface, RS-232C serial interface, a LAN interface, IEEE1394 interface or the like.

Further, a radio interface card 1209 is mounted on a PC and the PC can be connected to the pen type scanner 1001 by radio communication. The radio interface can be a blue tooth, wireless LAN or the like. Further, connection between the pen type scanner 1001 and the PC 1201 can be realized by an optical interface such as infrared data communication other than radio interface.

Figure 91:
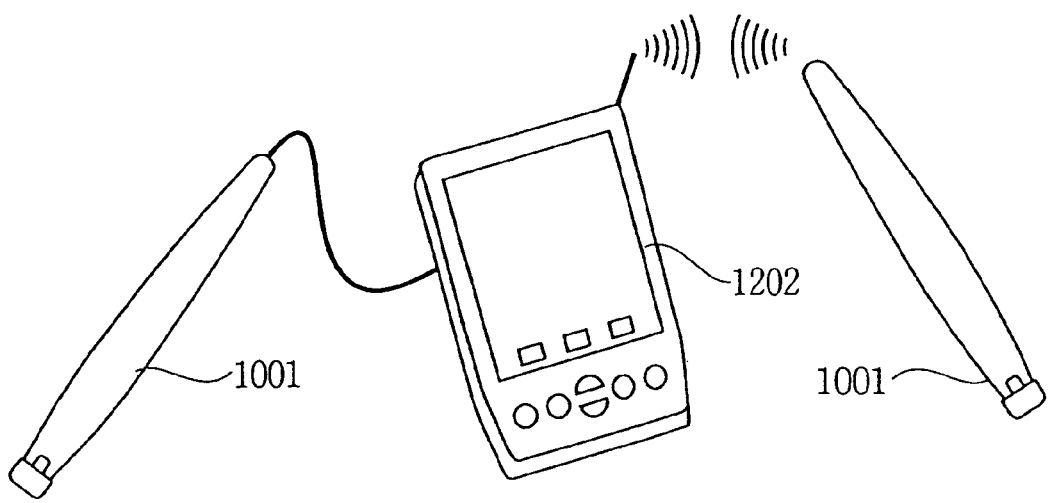
FIG. 91 is a view illustrating an example of use of the embodiment.

FIG. 91 shows a pen type scanner 1001 connected to a PDA 1202 by a cable. Connection between the PDA 1202 and the pen type scanner 1001 can be realized by wired connection, radio connection or optical communication connection.

Figure 92:
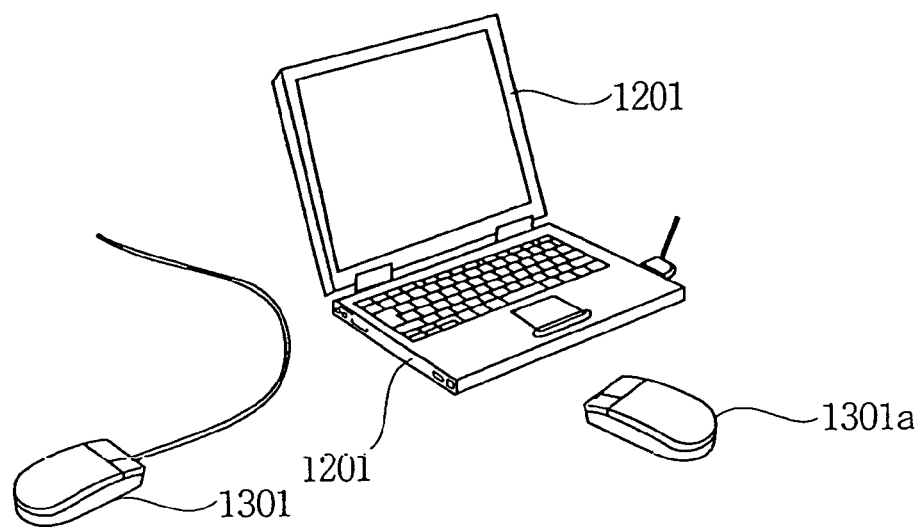
FIG. 92 is a view illustrating an example of use of the embodiment.

FIG. 92 shows a scanner integrated mouse 1301 connected to a PC 1201. The mouse 1301 is usually connected to the PC 1201 by a cable. However, connection can be realized by radio connection or optical communication connection.

Figure 93:
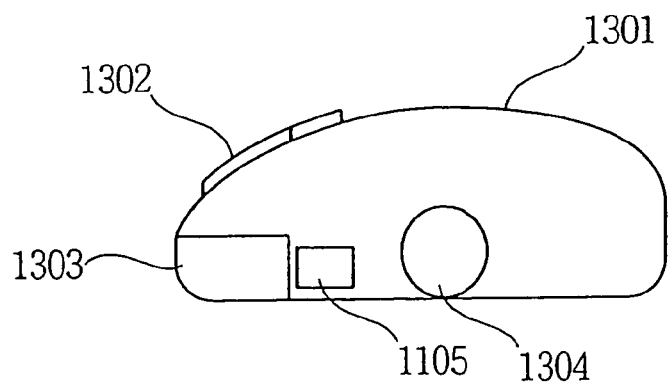
FIG. 93 is a view illustrating an example of use of the embodiment.
Figure 94:
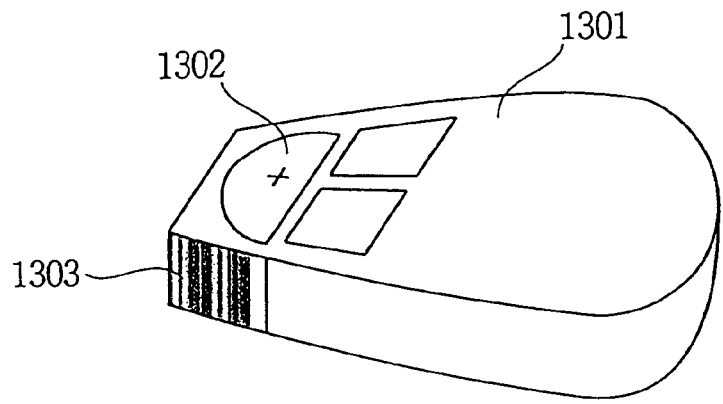
FIG. 94 is a view illustrating an example of use of the embodiment.

FIGS. 93 and 94 show a mouse 1301 having a digitalizer function. In this mouse a scanner portion 1105 is mounted, and a transparent window made of a glass member 1302 is provided at the end of the mouse 1301. With this window, it is possible to have in one's sights a target of the dot pattern portion 1122 to be scanned by the scanner portion 1105.

Figure 95:
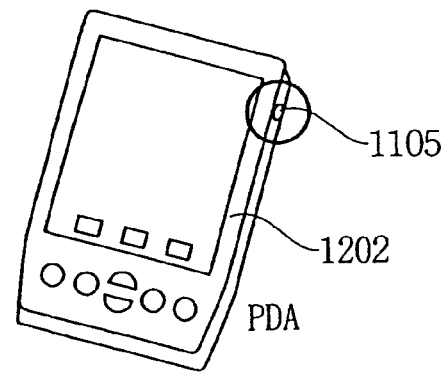
FIG. 95 is a view illustrating an example of use of the embodiment.
Figure 96:
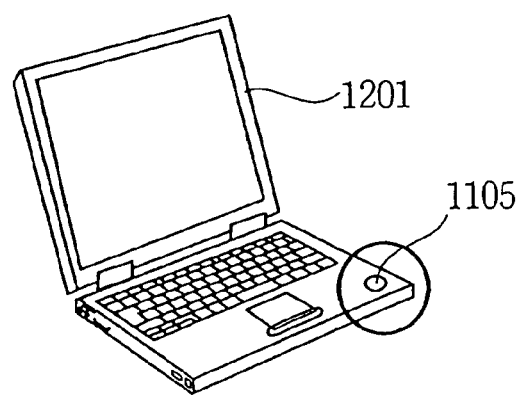
FIG. 96 is a view illustrating an example of use of the embodiment.
Figure 97:
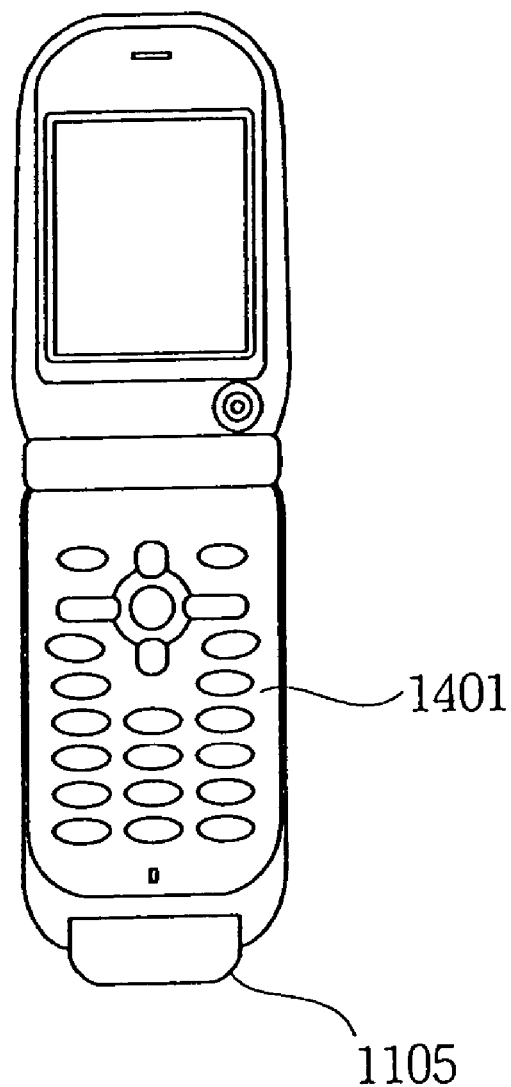
FIG. 97 is a view illustrating an example of use of the embodiment.
Figure 99:
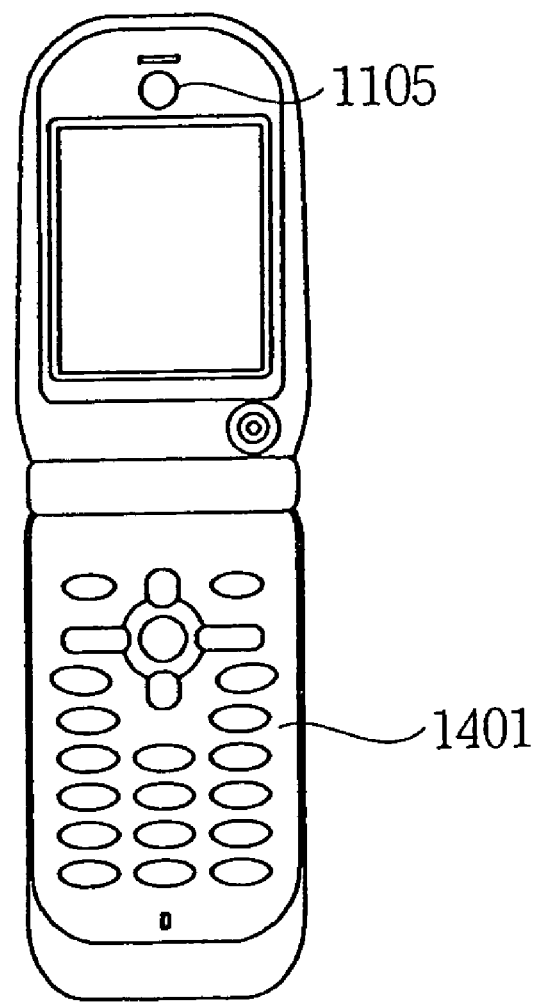
FIG. 99 is a view illustrating an example of use of the embodiment.

FIG. 95 shows a configuration of a scanner portion 1105 which is provided in the main body of PDS 1202, and FIG. 96 shows a configuration of a scanner portion 1105 which is provided in a PC main body 1201. As shown in FIG. 95, when the scanner portion 1105 is mounted on the PDA 1202 main body, the scanner portion 1105 of the PDA 1202 main body is held over a dot pattern portion 1122 on paper or the like and the dot pattern portion 1122 can be scanned. On the other hand, as shown in FIG. 96, when the scanner portion 1105 is provided in the PC main body 1201, the scanner portion 1105 is held over a dot pattern portion 1122 formed on a business card or card 1121 (see FIG. 77) thereby to scan the dot pattern portion 1105. As shown in FIGS. 97 and 99, a scanner portion 1105 may be mounted on a portable phone 1401 main body or game machine main body (not shown).

Figure 98:
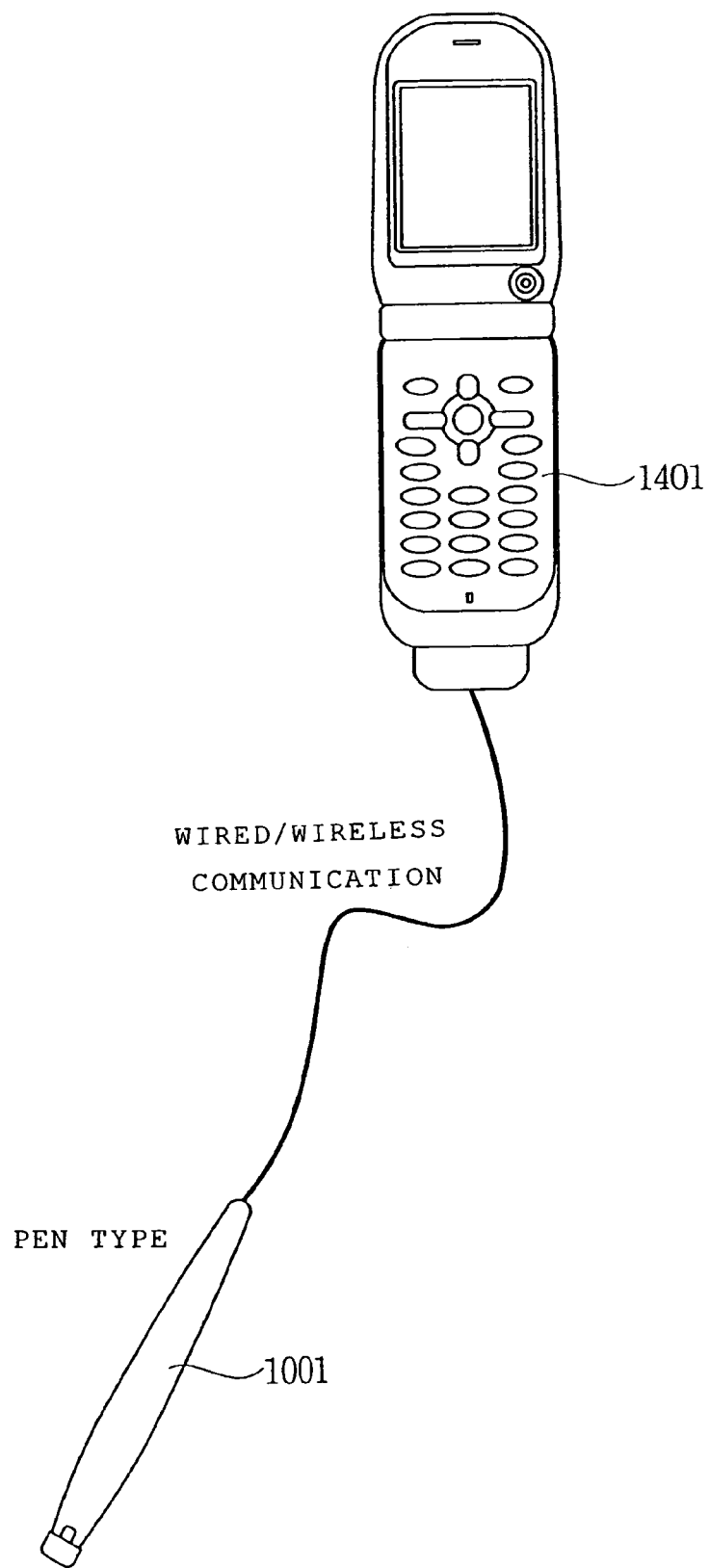
FIG. 98 is a view illustrating an example of use of the embodiment.

FIG. 98 shows a pen type scanner 1001 connected to a connector of a portable phone 98. In this configuration, a scanned signal scanned by the pen type scanner 1001 corresponding to a dot pattern portion can be processed by a program downloaded in advance in the portable phone 1401 displayed on the display of the portable phone or output by voice. Also, result data, which has accessed to the server by the program and processed at the server by sending the scanned signal can be received by the portable phone 1401.

Figure 100:
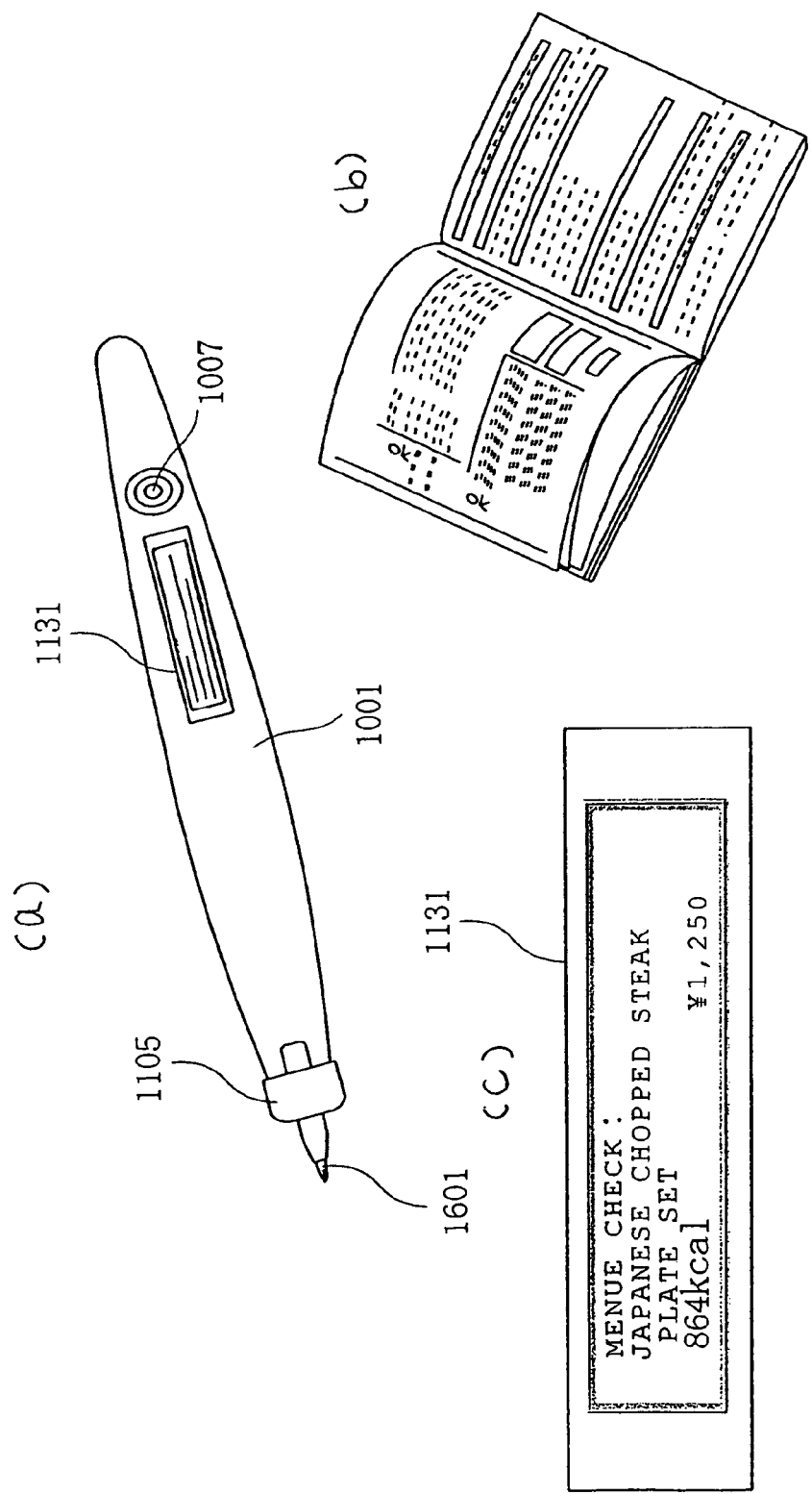
FIG. 100 is a view illustrating an example of use of the embodiment.

FIG. 100 is a view for explaining a configuration of a pen type scanner 1001 provided with a LC (liquid crystal) display 1131 and a speaker 1007. The pen type scanner 1001 according to the present embodiment has a writing material 1601 such as a ball pen, mounted at the end thereof and a scanner portion 1105 is provided around the writing material.

As an example of use of such pen type scanner 1001, a dot pattern portion 1122 is formed at a menu of a restaurant or the like and the menu and the pen type scanner 1001 are handed to a client when he comes in the restaurant.

The client selects from the menu and checks a square box of the selected article by the writing material 1601. At this time, a dot pattern portion 1122 corresponding to the selected article is scanned by the scanner portion 1105. Thus, processing by the central processing unit inside the pen type scanner 1001 makes letter information corresponding to the selected article to be read from a memory to be displayed on the LC display 1131. In FIG. 100, displayed on the LC display 1131 is the article name selected by the client "Japanese chopped steak plate set", its calorie "864 kcal" and its price "1,250 yen".

In this way, since a client himself selects from a menu and confirms its selection by use of a pen type scanner 1001, a staff can complete order processing only by collecting the pen type scanner 1001.

Figure 101:
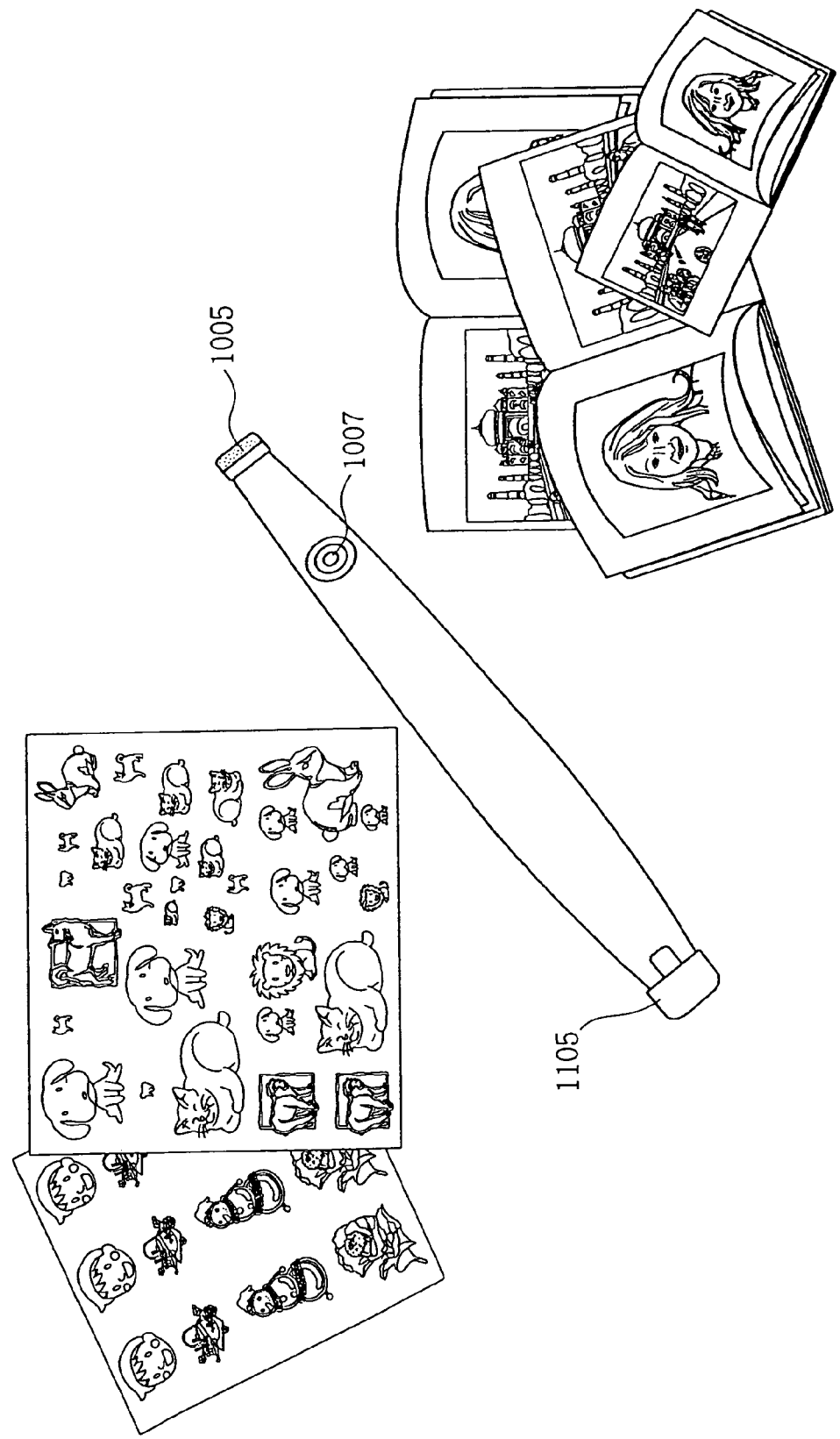
FIG. 101 is a view illustrating an example of use of the embodiment.

FIG. 101 is a view showing a configuration of a pen type scanner 1001 provided with a microphone 1005 and a speaker 1007. In this embodiment, a dot pattern portion 1122 formed on a surface of a picture 1181 is scanned by a scanner portion 1105, after scanning is completed, a microphone 1005 is used to input a voice corresponding to the dot pattern portion 1122. The input voice data is registered in a memory (not shown) in the pen type scanner 1001. The voice at this time includes a description and greeting informing that the picture 1181 has been taken. Here, if a dot pattern portion 1122 is formed all over the picture surface, in the case of a group photo, a description for each person in the group photo can be registered.

Next, an end (scanner portion 1105) of the pen type scanner 1001 is abutted on a portion on the surface of the picture 1181 of which explanation is desired. Then, voice data can be reproduced from a speaker 1007.

In addition to the picture 1181, a dot pattern 1122 is formed on each seal. Then, a pen type scanner 1001 is abutted on the seal surface to input the voice data.

Figure 102:
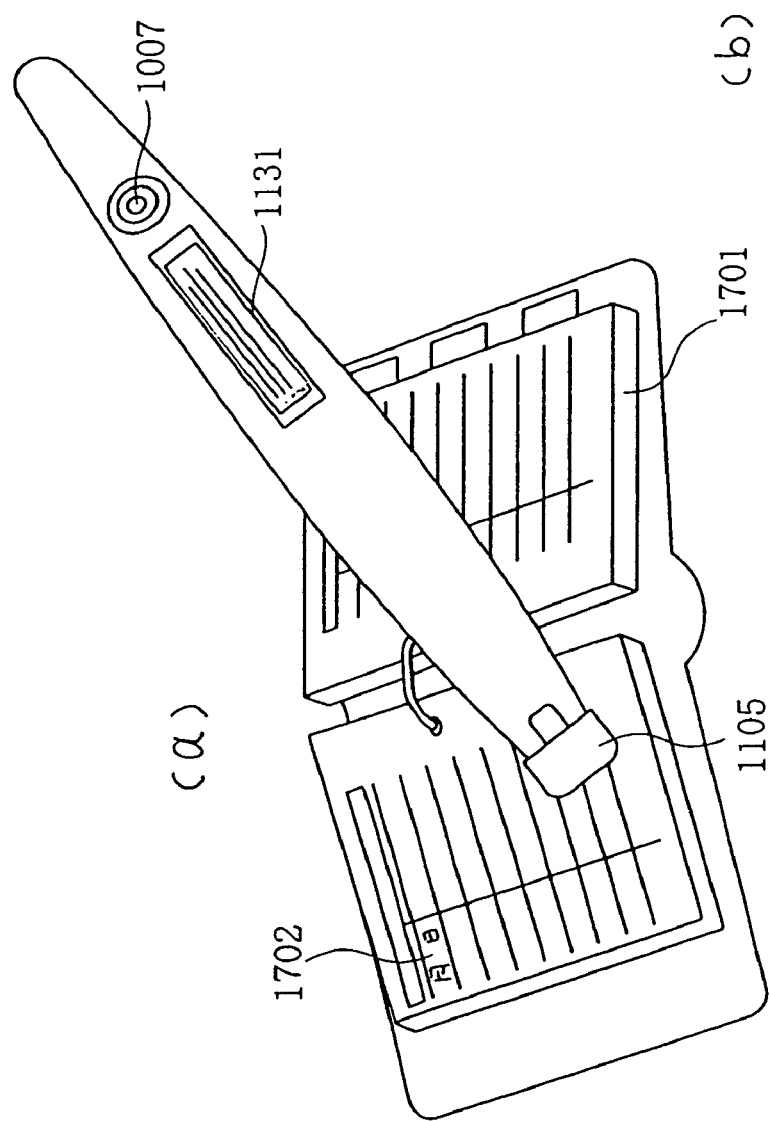
FIG. 102 is a view illustrating an example of use of the embodiment.

FIG. 102 is a view showing an example of an organizer 1701 and a pen type scanner 1001 which are combined to be used.

In FIG. 102, a dot pattern portion 1122 is formed in advance in a schedule section 1702 of the organizer 1701. In registering a schedule in the schedule section 1702, if a person can not afford recording letters on the way, an end (scanner portion 1105) of the pen type scanner 1001 is abutted on the schedule section 1702 of the date at which the schedule is input, and a schedule of the date is input by voice from a microphone (not shown).

In checking the schedule on the organizer 1701, the pen type scanner 1001 (scanner portion 1105) is abutted on the schedule section 1702 of the checked date to scan the dot pattern portion 1122. Thereby, the schedule input by voice corresponding to the date is reproduced from the speaker 1007.

Here, the pen type scanner 1001 is configured to be connectable to a PC 1201 by a USB interface or the like and establishes data like (synchronized) with a schedule managing system in the PC 1201 (for example, Outlook of Microsoft Corporation, Lotus Note or the like). Then, when the pen type scanner 1001 is used to scan the dot pattern portion 1122 of the date section (schedule section 1702), the schedule corresponding to the date is set to be displayed on the LC display 1131 with text data as shown in FIG. 102.

When the pen type scanner 1001 may be connected to the PC 1201 and the dot pattern portion formed on the surface of the organizer 1701, an ID card, a license card or the like to control inputting of the PC 1201. Such a control of the PC 1201 is called "paper icon", an icon on the screen of the PC 1201 can be replaced with an external medium on which a dot pattern portion 1122 (seal attached to the organizer 1701, ID card).

In other words, the pen type scanner 1001 is used to scan the dot pattern portion 1122 on the medium, and only if code information scanned from the dot pattern portion 1122 matches code information stored in the PC 1201, access to the PC 1201 is permitted.

The dot pattern portion 1122 may be printed on a seal, as a paper icon which is attached to a surface of the organizer 1701, an ID card or a license card. Or, a user may print it by a printer connected to the PC 1201 and hold printed seal.

Here, a paper icon on which the dot pattern portion is formed is used to control access to the PC 1201. However, it can be used to input an ID or password in starting a particular application or accessing to a particular internet site.

Such paper icon can be managed by an application program for paper icon installed on the OS of the PC.

Specifically, management is configured of three steps of "icon registration on PC", "paper icon registration" and "icon deletion".

<Registration of Normal Icon>

An application program for paper icon on a PC has an editor thereby to create and set a paper icon on a screen.

When, in the icon editor, an icon for executing a predetermined function on the PC is registered on the editor, first, icon allocation (ALLOCATE) is turned "ON". Next, a desired icon on the PC screen is designated by a mouse, and the icon is registered on the editor.

The icon thus registered on the editor is set in an initial state in which display is "ON" and Executable state (active) is "ON".

In this state, on the editor, when the display is turned "OFF", the icon is erased from the display. When the executable state (active) is turned "OFF", designation and execution of the icon on the PC and execution of keyboard inputting are inabled.

<Registration of Paper Icon>

In the editor, allocation of paper icon (ALLOCATE) is turned "ON". Next, the icon on the display is turned "ON" to scan a medium of the paper icon, which is desired to be registered, by a pen type scanner or the like.

By the above-described operation, a code of a dot pattern of the scanned paper icon is registered on a selected icon (allocated).

In the initial state of the paper icon, the executable state (activate) is "ON" and a password can be inputted. Then, the password is inputted, the password is encoded by an editor program and registered.

In this state, when the executable state (active) is turned "OFF", even if the paper icon is scanned by the pen type scanner, a function defined on the icon can not be executed.

<Deletion of Icon>

When a deletion flag (DELETE) is turned "ON", an executable state (active) is simultaneously turned "OFF". Then, the icon image flag is designated in this sate, the icon is deleted and no longer recovered.

<Deletion of Paper Icon>

Also in deletion of paper icon, when a deletion flag (DELETE) is turned "ON", an executable state (active) is simultaneously turned "OFF". Then, code number assigned to a paper icon is designated in this state, a password is required to be inputted. When the password is input, a link to the paper icon on an editor is deleted and no longer recovered.

The dot pattern portion 1122 can include, in addition to a medium of a picture book described in the embodiment, a normal book, a greeting card, a newspaper, a wish book, a pamphlet, a paper craft, an origami and a recipe.

For example, a dot pattern portion is formed on a wish book. Then, the dot pattern portion is scanned by a scanner portion to output explanation of goods or to start an order program registered in a memory in a PC.

Further, a dot pattern portion is formed a paper craft or an origami. Then the dot pattern portion is scanned by a scanner portion to explain fabrication process of the paper craft and the origami via a speaker.

Further, a dot pattern portion is formed on a recipe of cooking or the like, and the recipe can be output by voice.

Furthermore, a dot pattern portion according to the invention is used to provide a picture book for coloring. Specifically, areas (mask areas) shown in FIGS. 106(b) and 106(c) can be colored with different colors by crayon, felt pen, water-color pigment or the like. In this case, even if a non-carbon water-color pigment, crayon, felt pen or the like is used to color the paper on which the dot pattern portion is formed, as infrared light is capable of passing through the colored layer, the dot pattern portion can be scanned.

Furthermore, the dot pattern portion and a barcode reader can be superimposed to be printed. In this case, a barcode is printed on a medium such ash paper with a non-carbon ink, and on the printed barcode, the dot pattern portion is printed with a carbon ink. A normal barcode reader is capable of reading a barcode accurately even a small dot is on the barcode. Next, a pen type scanner according to the invention is used to input only a reading information code of the dot pattern portion.

Further, a barcode is printed with a ink which absorbs "(A) visible light+infrared light or ultraviolet light close in wavelengths to the visible light" or "(B) infrared light or ultraviolet light close in wavelengths to the visible light", while dots are printed with a ink which absorbs "(C) infrared light or ultraviolet light different in wavelengths from the infrared light or ultraviolet light used in the barcode".

In this case, a visible light cut-off filter is mounted on a C-MOS camera, a first LED for emitting light with the same wavelength as that of the above-mentioned (A) or (B) is made to emit light so as to read a barcode. Next, a second LED for emitting light with the same wavelength as that of the above-mentioned (C) is made to emit light so as to read only a dot pattern portion and input information code. In this way, since information from the dot pattern portion is arranged on the barcode, convoluted information (barcode and code from the dot pattern portion) can be acquired.

INDUSTRIAL APPLICABILITY

A dot pattern portion of the present invention is usable by being formed on publications including a book and a picture book, a picture seal, a seal with a dot patter for inputting formed on, a picture seal, a game board, character goods including a figure and a stuffed toy and touch panel of a monitor screen of a personal computer, television or the like.

A reading system of a dot pattern portion can be utilized as an inputting system of a toy computer area for children and a general purpose computer.

Further, the system is housed in a case to be used as a stand-alone scanner in an electronic device, a voice recorder and the like.

The invention claimed is:

1. An information reproducing method using a dot pattern, comprising:
    scanning a medium as image data by a scanner such as a printed material on which is formed a dot pattern portion, which formed by arranging in accordance with a given rule dots generated by a dot code generating algorithm, in order to recognize various kinds of multimedia information;
    converting the image data of the dot pattern portion into code data; and
    reading multimedia information corresponding to the code data out of a storage unit to reproduce the multimedia information,
    wherein the dot pattern forms a lattice block by a horizontal line composed of successive equally spaced dots and a vertical line extending vertically from the horizontal line, the lattice block has a lattice area surrounded by lattice points, and an information dot that defines data is generated by the algorithm and arranged within the lattice area.

2. The information reproducing method using a dot pattern according to claim 1, wherein the medium is a printed material or a picture and the dot pattern portion is formed so as to recognize voice information corresponding to image of the medium.

3. The information reproducing method using a dot pattern according to claim 1 or 2, wherein the dot pattern portion includes a plurality of areas which are separately printed depending on image of the printed material.

4. The information reproducing method using a dot pattern according to claim 1 or 2, wherein the dot pattern portion is formed on a seal member which can be attached to the printed material or a card.

5. An information reproducing device using a dot pattern comprising:
    a scanner for scanning image data of a dot pattern portion formed on a medium such as a printed material, the dot pattern portion being formed by arranging in accordance with a given rule dots generated by a dot code generating algorithm, in order to recognize various kinds of multimedia information, the information reproducing device;
    an extractor for extracting a line composed by successive equally spaced dots, assuming one extracted line as a horizontal line, extracting a vertical line which extends vertically from the horizontal line, recognizing a vertical direction from the vertical line by a prescribed method, and extracting an information area;
    a storage unit for, after the image data is digitalized into numeric values, storing multimedia information corresponding to the dot pattern portion based on the numeric values; and
    an outputting unit; for reproducing the multimedia information of the storage unit
    wherein the dot pattern forms a lattice block by a horizontal line composed of successive equally spaced dots and a vertical line extending vertically from the horizontal line, the lattice block has a lattice area surrounded by lattice points, and an information dot that defines data is generated by the algorithm and arranged within the lattice area.

6. An information reproducing device using a dot pattern comprising:
    a scanner housed in a pen type case to capture image data of a dot pattern portion that is formed on a medium surface by arranging in accordance with a given rule dots generated by a dot code generating algorithm in order to recognize various kinds of multimedia information;
    an extractor for extracting a line composed by successive equally spaced dots, assuming one extracted line as a horizontal line, extracting a vertical line which extends vertically from the horizontal line, recognizing a vertical direction from the vertical line by a prescribed method, and extracting an information area;
    a storage unit for, after the image data is digitalized into numeric value, storing multimedia information such as a voice corresponding to a code or x and y coordinates of the numeric values, or a code which is defined in advance based on the x and y coordinates; and
    an outputting unit for outputting the multimedia information stored in the storage unit;
    wherein the dot pattern forms a lattice block by a horizontal line composed of successive equally spaced dots and a vertical line extending vertically from the horizontal line, the lattice block has a lattice area surrounded by lattice points, and an information dot that defines data is generated by the algorithm and arranged within the lattice area.

7. An information inputting/outputting method by camera inputting comprising the steps of:
    printing on one surface of a printed material a dot pattern portion formed by arranging in accordance with a given rule dots generated by a dot code generating algorithm in order to recognize various kinds of multimedia information and an information transfer portion which includes a text, an illustration or the like to be recognized as information content;
    wherein said dot pattern portion includes three different kinds of dots including, key dots, lattice dots and information dots;
    capturing by a camera unit only image data of the dot pattern portion in the printed material and digitalizing the image data into numeric values; and
    based on the numeric values, outputting information and a program corresponding to the dot pattern portion from a storing portion and executing the information and the program.

8. The information inputting/outputting method by camera inputting according to claim 7, wherein the dot pattern portion and the information transfer portion of the text, the illustration or the like are printed on the one surface to be superimposed.

9. The information inputting/outputting method by camera inputting according to claim 7 or 8, wherein the dot pattern portion comprises x and y coordinate information and the x and y coordinate information is associated with description of the information transfer portion.

10. The information inputting/outputting method by camera inputting according to claim 9, wherein the dot pattern portion of the x and y coordinate information and the dot pattern information of the code number information are printed on a flat surface of the printed material.

11. The information inputting/outputting method by camera inputting according to claim 7 or 8, wherein the dot pattern portion comprises code number information and the code number information is associated with content of the information transfer portion.

12. The information inputting/outputting method by camera inputting according to claim 7 or 8, wherein in the step of capturing image data of the dot pattern portion by a camera unit, the dot pattern portion, which is printed with an ink that absorbs infrared light, is radiated with the infrared light.

13. The information inputting/outputting method by camera inputting according to claim 12, wherein the dot pattern portion is printed with a carbon ink.

14. The information inputting/outputting method by camera inputting according to claim 12, wherein the dot pattern portion is printed with a transparent ink.

15. The information inputting/outputting method according to claim 7 or 8, wherein in the step of capturing image data of the dot pattern portion, the dot pattern portion is radiated with ultraviolet light.

16. A portable information inputting/outputting device using a camera inputting method, comprising:
a camera unit for scanning only image data of a dot pattern portion printed on the printed material, the dot pattern portion formed by arranging in accordance with a given rule dots generated by a dot code generating algorithm in order to recognize various kinds of information and an information transfer portion which includes a text, an illustration or the like to be recognized as information content being printed on one surface of the printed material;
wherein said dot pattern portion includes three different kinds of dots including, key dots, lattice dots and information dots;
an image processing portion for digitalizing the image data into numeric values;
processing means for reading information of a storing portion corresponding to the dot pattern portion based on the numeric values obtained by the image processing portion; and
outputting means for outputting the information read out by the processing means.

17. The portable information inputting/outputting device according to claim 16, further comprising an infrared light emitting portion for radiating the dot pattern portion in the printed material with infrared light.

18. The information portable inputting/outputting device according to claim 16, further comprising an ultraviolet light emitting portion for radiating the dot pattern portion in the printed material with ultraviolet light.

19. The portable information inputting/outputting device according to claim 16, wherein the camera unit is a C-MOS camera.

20. The portable information inputting/outputting device according to claim 16, wherein the camera unit is a CCD camera.

21. The portable information inputting/outputting device according to claim 16, wherein the camera unit is configured separated from the image processing portion, the storing portion, the processing means and the outputting means to carry out transmission via an interface portion.

22. The portable information inputting/outputting device according to claim 16, wherein the camera unit and the image processing portion is configured separated from the storing portion, the processing means and the outputting means to carry out transmission via an interface portion.

23. The portable information inputting/outputting device according to claim 16, further comprising a microphone as an inputting portion.

24. The portable information inputting/outputting device according to claim 16, wherein data of the numeric values of the dot pattern portion input by the camera unit is transmitted to a computer such as a server via a communication card.

25. The portable information inputting/outputting device according to claim 16, wherein data of the numeric values of the dot pattern portion input by the camera unit is transmitted to a computer such as a server via a communication card, and information and a program corresponding to the data is received.

26. The portable information inputting/outputting device according to claim 16, further comprising a GPS (global positioning system) unit for inputting position information.

27. The portable information inputting/outputting device according to claim 16, wherein the portable information inputting/outputting device is a portable phone.

28. The portable information inputting/outputting device according to claim 16, wherein the camera unit is part of a portable phone.

29. An electronic information device comprising:
a scanner for scanning a medium surface on which dots are arranged in accordance with a given rule by a dot code generating algorithm in order to recognize various kinds of multimedia information;
an extractor for extracting a line composed by successive equally spaced dots, assuming one extracted line as a horizontal line, extracting a vertical line which extends vertically from the horizontal line, recognizing a vertical direction from the vertical line by a prescribed method, and extracting an information area;
a storage unit for, after image data of the scanned medium is converted into numeric values, storing multimedia information corresponding to the numeric values; and
an outputting unit for reading the multimedia information stored in the storage unit storing means to output the multimedia information, the scanner, the storage unit and the outputting unit being housed in a pen type case;
wherein the dot pattern forms a lattice block by a horizontal line composed of successive equally spaced dots and a vertical line extending vertically from the horizontal line, the lattice block has a lattice area surrounded by lattice points, and an information dot that defines data is generated by the algorithm and arranged within the lattice area.

30. The electronic information device according to claim 29, further comprising an inputting unit for inputting the multimedia information into the storage unit.

31. The information reproducing method according to claim 1, 5, 6 or 29 wherein the scanner extracts the horizontal line and the vertical line and scans the dot defined in the lattice area.

32. A computer executable program for registering a paper icon which has a dot pattern portion formed on a medium and code information associated with the paper icon by using a scanner connected to an information processing device, the program comprising the steps of designating a display icon displayed on a display screen;

setting allocation of the paper icon to a ON state by selection on the display screen;

instructing the scanner about scanning processing of the paper icon on the display screen or by a voice data output while the ON state is kept;

after the scanning processing is performed based on the step of instructing, extracting code information from image data obtained by the scanning processing; and associating the code information with the display icon designated in the step of designating.

33. The computer executable program according to claim 32, further comprising the steps of:

deleting from the display screen the display icon corresponding to the paper icon registered; and executing a function of the display icon associated with the code information when the paper icon is scanned by the scanner.

* * * * *